US012737057B2

(12) United States Patent
Minamino et al.

(10) Patent No.: US 12,737,057 B2
(45) Date of Patent: Sep. 15, 2026

(54) INPUT DEVICE

(71) Applicant: Sony Interactive Entertainment Inc., Tokyo (JP)

(72) Inventors: Takanori Minamino, Kanagawa (JP); Kenzo Nishikawa, Tokyo (JP); Takeshi Igarashi, Kanagawa (JP); Isao Okuyama, Chiba (JP); Yoshiaki Kawamura, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/692,345

(22) PCT Filed: Sep. 22, 2021

(86) PCT No.: PCT/JP2021/034845
§ 371 (c)(1),
(2) Date: Mar. 15, 2024

(87) PCT Pub. No.: WO2023/047494
PCT Pub. Date: Mar. 30, 2023

(65) Prior Publication Data
US 2024/0377899 A1 Nov. 14, 2024

(51) Int. Cl.
*G06F 3/0346* (2013.01)

(52) U.S. Cl.
CPC .................................. *G06F 3/0346* (2013.01)

(58) Field of Classification Search
CPC ...... G06F 3/04815; G06F 3/011; G06F 3/017; G06F 3/0346; G06F 3/03545; G06T 19/006; G06T 2200/24
See application file for complete search history.

(56) References Cited

U.S. PATENT DOCUMENTS 10,579,151 B2 * 3/2020 Liu ........................ A63F 13/218
10,606,373 B1 * 3/2020 Allin ..................... G06F 3/0202
(Continued)

FOREIGN PATENT DOCUMENTS

JP 2007-296248 A 11/2007
JP 2011-164932 A 8/2011
(Continued)

OTHER PUBLICATIONS

Decision to Grant a Patent issued Oct. 29, 2024 in Japanese Patent Application No. 2023-549224 with English translation.
(Continued)

*Primary Examiner* — Chanh D Nguyen
*Assistant Examiner* — Jarurat Suteerawongsa
(74) *Attorney, Agent, or Firm* — Kilpatrick Townsend & Stockton LLP

(57) ABSTRACT

An improvement in accuracy in recognition of the position and posture of input devices is achieved. The input device has a grip extending in an up-down direction, an upper portion positioned upward of the grip and having operating members to be operated by a finger disposed therein, and a lower portion positioned downward of the grip and having a plurality of to-be-tracked points disposed therein. The width of the lower portion is greater than the width of the grip. This makes it easier to dispose a large number of to-be-tracked points in the lower portion.

20 Claims, 53 Drawing Sheets

(56) References Cited

U.S. PATENT DOCUMENTS

| | | | | |
|---|---|---|---|---|
| 11,209,916 | B1 * | 12/2021 | Zimmermann | G06F 3/0325 |
| 2002/0171625 | A1 * | 11/2002 | Rothchild | G06F 3/03549<br>345/156 |
| 2004/0037080 | A1 * | 2/2004 | Luk | H05B 45/20<br>362/231 |
| 2007/0049374 | A1 * | 3/2007 | Ikeda | A63F 13/42<br>463/30 |
| 2009/0149256 | A1 * | 6/2009 | Lui | A63F 13/98<br>463/37 |
| 2016/0361637 | A1 * | 12/2016 | Higgins | A63F 13/213 |
| 2017/0192506 | A1 * | 7/2017 | Andersen | G06F 3/011 |
| 2018/0000205 | A1 * | 1/2018 | Chinowsky | G06F 1/1694 |
| 2018/0099219 | A1 * | 4/2018 | Hope | A63F 13/218 |
| 2018/0108179 | A1 * | 4/2018 | Tomlin | G06F 3/0346 |
| 2018/0329484 | A1 * | 11/2018 | Steedly | G06F 3/04815 |
| 2022/0362659 | A1 * | 11/2022 | Wu | G06F 3/0304 |
| 2024/0220025 | A1 * | 7/2024 | Nouri | G06F 3/0346 |

FOREIGN PATENT DOCUMENTS

| | | | |
|---|---|---|---|
| JP | 2018-045338 | A | 3/2018 |
| JP | 2020-154452 | A | 9/2020 |
| WO | 2017/213818 | A1 | 12/2017 |
| WO | 2020/189450 | A1 | 9/2020 |

OTHER PUBLICATIONS

International Search Report and Written Opinion mailed on Nov. 30, 2021, received for PCT Application PCT/JP2021/034845, filed on Sep. 22, 2021, 9 pages including English Translation.

* cited by examiner

INPUT DEVICE

CROSS-REFERENCE TO RELATED APPLICATION

The present application is based on PCT filing PCT/JP2021/034845, filed Sep. 22, 2021, the entire contents of which are incorporated herein by reference.

TECHNICAL FIELD

The present disclosure relates to an input device that allows the position and posture thereof to be tracked through a camera when in use.

BACKGROUND ART

There is a technique in which a to-be-tracked point that emits light is provided on an outer surface of an input device, and the to-be-tracked point is detected through a camera to track the position and posture of the input device. PTL 1 listed below discloses an input device used for game operation and provided with a spherical to-be-tracked point. Video of the input device of PTL 1 is captured by a camera attached to, for example, a television, and the position and posture of the input device are computed from the video.

CITATION LIST

Patent Literature

[PTL 1]
Japanese Patent Laid-open No. 2011-164932

SUMMARY

Technical Problem

In a system such as one described in PTL 1, it is important that the to-be-tracked point can be detected through the camera regardless of the position and posture of the input device. In addition, a system in which a camera that captures video of an input device is installed in a head-mounted display, unlike in PTL 1, and the position and posture of the input device are computed from the video obtained through the camera, has been under study. Also in such a system, it is important that a to-be-tracked point can be detected through the camera regardless of the position and posture of the input device.

A system in which, unlike in PTL 1, a plurality of to-be-tracked points arranged apart from one another are disposed on an outer surface of an input device, and the positions of the plurality of to-be-tracked points are detected through a camera to compute the position and posture of the input device, has been under study. If the number of to-be-tracked points is increased in such an input device, the number of parts thereof is increased, leading to reduced workability in assembling the input device.

Solution to Problem (1) An example of an input device proposed in the present disclosure includes a grip extending in a first direction, a plurality of to-be-tracked points each of which emits light, a first portion positioned on one side of the grip in the first direction and having an operating member to be operated by a finger disposed therein, and a second portion positioned on another side of the grip in the first direction and having the plurality of to-be-tracked points positioned therein. A width of the second portion in a second direction intersecting the first direction is greater than a width of the grip in the second direction.

This input device allows a large number of to-be-tracked points to be disposed in the second portion. This makes it possible to properly recognize the position and posture of the input device in the case where the input device is placed in such a posture that the second portion faces a camera.

(2) Another example of an input device proposed in the present disclosure includes a grip extending in a first direction, a first portion positioned on one side of the grip in the first direction and having a plurality of to-be-tracked points each of which emits light disposed therein, and a second portion positioned on another side of the grip in the first direction and having a plurality of to-be-tracked points each of which emits light disposed therein. A width of the first portion in a second direction intersecting the first direction is greater than a width of the first portion in a third direction intersecting both the first direction and the second direction, and a width of the second portion in the third direction is greater than a width of the second portion in the second direction.

This input device allows the direction in which the to-be-tracked points are arranged in the first portion to be different from the direction in which the to-be-tracked points are arranged in the second portion. As a result, even in the case where it is difficult to compute the position and posture of the input device through the to-be-tracked points in one of the above portions (e.g., the first portion), the to-be-tracked points in the other portion (e.g., the second portion) can be used to compute the position and posture of the input device, which leads to improved accuracy in recognition of the posture and position of the input device.

(3) Yet another example of an input device proposed in the present disclosure includes a grip extending in an up-down direction and a plurality of to-be-tracked points each of which emits light. At least one of the plurality of to-be-tracked points is disposed in the grip and is displaced rightward or leftward with respect to a center line of the grip, the center line extending along the up-down direction and passing through a center of the grip in a left-right direction. Here, the term "up-down direction" is used to describe relative positions of portions of the input device and should not be construed as specifying the posture of the input device when in use.

This input device makes it possible to recognize the position and posture of the input device by using the to-be-tracked point or points in the grip even in the case where the input device is placed in such a posture that an outer surface of the grip faces a camera, which leads to improved accuracy in recognition thereof.

(4) Yet another example of an input device proposed in the present disclosure includes an operating member to be operated by a finger, a plurality of to-be-tracked points each of which emits light, and a front surface having an operating member region and a to-be-tracked region, the operating member region having the operating member disposed therein, the to-be-tracked region having the plurality of to-be-tracked points disposed therein along an edge of the operating member region. The front surface has a shoulder between the operating member region and the to-be-tracked region.

This input device is able to prevent a finger operating the operating member disposed on the front surface of the input device from overlapping any of the to-be-tracked points.

(5) Yet another example of an input device proposed in the present disclosure includes a grip extending in a first direction, a plurality of to-be-tracked points each of which emits light, a first portion positioned on one side of the grip in the first direction and having some of the plurality of to-be-tracked points disposed therein, a second portion positioned on another side of the grip in the first direction, an extension portion extending from the first portion toward the second portion, being apart from the grip in a second direction intersecting the first direction, and having another or others of the plurality of to-be-tracked points disposed therein, and a flexible board extending from the first portion to the extension portion and having a light source or light sources for the plurality of to-be-tracked points mounted thereon.

This input device is able to achieve a reduction in the number of parts of the input device.

DESCRIPTION OF EMBODIMENTS

Hereinafter, examples of input devices proposed in the present disclosure will be described. In the present specification, directions indicated by “Z1” and “Z2” in FIG. 2A will be referred to as an upward direction and a downward direction, respectively; directions indicated by "X1" and "X2" in FIG. 2A will be referred to as a rightward direction and a leftward direction, respectively; and directions indicated by "Y1" and "Y2" in FIG. 2C will be referred to as a forward direction and a rearward direction, respectively. These directions are used to describe relative positions of portions, members, elements, and so on of the input devices and should not be construed as specifying the posture of or the way of holding the input devices when in use.

(System Outline)

Figure 1:
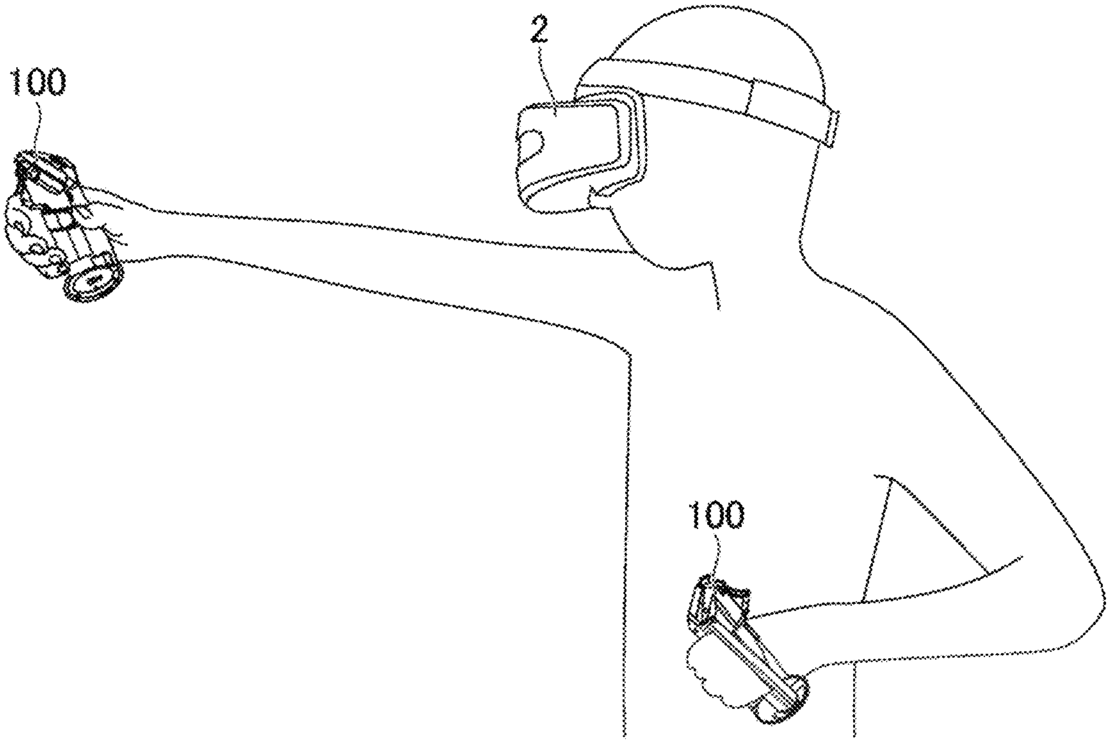
FIG. 1 is a diagram for explaining an example of a system in which an input device proposed in the present disclosure is used.

As illustrated in FIG. 1, input devices 100 are, for example, used together with a head-mounted display (HMD) 2. A user wears the HMD 2 on the head and holds the input device(s) 100 with a right hand and/or a left hand. The HMD 2 has a camera 2*a* facing forward. Each input device 100 is provided with a plurality of to-be-tracked points H, which will be described below. The positions of the to-be-tracked points H are detected through the camera 2*a*, and the position and posture of the input device 100 (i.e., the position and orientation of a hand of the user) are computed on the basis of the detected positions of the to-be-tracked points. As described below, the input device 100 has a plurality of operating members (e.g., an operation button, an operation stick, a touch sensor, and the like) to be operated by the user with fingers. A moving image (e.g., a game image) generated on the basis of the position and posture of the input device 100 and an operation performed on any operating member is displayed on a display portion of the HMD 2.

The computation of the position and posture of the input device 100 may be performed either by an information processing apparatus installed in the HMD 2 or by an external information processing apparatus (e.g., a personal computer or a game apparatus separate from the HMD 2). The input device 100 may have a motion sensor (e.g., an acceleration sensor or a gyro sensor). The information processing apparatus may compute the position and posture of the input device 100 on the basis of not only the positions of the to-be-tracked points H but an output from the motion sensor. In addition, the generation of the moving image may also be performed either by the information processing apparatus installed in the HMD 2 or by the external information processing apparatus. In the case where the computation of the position and the like of the input device 100 and the generation of the moving image are performed by the external information processing apparatus, image information acquired by the camera 2*a* is transmitted to the external information processing apparatus in a wireless or wired manner, and moving image information generated is transmitted from the external information processing apparatus to the HMD 2 in a wireless or wired manner. Note that, unlike in an example system illustrated in FIG. 1, the input device 100 may be used independently of the HMD 2. In this case, a camera for tracking the position and posture of the input device 100 may be attached to an external display apparatus (e.g., a monitor of a personal computer or a television) that displays a moving image generated on the basis of the position and posture of the input device 100.

The external shape of an input device designed to be used by a right hand and the external shape of an input device designed to be used by a left hand are symmetrical with each other. The input devices for the left and right hands may be different in the number and/or types of operating members disposed in the input devices. The description in the present specification is provided with focus placed on the input device designed to be used by the right hand.

(External Shape and Operating Members of Input Device)

Figure 2A:
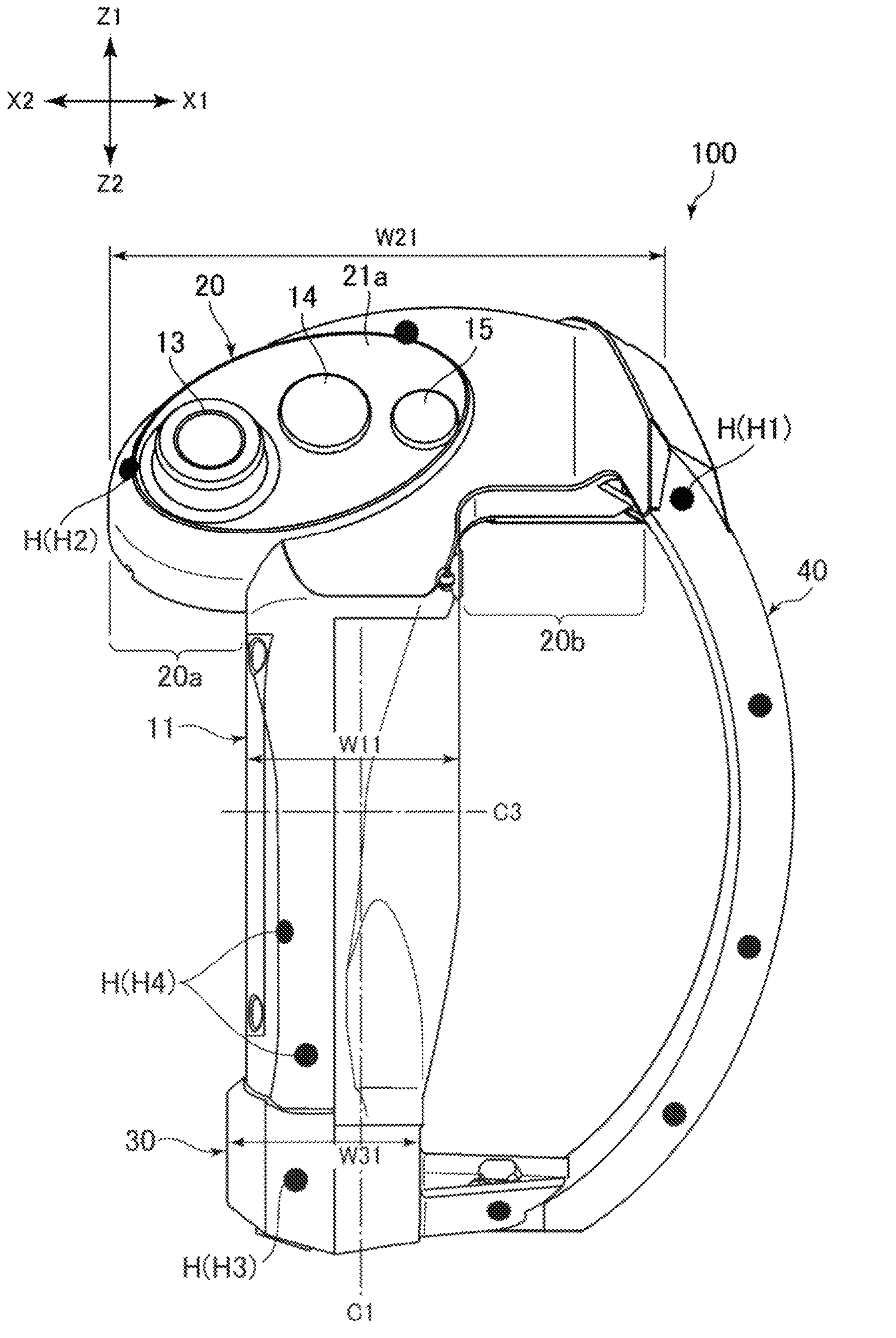
FIG. 2A is a front view illustrating a first example of an input device proposed in the present disclosure.

As illustrated in FIG. 2A, the input device 100 has a grip 11, an upper portion 20 positioned on the upper side of the grip 11, and a lower portion 30 positioned on the lower side of the grip 11. The grip 11 is a portion to be held by, for example, a thenar, a middle finger, a ring finger, and a little finger with a palm of the user touching a side surface thereof when the user is gripping the grip 11. The upper portion 20 and the lower portion 30 are each joined to an end portion of the grip 11. A plurality of operating members 13 to 16 are provided in the upper portion 20 and are positioned upward of the grip 11. The operating members 13 to 16 are each capable of being operated by, for example, a thumb or an index finger.

Figure 2B:
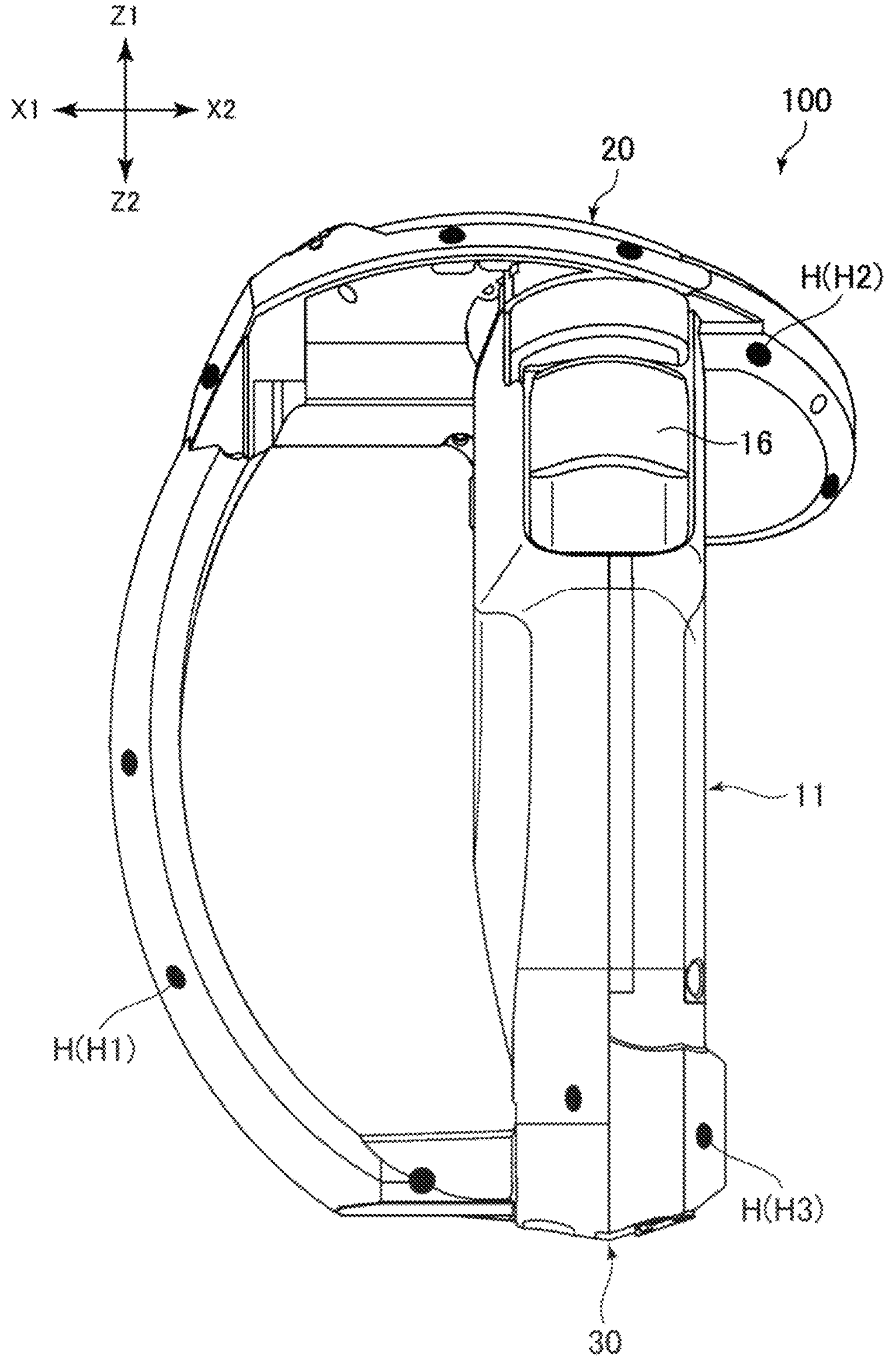
FIG. 2B is a rear view illustrating the first example of the input device.

As illustrated in FIG. 2A, as the operating members, an operation stick 13 and operation buttons 14 to 16, for example, are disposed in the upper portion 20. The operation stick 13 and the operation buttons 14 and 15 are disposed on a front surface 21*a* of the upper portion 20 and are operated by, for example, the thumb. The operation stick 13 is an operating member capable of being tilted in a radial direction and of being slid. The operation button 16 is disposed on a rear side of the upper portion 20 (see FIG. 2B) and is operated by, for example, the index finger. The operating members provided in the upper portion 20 are not limited to the examples described here and may include, for example, a touch sensor, a trigger button, and/or a button equipped with a touch sensor. Also note that the number of operating members provided in the upper portion 20 may be one, two, or four or more.

The input device 100 has an extension portion 40 extending from one of the upper portion 20 and the lower portion 30 toward the other and being laterally apart from the grip 11. In other words, the extension portion 40 is curved in such a manner as to bulge outward in a left-right direction, and an intermediate portion of the extension portion 40 is apart from the grip 11. In the example of the input device 100, the intermediate portion of the extension portion 40 is apart from the grip 11 to the right. A space into which the right hand of the user can be inserted is secured between the grip 11 and the intermediate portion of the extension portion 40. Opposite ends of the extension portion 40 are joined to the upper portion 20 and the lower portion 30, respectively, and the extension portion 40, the upper portion 20, the lower portion 30, and the grip 11 together form a closed loop.

(To-Be-Tracked Points)

As illustrated in FIG. 2A, a plurality of to-be-tracked points H are disposed on an outer surface of the input device 100 (in the figure, the to-be-tracked points are represented by black dots). Each of the to-be-tracked points H emits light. As described below, the input device 100 has, for example, a light emitting diode (LED) as a light source for the to-be-tracked points H. Such a light source may be disposed at each of the positions of the to-be-tracked points H, or alternatively, the positions of the to-be-tracked points H may correspond to the positions of light guide tubes (i.e., the positions of light exit surfaces of light guide tubes) that guide light from the light source to the to-be-tracked points H.

In the example of the input device 100, the to-be-tracked points H are disposed in each of the extension portion 40, the upper portion 20, the lower portion 30, and the grip 11, as described below. In the present specification and figures, reference sign H1 is assigned to the to-be-tracked points in the extension portion 40, reference sign H2 is assigned to the to-be-tracked points in the upper portion 20, reference sign H3 is assigned to the to-be-tracked points in the lower portion 30, and reference sign H4 is assigned to the to-be-tracked points in the grip 11. In the following description in the present specification, reference sign H is used for the to-be-tracked points unless the to-be-tracked points H1, H2, H3, and H4 need to be differentiated from one another.

(Extension Portion)

Figure 2C:
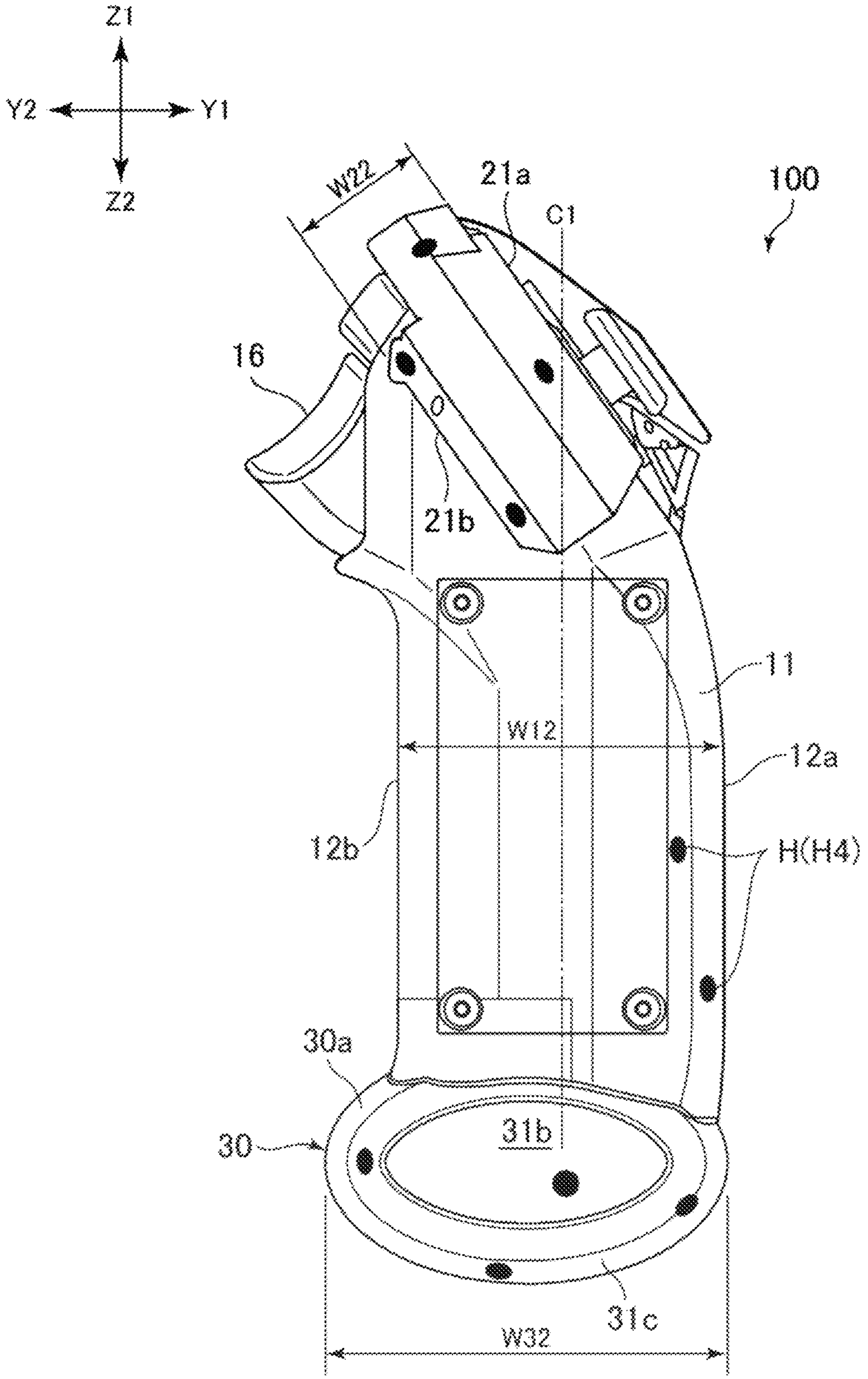
FIG. 2C is a left side view of the first example of the input device.
Figure 2D:
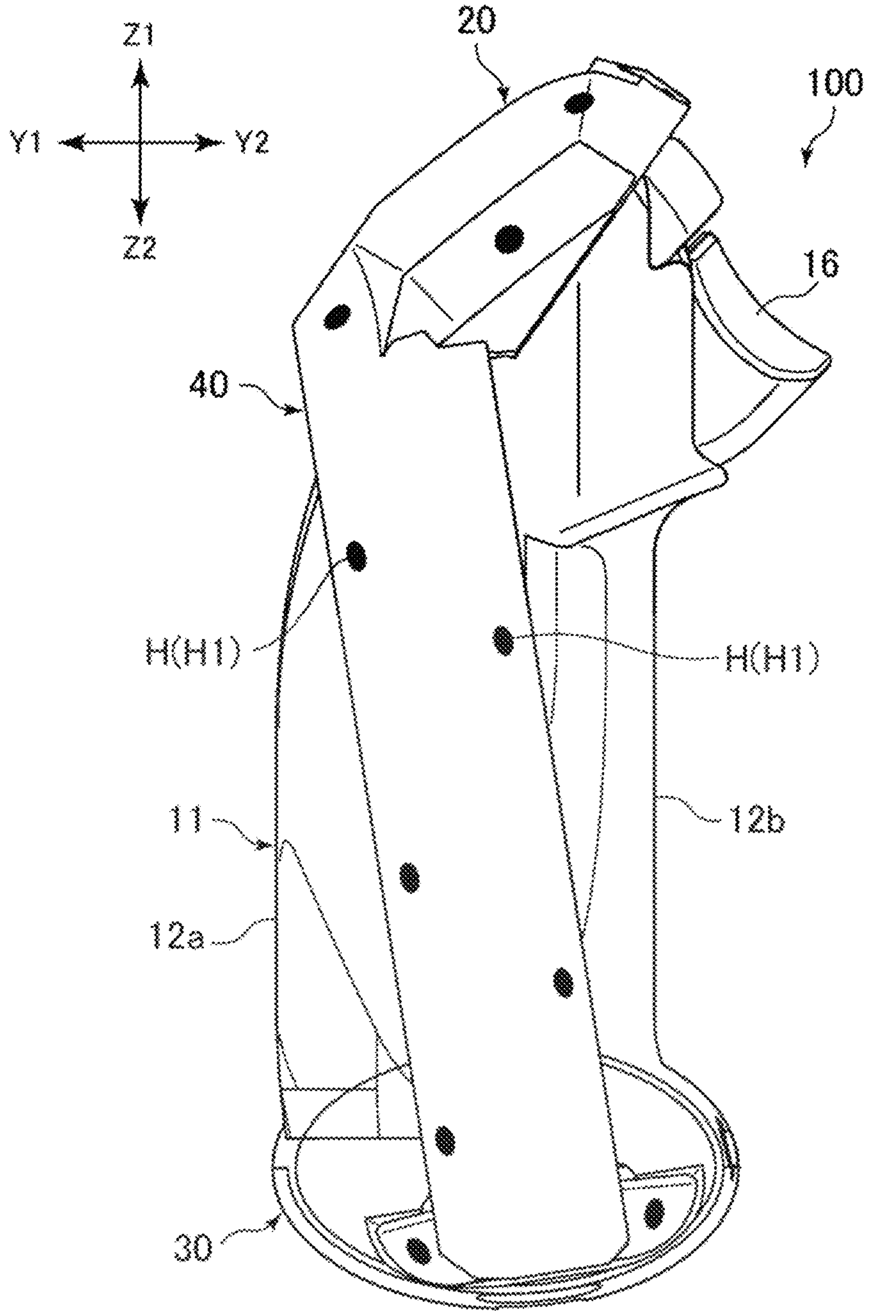
FIG. 2D is a right side view of the first example of the input device.

As illustrated in FIG. 2D, the extension portion 40 has a plurality of to-be-tracked points H1 on an outer surface thereof (here, the "outer surface" refers to a surface on a side opposite to the grip 11 in the left-right direction). The to-be-tracked points H1 are distributed throughout the outer surface of the extension portion 40. This leads to improved accuracy in recognition of the position and posture of the input device 100 through the camera 2*a*. The to-be-tracked points H1 are arranged in a plurality of lines in an up-down direction. In the example of the input device 100, the to-be-tracked points H1 are arranged in two lines. The positions (heights) of the to-be-tracked points H1 in the forward line are different from the positions (heights) of the to-be-tracked points H1 in the rearward line. Specifically, the height of a to-be-tracked point H1 in the forward line is approximately midway between the heights of two to-be-tracked points H1 in the rearward line. This reduces the likelihood that two to-be-tracked points H1 will overlap when the to-be-tracked points H1 are viewed through the camera 2*a*. Note that the arrangement of the to-be-tracked points H1 in the extension portion 40 is not limited to the example illustrated in the figures, and that the to-be-tracked points H1 may be arranged in, for example, one line or three or more lines.

(Upper Portion of Input Device)

The upper portion 20 has a plurality of to-be-tracked points H2 on an outer surface thereof. As illustrated in FIG. 2A, in a front view of the input device 100, the width W21 of the upper portion 20 in the left-right direction is greater than the width W11 of the grip 11. This contributes to ensuring a sufficient number of to-be-tracked points H2 while hiding the distance between two adjacent ones of the to-be-tracked points H2. This, in turn, leads to improved accuracy in the recognition of the position and posture of the input device 100 through the camera 2*a*.

In the example of the input device 100, the upper portion 20 has a left projecting portion 20*a* projecting in a direction away from the extension portion 40. The left projecting portion 20*a* projects to the left relative to a left side surface of the grip 11. This shape of the upper portion 20 makes it easier to ensure a sufficient area of a region in which the to-be-tracked points H2 are disposed. In addition, the upper portion 20 has a right projecting portion 20*b* projecting to the right relative to a right side surface of the grip 11. The extension portion 40 is joined to the right projecting portion 20*b*. Unlike in the example of the input device 100, the upper portion 20 may have only one of the left projecting portion 20*a* and the right projecting portion 20*b*.

The width W21 (see FIG. 2A) of the upper portion 20 in the left-right direction is greater than the width W22 (see FIG. 2C) of the upper portion 20 in a front-rear direction. This makes it easier to arrange a plurality of to-be-tracked points H2 in the left-right direction in the upper portion 20. Note that, in this description, "the width W22 of the upper portion 20 in the front-rear direction" corresponds to the distance between a front surface of the projecting portion 20*a* or 20*b* and a rear surface of the projecting portion 20*a* or 20*b*. In the example of the input device 100, in a side view of the input device 100, the width W22 of the upper portion 20 in the front-rear direction is substantially equal to the width 12 of the grip 11 in the front-rear direction or smaller than the width W12 of the grip 11 in the front-rear direction (see FIG. 2C).

Figure 2E:
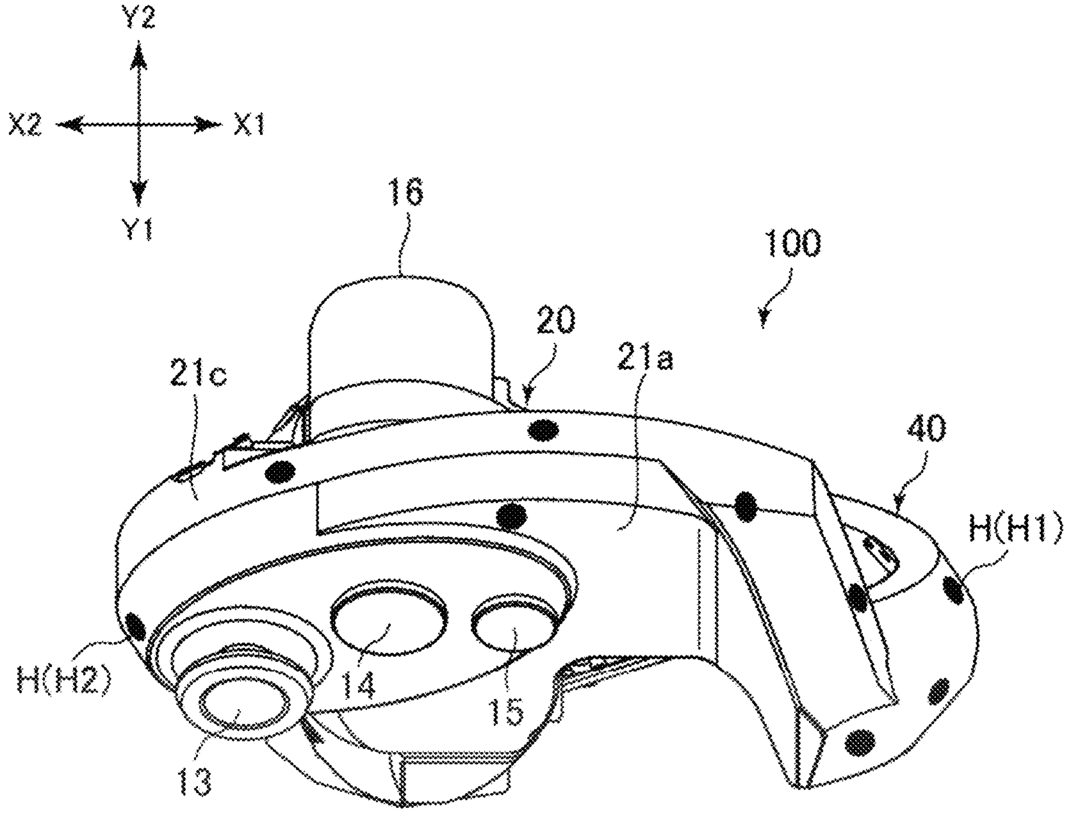
FIG. 2E is a plan view illustrating the first example of the input device.
Figure 2F:
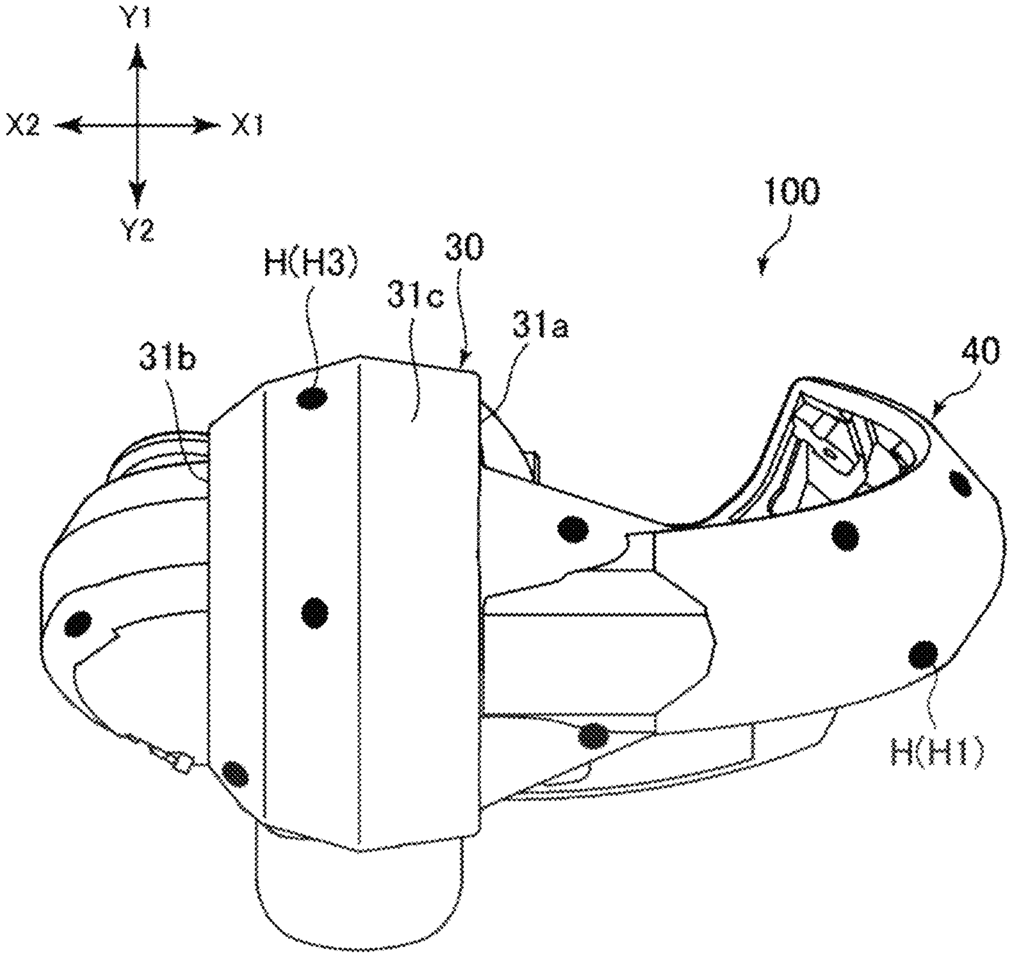
FIG. 2F is a bottom view illustrating the first example of the input device.

As illustrated in FIG. 2E, the upper portion 20 has the front surface 21*a* on which the plurality of operating members 13 to 15 are disposed. A plurality of to-be-tracked points H2 are arranged along an edge of the front surface 21*a*. In the example of the input device 100, the upper portion 20 is substantially elliptical in a front view and has a curved surface 21*c* between the edge of the front surface 21*a* and an edge of a rear surface 21*b* (rear surfaces of the projecting portions 20*a* and 20*b*). The curved surface 21*c* has portions that form a left side surface, an upper surface, and a right surface of the upper portion 20. A plurality of to-be-tracked points H2 arranged in the left-right direction in a plan view are disposed on the curved surface 21*c*. The to-be-tracked points H2 are, for example, arranged in one line in a plan view of the input device 100.

The shape of the upper portion 20 and the arrangement of the to-be-tracked points H2 are not limited to those described here. For example, the upper portion 20 may be rectangular or circular in a front view. The to-be-tracked points H2 may be disposed not only on the curved surface 21*c* but on the front surface 21*a* and/or the rear surface 21*b*. The to-be-tracked points H2 may be arranged in two or three lines.

(Lower Portion of Input Device)

The lower portion 30 has a plurality of to-be-tracked points H3 on an outer surface thereof. This makes it possible to recognize the position and posture of the input device 100 even in the case where the input device 100 is placed in such a posture that the lower portion 30 faces the camera 2*a*. As illustrated in FIG. 2C, in the side view of the input device 100, the width W32 of the lower portion 30 in the front-rear direction is greater than the width W12 of the grip 11. This contributes to ensuring a sufficient number of to-be-tracked points H3 while hiding the distance between two adjacent ones of the to-be-tracked points H3. This, in turn, leads to improved accuracy in the recognition of the position and posture of the input device 100 through the camera 2*a*.

In the example of the input device 100, the lower portion 30 has a rear projecting portion 30*a* projecting rearward relative to a rear surface 12*b* of the grip 11. This shape of the lower portion 30 makes it easier to ensure a sufficient area of a region in which the to-be-tracked points H3 are disposed. Unlike in the input device 100, the lower portion 30 may have a front projecting portion projecting forward relative to a front surface 12*a* of the grip 11 in place of the rear projecting portion 30*a* or in addition to the rear projecting portion 30*a*.

The width W32 (see FIG. 2C) of the lower portion 30 in the front-rear direction is greater than the width W31 (see FIG. 2A) of the lower portion 30 in the left-right direction. This makes it easier to arrange the to-be-tracked points H3 in the front-rear direction in the lower portion 30. In addition, in the example of the input device 100, in the front view of the input device 100, the width W31 of the lower portion 30 in the left-right direction is substantially equal to the width W11 of the grip 11 in the left-right direction or smaller than the width W11 of the grip 11 (see FIG. 2A).

As illustrated in FIG. 2C, the lower portion 30 has a curved surface 31*c* extending from the front surface 12*a* of the grip 11 to the rear surface 12*b* of the grip 11 through a lower end of the input device 100. The lower portion 30 is substantially elliptical in the side view of the input device 100, and the curved surface 31*c* has portions that form a front surface, a lower surface, and a rear surface of the lower portion 30. The lower portion 30 has to-be-tracked points H3 disposed on the curved surface 31*c* and arranged in the front-rear direction. These to-be-tracked points H3 are disposed so as to be visually recognizable in the side view of the input device 100. A to-be-tracked point H3 may be disposed on a left side surface 31*b* of the lower portion 30 as well.

The shape of the lower portion 30 and the arrangement of the to-be-tracked points H3 are not limited to those described here. For example, the lower portion 30 may be rectangular or circular in the side view. A to-be-tracked point H3 may be disposed on a right side surface 31*a* of the lower portion 30.

(Orientation of Upper Portion and Orientation of Lower Portion)

The width W21 (see FIG. 2A) of the upper portion 20 in the left-right direction is greater than the width W22 (see FIG. 2C) of the upper portion 20 in the front-rear direction. Meanwhile, the width W32 (see FIG. 2C) of the lower portion 30 in the front-rear direction is greater than the width W31 (see FIG. 2A) of the lower portion 30 in the left-right direction. Thus, the upper portion 20 and the lower portion 30 have a greater width in mutually different directions. This input device 100 allows the direction in which the to-be-tracked points H2 are arranged in the upper portion 20 to be different from the direction in which the to-be-tracked points H3 are arranged in the lower portion 30. As a result, even in the case where it is difficult to compute the position and posture of the input device 100 through the to-be-tracked points H2 in one of the above portions (e.g., the upper portion 20), the to-be-tracked points H3 in the other portion (e.g., the lower portion 30) can be used to compute the position and posture of the input device 100, which leads to improved accuracy in the recognition of the posture and position of the input device 100.

The relations between the widths of the upper portion 20 and the widths of the lower portion 30 are not limited to the examples of the input device 100. The width W22 of the upper portion 20 in the front-rear direction may be greater than the width W21 of the upper portion 20 in the left-right direction, with the width W31 of the lower portion 30 in the left-right direction being greater than the width W32 of the lower portion 30 in the front-rear direction. In yet another example, the longitudinal direction of the lower portion 30 may not be the front-rear direction but may be, for example, a direction at an angle to both the front-rear direction and the left-right direction. Similarly, the longitudinal direction of the upper portion 20 may not be the left-right direction but may be, for example, a direction at an angle to both the front-rear direction and the left-right direction.

(To-Be-Tracked Points in Grip)

In the example of the input device 100, the to-be-tracked points H4 are provided in the grip 11. This makes it possible to recognize the position and posture of the input device 100 by using the to-be-tracked points H4 in the grip 11 even in the case where the input device 100 is placed in such a posture that an outer surface of the grip 11 faces the camera 2*a*, which leads to improved accuracy in the recognition thereof. As illustrated in FIG. 2A, the to-be-tracked points H4 are displaced leftward with respect to a center line C1 of the grip 11, the center line C1 extending along the up-down direction (the center line C1 is a straight line passing through a center of the grip 11 in each of the left-right direction and the front-rear direction). As mentioned above, the input device 100 illustrated in FIG. 2A and so on is a device designed to be used by a right hand. When the grip 11 is gripped by the right hand, a right side of the grip 11 is covered with the hand, while a left side of the grip 11 is partially exposed from the hand. Accordingly, the above arrangement of the to-be-tracked points H4 contributes to preventing the to-be-tracked points H4 from being covered with the hand. The to-be-tracked points H4 may cross the center line C1 while being displaced leftward with respect to the center line C1. In the input device designed to be used by the left hand, the to-be-tracked points H4 are preferably displaced rightward with respect to the center line C1 passing through the center of the grip 11.

As illustrated in FIG. 2C, the to-be-tracked points H4 are displaced forward with respect to the center line C1 extending along the up-down direction. That is, the to-be-tracked points H4 are displaced in a direction toward which the operating members project, with respect to the center line C1. This arrangement of the to-be-tracked points H4 contributes to effectively preventing the to-be-tracked points H4 from being covered with the hand. The to-be-tracked points H4 are away from the center line C1 to the forward side and do not cross the center line C1. The to-be-tracked points H4 are disposed so as to be visually recognizable in both the front view and the side view (i.e., a left side view) of the input device 100.

As illustrated in FIG. 2A, the to-be-tracked points H4 are positioned downward of a center C3 of the grip 11 in the up-down direction. This arrangement of the to-be-tracked points H4 contributes to more effectively preventing the to-be-tracked points H4 from being covered with the hand.

The grip 11 may have a plurality of to-be-tracked points H4 disposed therein. In this case, the number of to-be-tracked points H4 disposed in the grip 11 is smaller than the number of to-be-tracked points H2 disposed in the upper portion 20 and is smaller than the number of to-be-tracked points H3 disposed in the lower portion 30. In the example of the input device 100, two to-be-tracked points H4 are disposed apart from each other in the up-down direction.

(Light Source)

A light source of each to-be-tracked point H is, for example, an LED. The input device 100 has, for example, a plurality of boards (not illustrated) on which LEDs are mounted. Each board is, for example, a rigid board on which one or a plurality of LEDs are mounted. The rigid board is, for example, a paper phenolic board, a paper epoxy board, a glass epoxy board, or the like. The rigid boards are disposed such that the positions of the plurality of LEDs correspond with the respective positions of the plurality of to-be-tracked points H. The input device 100 may have a cover that forms the outer surface thereof and which covers the LEDs and the rigid boards. The cover is a member having a light-transmitting property in its entirety or a member having a light-transmitting property only at the positions of the to-be-tracked points H. Light of the LEDs passes through the positions of the to-be-tracked points H in the cover. The input device 100 may have a light guide member that guides light of the LED to the position of the corresponding to-be-tracked point H in the cover.

As described below, flexible boards may be used as the boards on which the LEDs are mounted. In this case, the input device 100 may have a frame and have a flexible board disposed in such a manner as to be curved along a surface of the frame. In addition, the flexible board and the frame may be covered with the cover described above.

Second Example

FIGS. 3A to 3F are each a diagram illustrating an input device 200, which is a second example of an input device.

In the following description, focus is placed on differences between the input device 100 and the input device 200. Features of the input device 100 may be applied to the input device 200 with respect to matters that will not be described concerning the structure of the input device 200.

Similarly to the input device 100, the input device 200 has a grip 211, an upper portion 220, a lower portion 230, and an extension portion 240. The extension portion 240 has a plurality of to-be-tracked points H1 provided therein, the upper portion 220 has a plurality of to-be-tracked points H2 provided therein, and the lower portion 230 has a plurality of to-be-tracked points H3 provided therein.

Figure 3A:
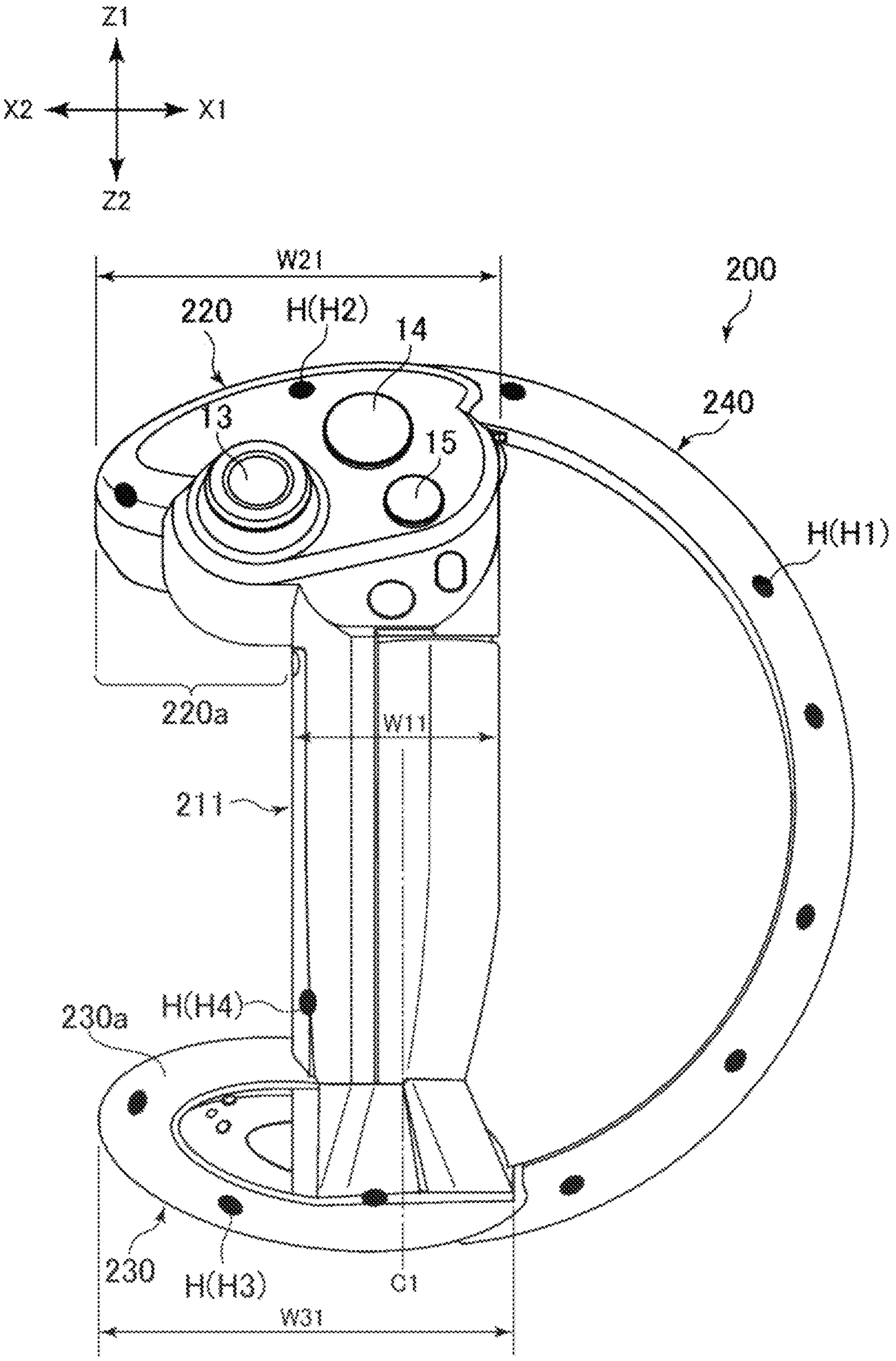
FIG. 3A is a front view illustrating a second example of an input device proposed in the present disclosure.
Figure 3B:
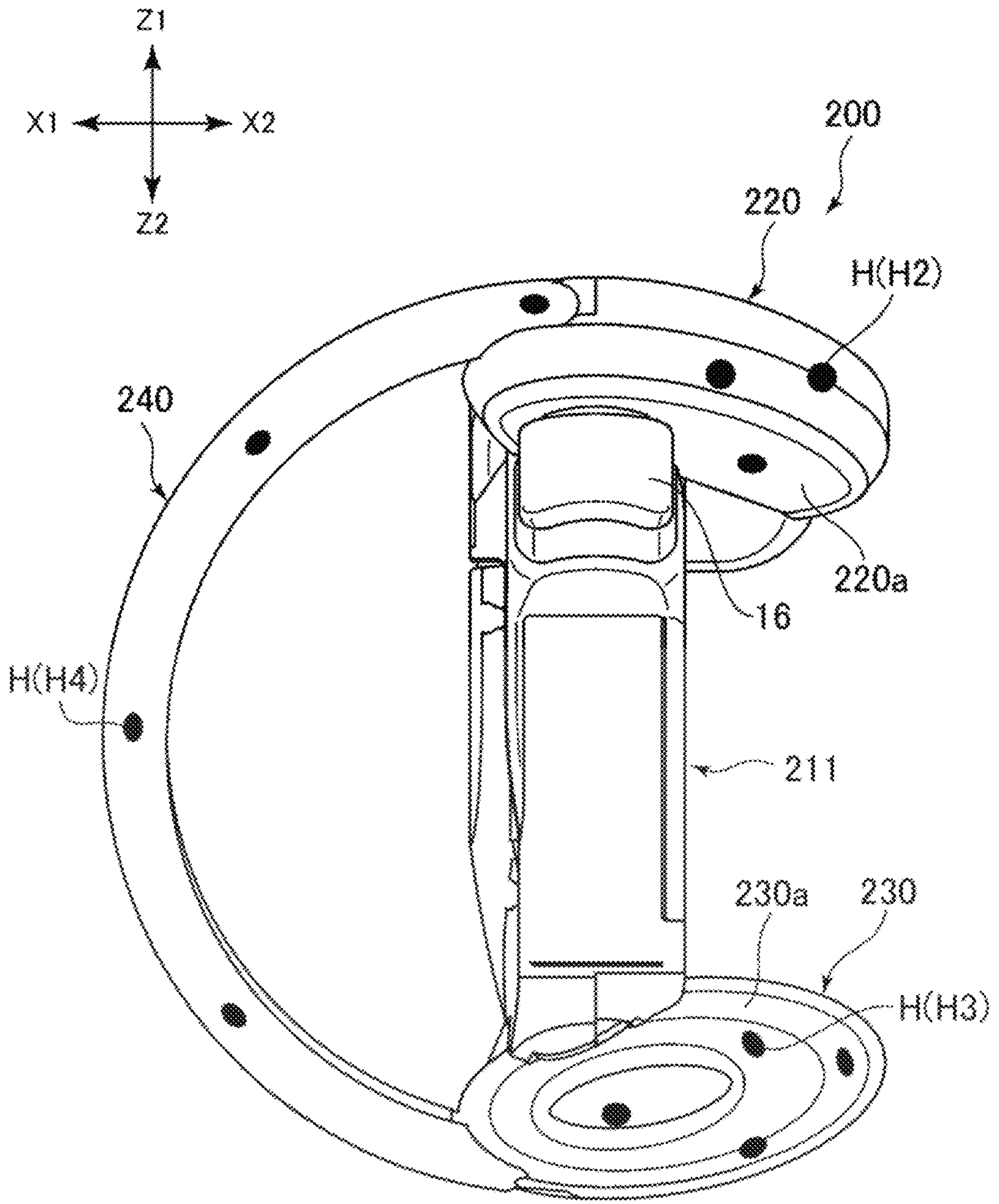
FIG. 3B is a rear view illustrating the second example of the input device.

As illustrated in FIG. 3A, in a front view of the input device 200, the width W21 of the upper portion 220 in the left-right direction is greater than the width 11 of the grip 211. The upper portion 220 has a left projecting portion 220*a*, but, unlike in the example of the input device 100, does not have a portion projecting to the right relative to a right side surface of the grip 211. The width W21 (see FIG. 3A) of the upper portion 220 in the left-right direction is greater than the width W22 (see FIG. 3C) of the upper portion 220 in the front-rear direction. In this description, "the width W22 of the upper portion 220 in the front-rear direction" corresponds to the distance between a front surface of the projecting portion 220*a* and a rear surface of the projecting portion 220*a*.

The input device 200 is different from the input device 100 in the posture of the lower portion. In detail, as illustrated in FIG. 3A, the width W31 of the lower portion 230 in the left-right direction is greater than the width W11 of the grip 211 in the front view of the input device 200. The lower portion 230 has a left projecting portion 230*a*. The lower portion 230 does not have a portion projecting to the right relative to the right side surface of the grip 211. The width W31 (see FIG. 3A) of the lower portion 230 in the left-right direction is greater than the width W32 (see FIG. 3C) of the lower portion 230 in the front-rear direction. This makes it easier to arrange the to-be-tracked points H2 in the left-right direction in the lower portion 230. Thus, in the example of the input device 200, the upper portion 220 and the lower portion 230 have a greater width in the same direction (i.e., the left-right direction).

Figure 3C:
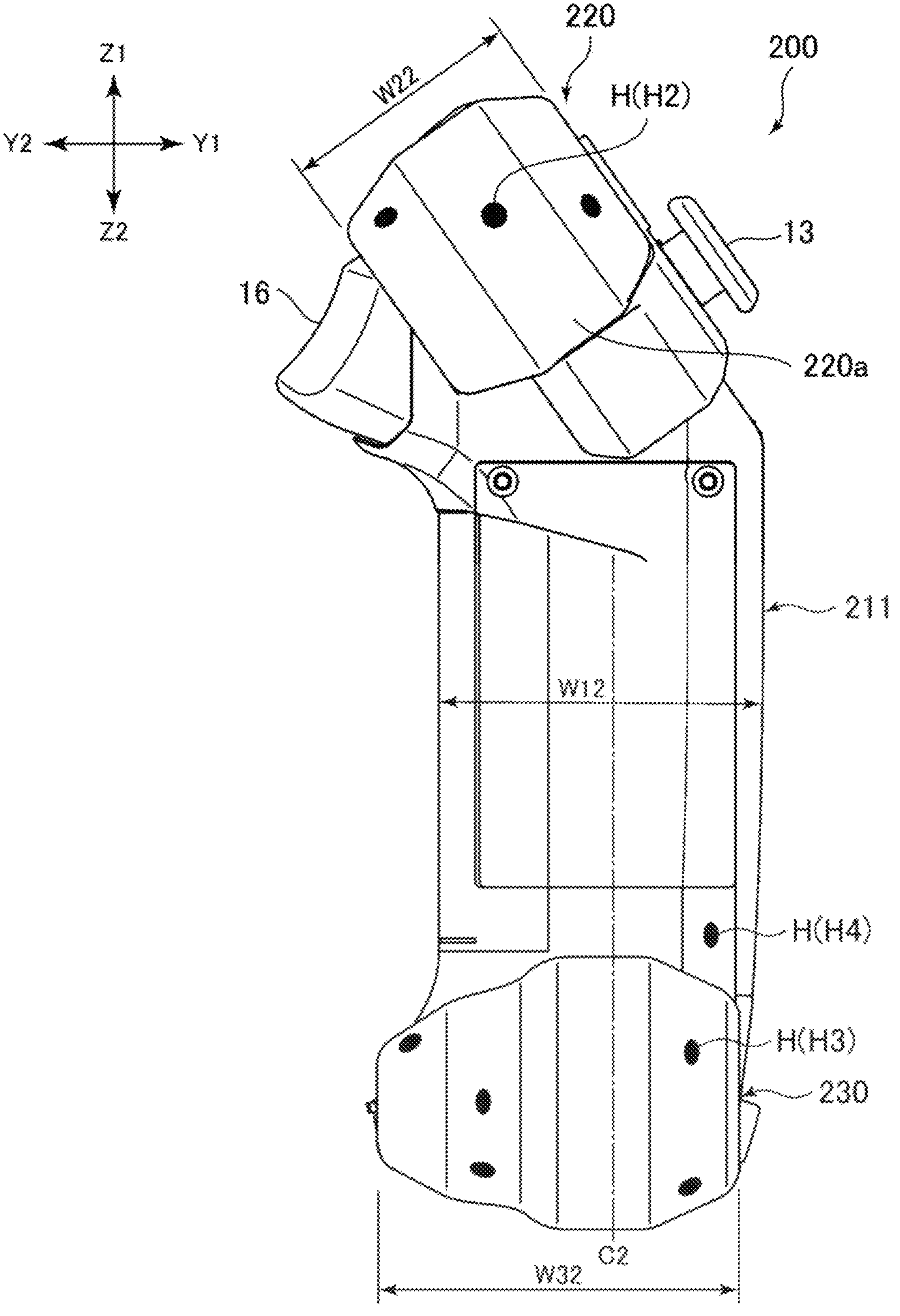
FIG. 3C is a left side view illustrating the second example of the input device.
Figure 3D:
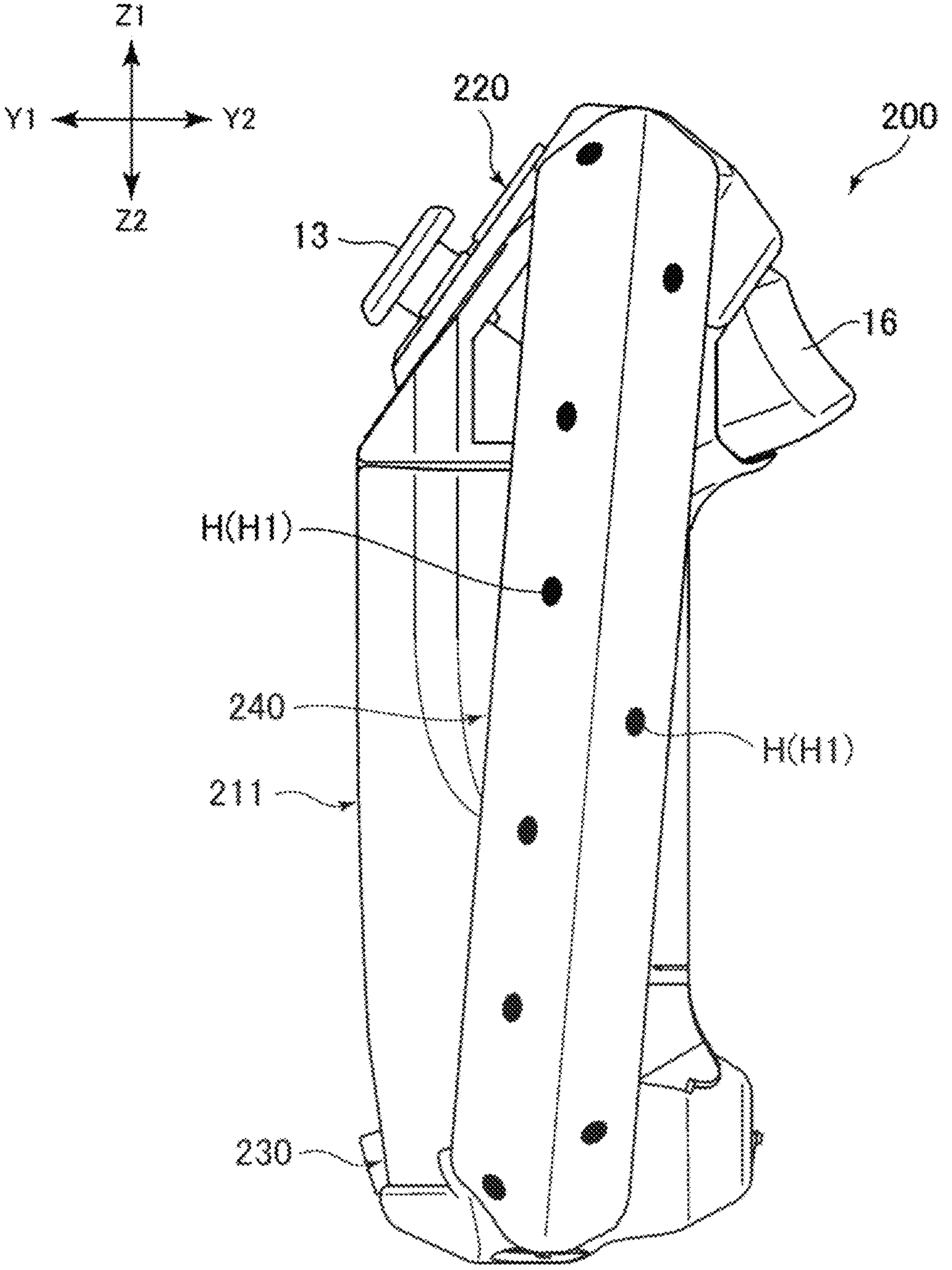
FIG. 3D is a right side view illustrating the second example of the input device.
Figure 3E:
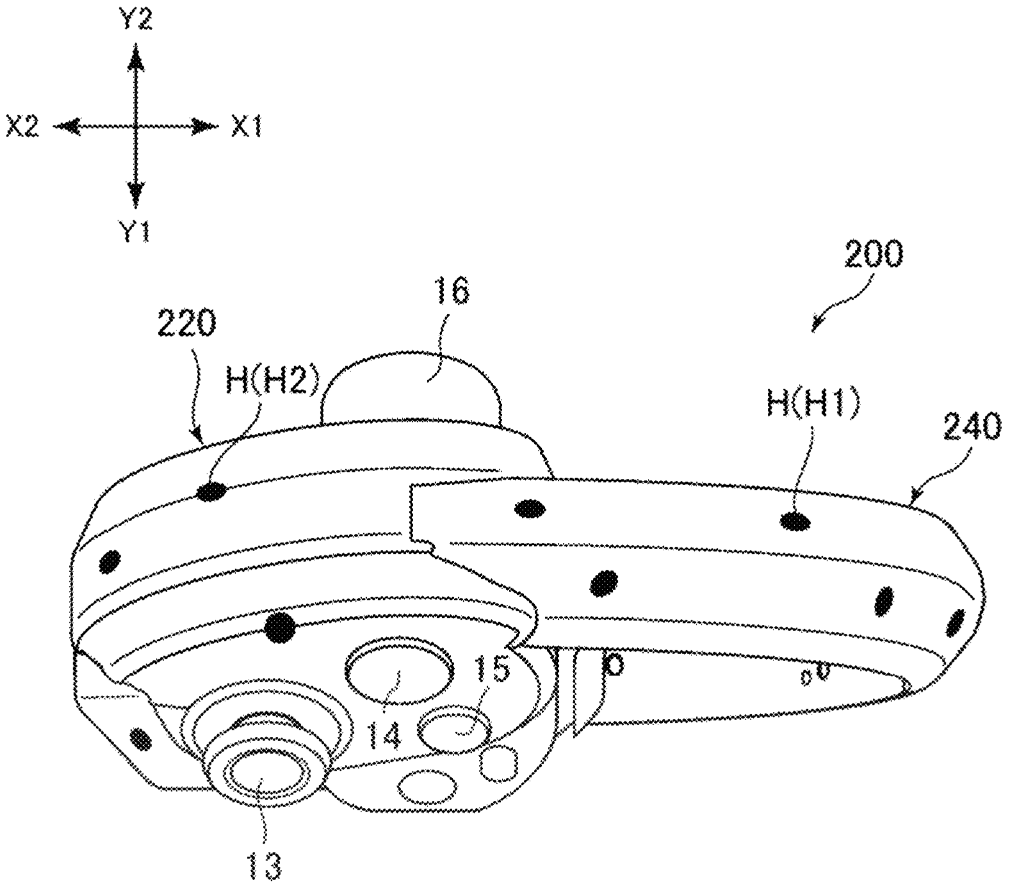
FIG. 3E is a plan view illustrating the second example of the input device.
Figure 3F:
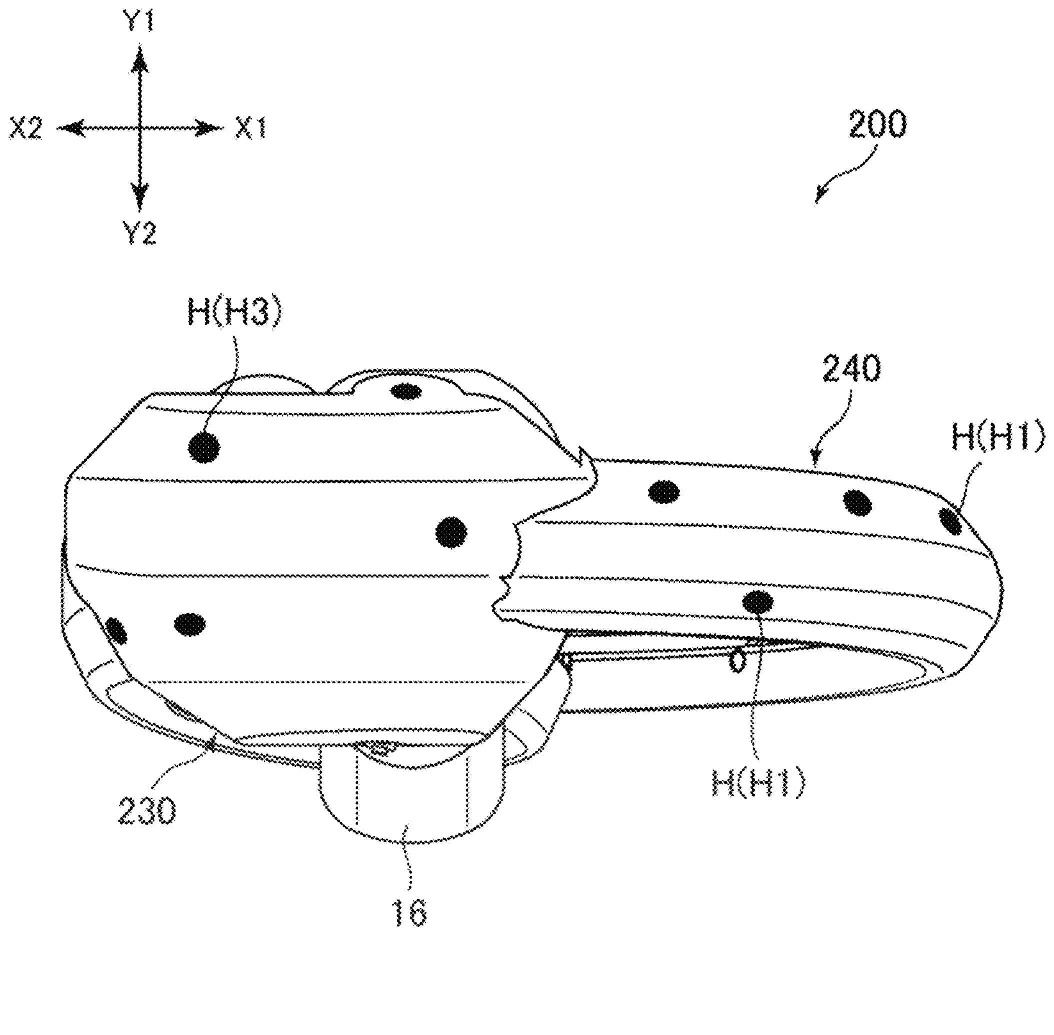
FIG. 3F is a bottom view illustrating the second example of the input device.

As in the input device 100, the grip 211 has a to-be-tracked point H4 disposed therein. The position of the to-be-tracked point H4 is similar to the position thereof in the input device 100, and as illustrated in FIG. 3A, the to-be-tracked point H4 is displaced leftward with respect to a center line C1 extending along the up-down direction. In addition, as illustrated in FIG. 3C, the to-be-tracked point H4 is displaced forward with respect to the center line C1 extending along the up-down direction. Further, the to-be-tracked point H4 is positioned downward of a center of the grip 211 in the up-down direction. In the example of the input device 200, the number of to-be-tracked points H4 disposed in the grip 211 is one. The number of to-be-tracked points H4 may be two or more.

Third Example

FIGS. 4A to 4F are each a diagram illustrating an input device 300, which is a third example of an input device. In the following description, focus is placed on differences between the input devices 100 and 200 and the input device 300. Features of the input devices 100 and 200 may be applied to the input device 300 with respect to matters that will not be described concerning the structure of the input device 300.

The input device 300 has a grip 311, an upper portion 320, and a lower portion 330. The upper portion 320 has a plurality of to-be-tracked points H2 provided therein, and the lower portion 330 has a plurality of to-be-tracked points H3 provided therein.

Unlike the input devices 100 and 200, the input device 300 does not have a portion corresponding to the extension portions 40 and 240 of the input devices 100 and 200. Accordingly, the upper portion 320 and the lower portion 330 are joined to each other only through the grip 311. The input device 300 has a plane P (see FIG. 3A) that intersects the grip 311 at right angles and which does not intersect the input device 300 except at the grip 311. This shape of the input device 300 contributes to reducing the number of parts of the input device 300 (i.e., the number of parts that form a frame of the input device 300).

Figure 4A:
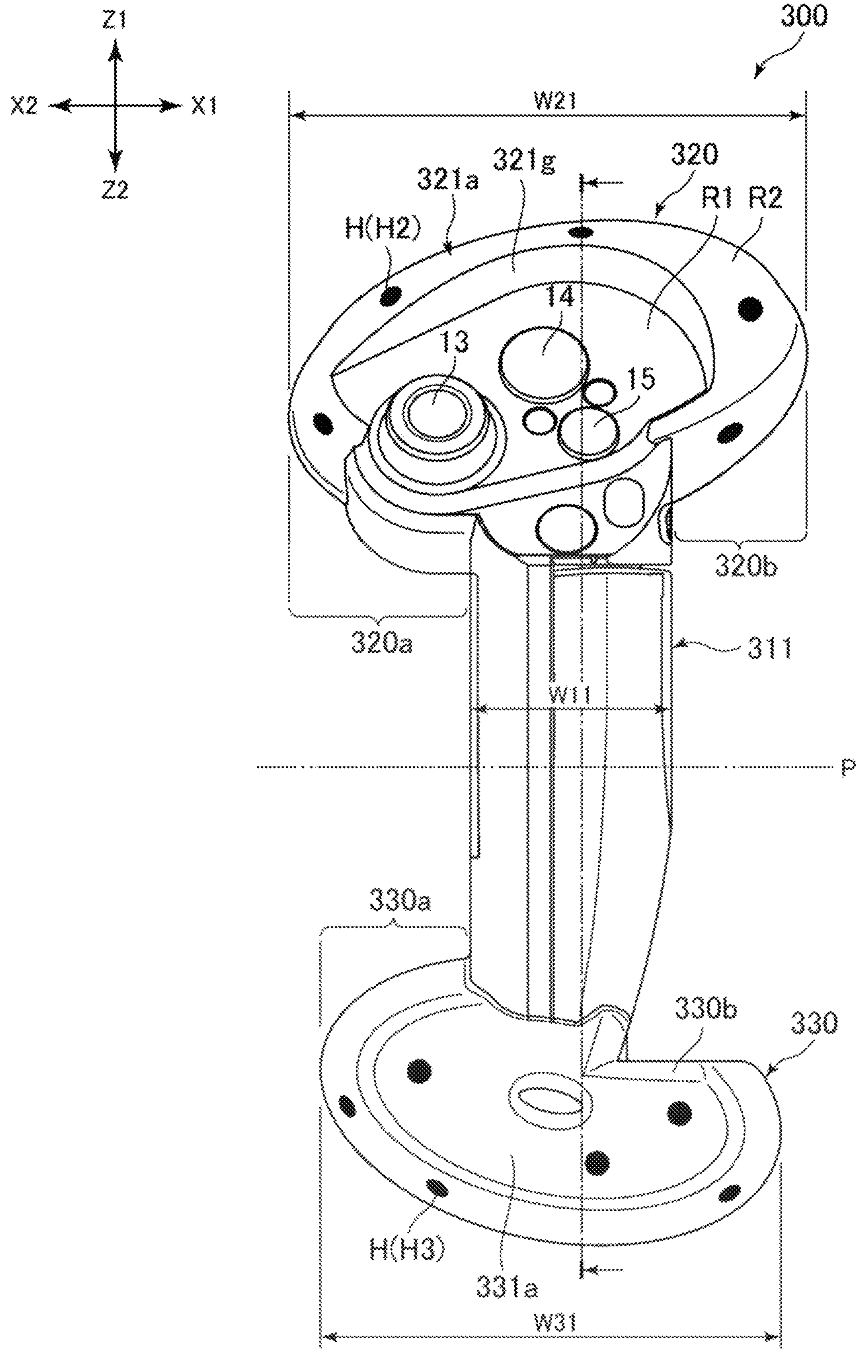
FIG. 4A is a front view illustrating a third example of an input device proposed in the present disclosure.

As illustrated in FIG. 4A, in a front view of the input device 300, the width W21 of the upper portion 320 in the left-right direction is greater than the width W11 of the grip 311. In addition, the upper portion 320 has a left projecting portion 320*a* projecting to the left relative to a left side surface of the grip 311, and a right projecting portion 320*b* projecting to the right relative to a right side surface of the grip 311. More specifically, the right projecting portion 320*b* projects obliquely rightward and upward. The width W21 (see FIG. 4A) of the upper portion 320 in the left-right direction is greater than the width W22 (see FIG. 4C) of the upper portion 320 in the front-rear direction. This makes it easier to arrange the to-be-tracked points H2 in the left-right direction. In this description, "the width W22 of the upper portion 320 in the front-rear direction" corresponds to the distance between a front surface of the projecting portion 320*a* or 320*b* and a rear surface of the projecting portion 320*a* or 320*b*. In addition, as illustrated in FIG. 4C, the width W22 of the upper portion 320 in the front-rear direction is substantially equal to the width W12 of the grip 311 in the front-rear direction or smaller than the width W12 of the grip 311.

Figure 4B:
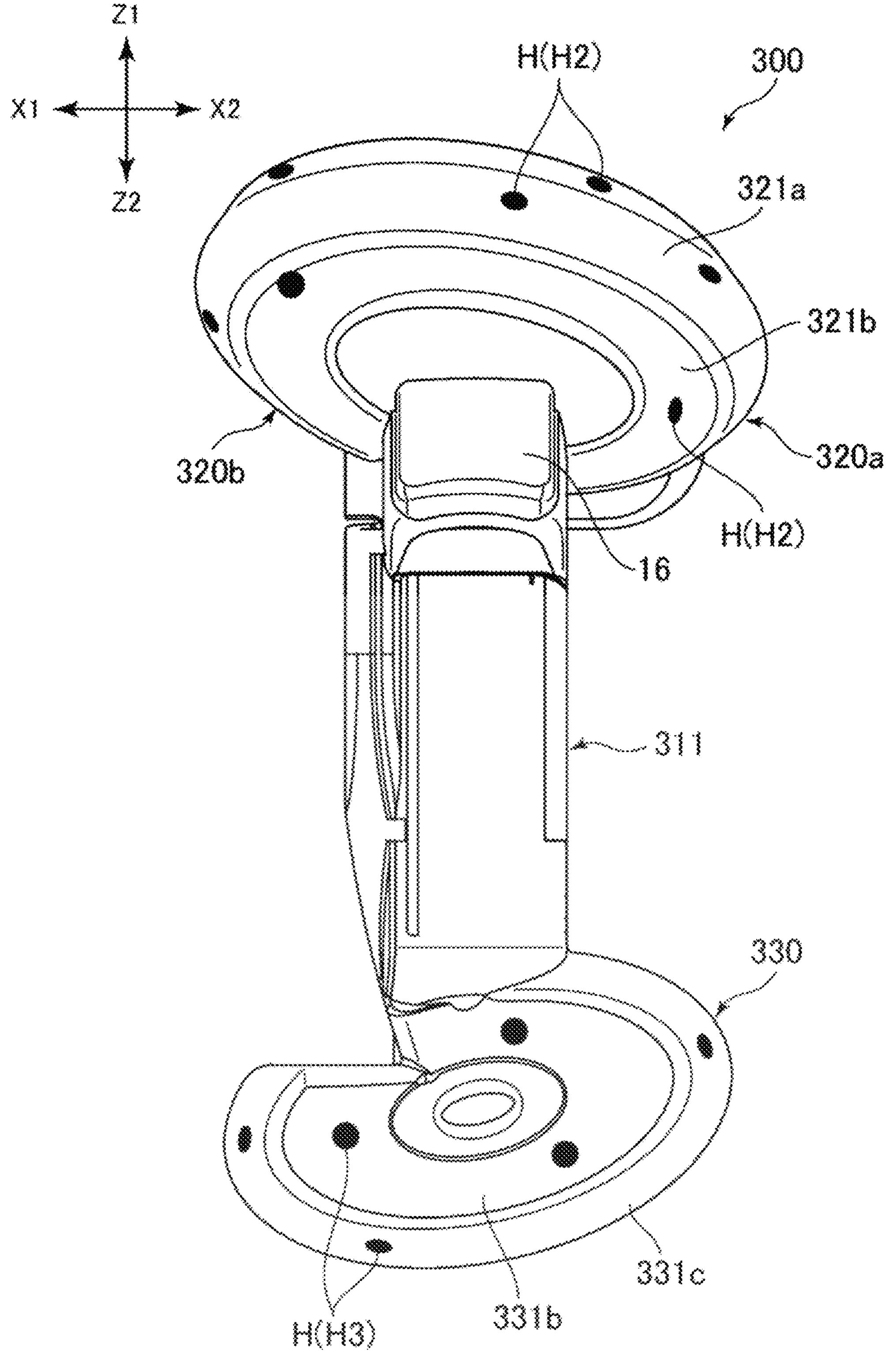
FIG. 4B is a rear view illustrating the second example of the input device.
Figure 4C:
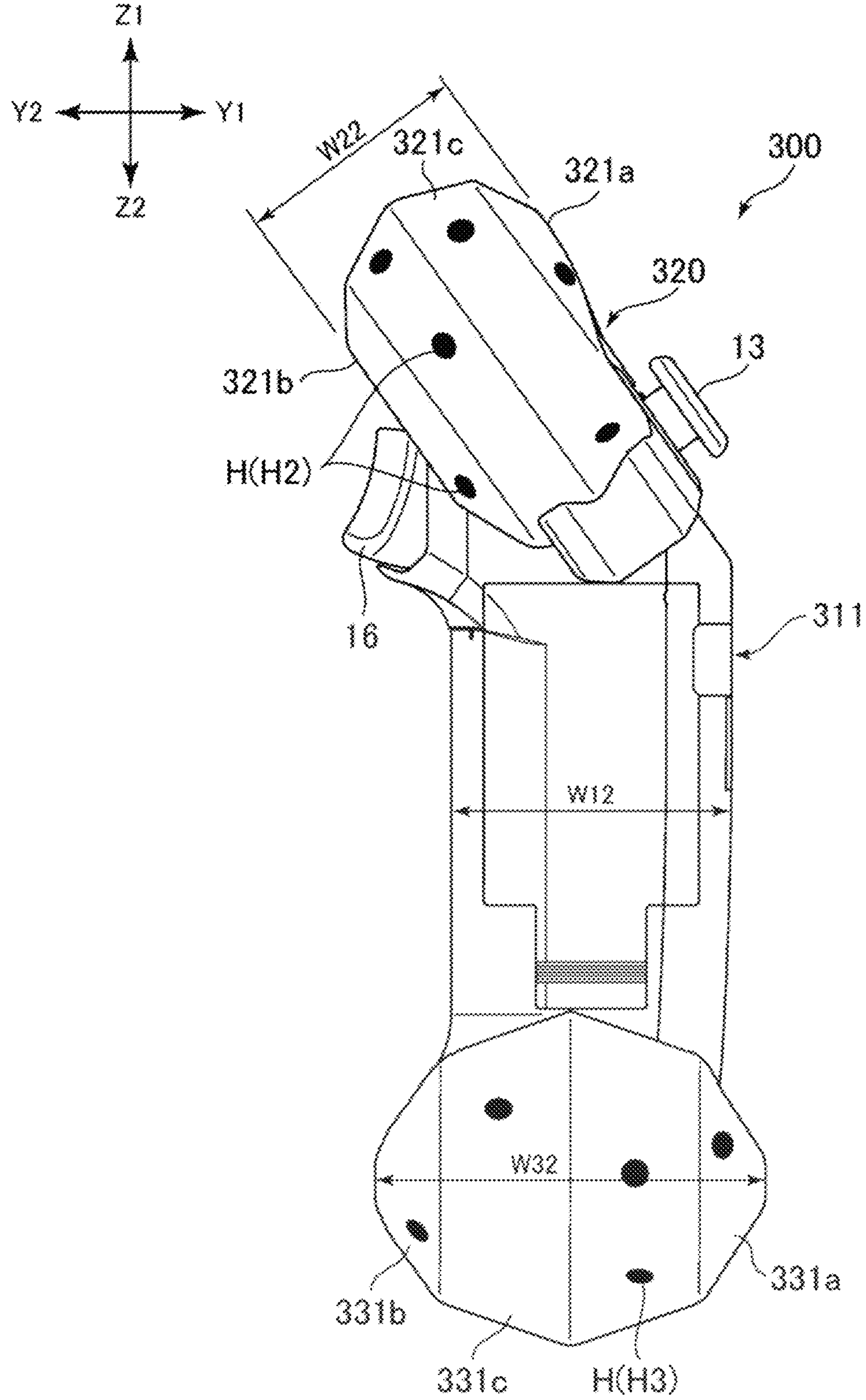
FIG. 4C is a left side view illustrating the second example of the input device.
Figure 4D:
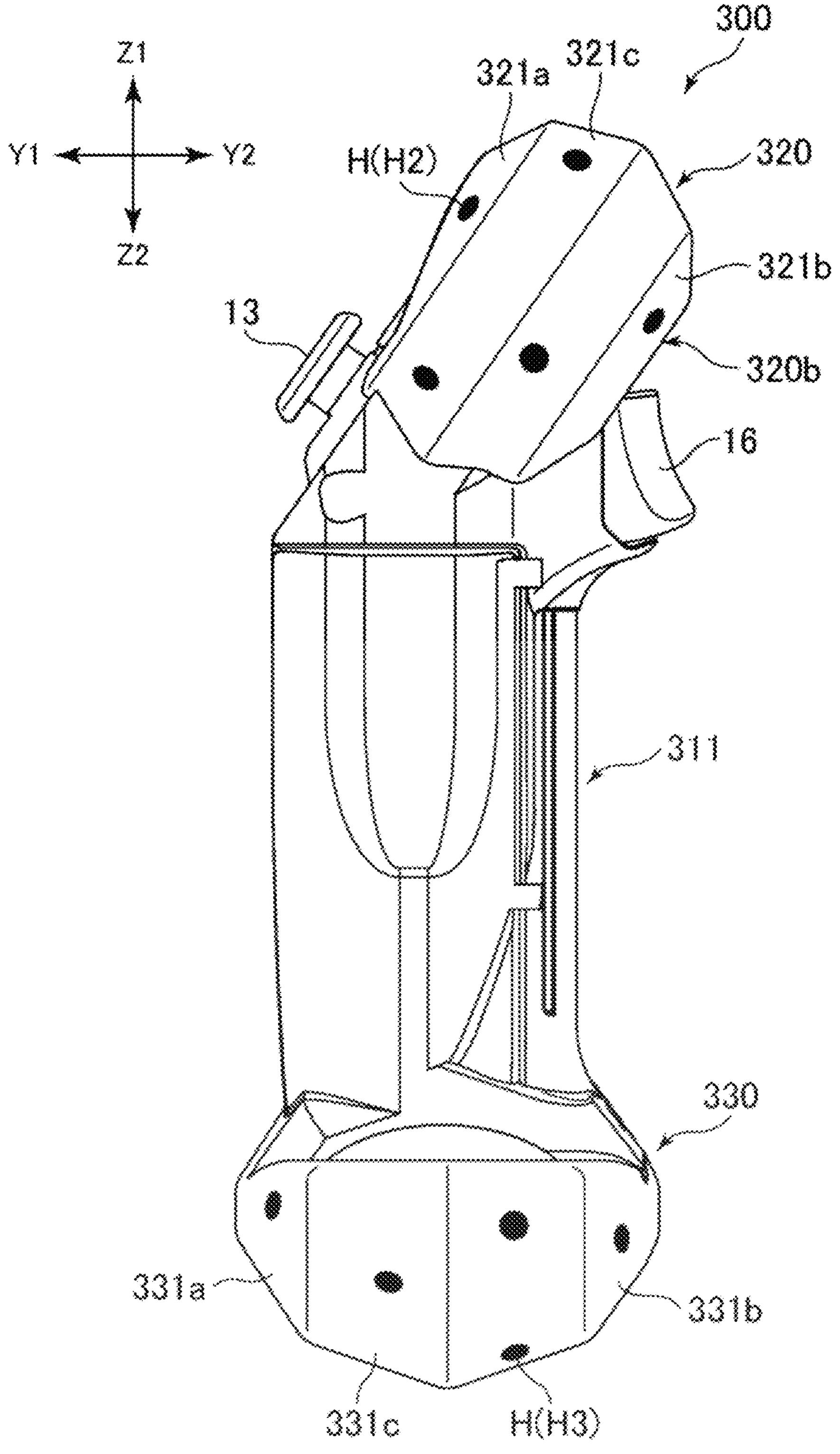
FIG. 4D is a right side view illustrating the second example of the input device.
Figure 4E:
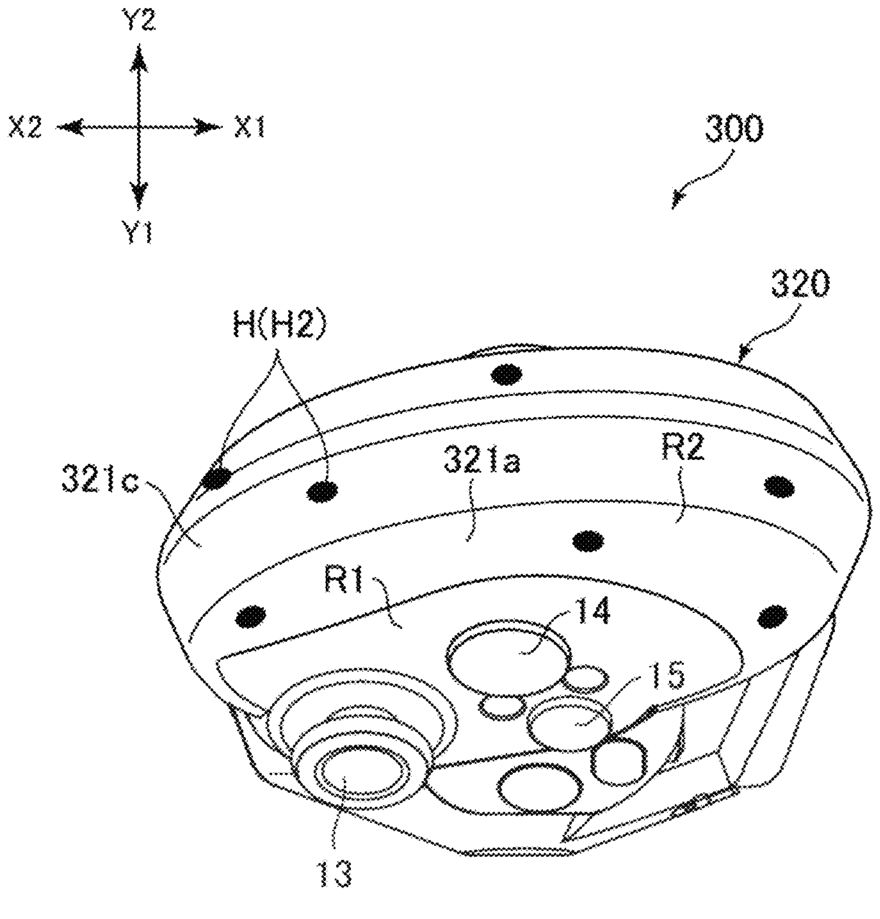
FIG. 4E is a plan view illustrating the second example of the input device.
Figure 4F:
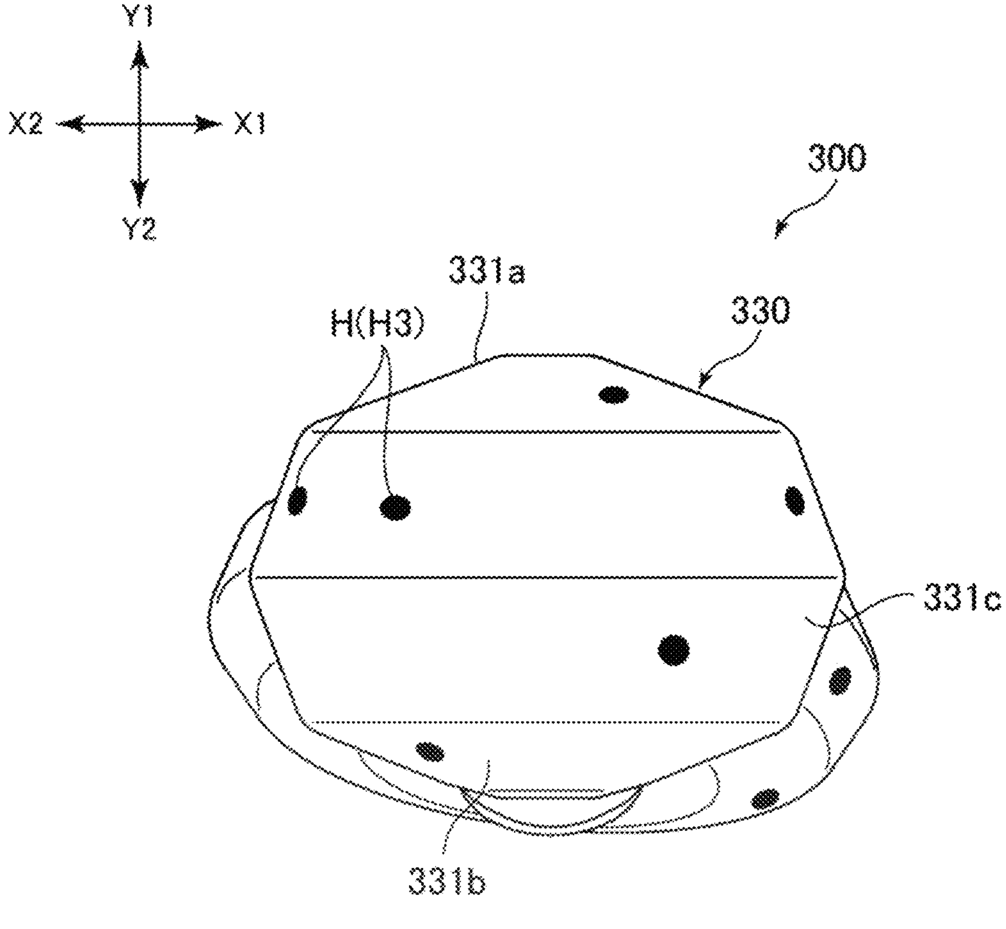
FIG. 4F is a bottom view illustrating the second example of the input device.

As illustrated in FIGS. 4A and 4B, the upper portion 320 has a front surface 321*a*, a rear surface 321*b*, and a curved surface 321*c*. Unlike in the example of the input device 100, in the input device 300, the front surface 321*a*, the rear surface 321*b*, and the curved surface 321*c* each have a plurality of to-be-tracked points H2 disposed thereon. On the front surface 321*a*, a plurality of to-be-tracked points H2 (three to-be-tracked points H2) are arranged in the left-right direction. On the curved surface 321*c* also, a plurality of to-be-tracked points H2 are arranged in the left-right direction (see FIG. 4). The rear surface 321*b* has two to-be-tracked points H2 disposed on opposite sides of the grip 311.

The front surface 321*a* has a region R1 (i.e., an operating member region) in which a plurality of operating members 13 to 15 are disposed and a region R2 (i.e., a to-be-tracked region) in which the plurality of to-be-tracked points H2 are disposed. The to-be-tracked region R2 is a region (i.e., a region on the upper side of the operating member region R1) that is more distant from the grip 311 than is the operating member region R1, and surrounds a portion of an outer edge of the operating member region R1. This makes it easier to ensure a sufficient area of the to-be-tracked region R2, and thus makes it easier to ensure a sufficient number of to-be-tracked points H2 disposed in the to-be-tracked region R2.

The front surface 321*a* has a shoulder 321*g* defined between the operating member region R1 and the to-be-tracked region R2. Thus, the shoulder 321*g* helps to prevent a finger operating any of the operating members 13 to 15 from overlapping any of the to-be-tracked points H2. At the to-be-tracked region R2, the front surface 321*a* protrudes forward relative to the operating member region R1 due to the shoulder 321*g*. Thus, the shoulder 321*g* helps to prevent a finger operating any of the operating members 13 to 15 from entering the to-be-tracked region R2.

The to-be-tracked points H2 on the front surface 321*a* are arranged along the edge of the operating member region R1 in such a manner as to surround the operating member region R1. In the example illustrated in the figures, the front surface 321*a* has to-be-tracked points H2 positioned on the upper side of the operating member region R1 and a to-be-tracked point H2 positioned on the right side of the operating member region R1. The shoulder 321*g* is also defined in such a manner as to surround the operating member region R1. In detail, the shoulder 321*g* also includes a portion positioned on the upper side of the operating member region R1 and a portion positioned on the right side of the operating member region R1. Note that the shoulder 321*g* and the arrangement of the to-be-tracked points H2 on the front surface 321*a* may be applied to other input devices disclosed in the present specification.

As illustrated in FIG. 4A, the width W31 of the lower portion 330 in the left-right direction is greater than the width W11 of the grip 311 in the front view of the input device 300. The lower portion 330 has a left projecting portion 330*a* projecting to the left relative to the left side surface of the grip 311 and a right projecting portion 330*b* projecting to the right relative to the right side surface of the grip 311. The width W31 (see FIG. 4A) of the lower portion 330 in the left-right direction is greater than the width W32 (see FIG. 4C) of the lower portion 330 in the front-rear direction. This makes it easier to arrange the to-be-tracked points H3 in the left-right direction in the lower portion 230. In addition, as illustrated in FIG. 4C, the width W32 of the lower portion 230 in the front-rear direction is greater than the width 12 of the grip 311 in the front-rear direction in a side view of the input device 100.

As illustrated in FIGS. 4A to 4E, the lower portion 330 has a front surface 331*a*, a rear surface 331*b*, and a curved surface 331*c*. The front surface 331*a*, the rear surface 331*b*, and the curved surface 331*c* each have a plurality of to-be-tracked points H3 disposed thereon. On the curved surface 321*c*, the plurality of to-be-tracked points H2 are arranged in two lines.

Fourth Example

FIGS. 5A to 5F are each a diagram illustrating an input device 400, which is a fourth example of an input device. In the following description, focus is placed on differences between the input devices 100 to 300 and the input device 400. Features of the input devices 100 to 300 may be applied to the input device 400 with respect to matters that will not be described concerning the structure of the input device 400.

Figure 5A:
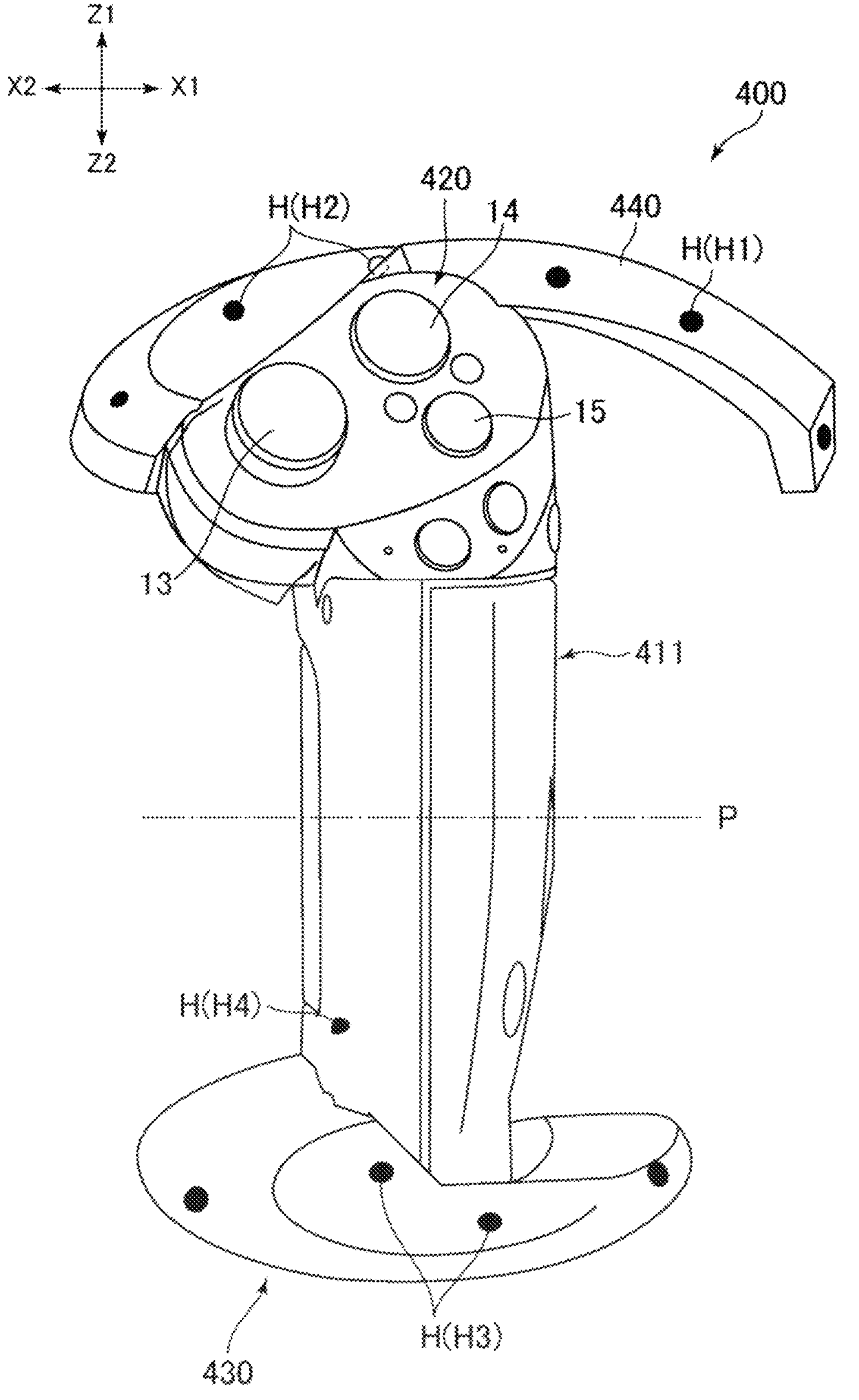
FIG. 5A is a front view illustrating a fourth example of an input device proposed in the present disclosure.
Figure 5B:
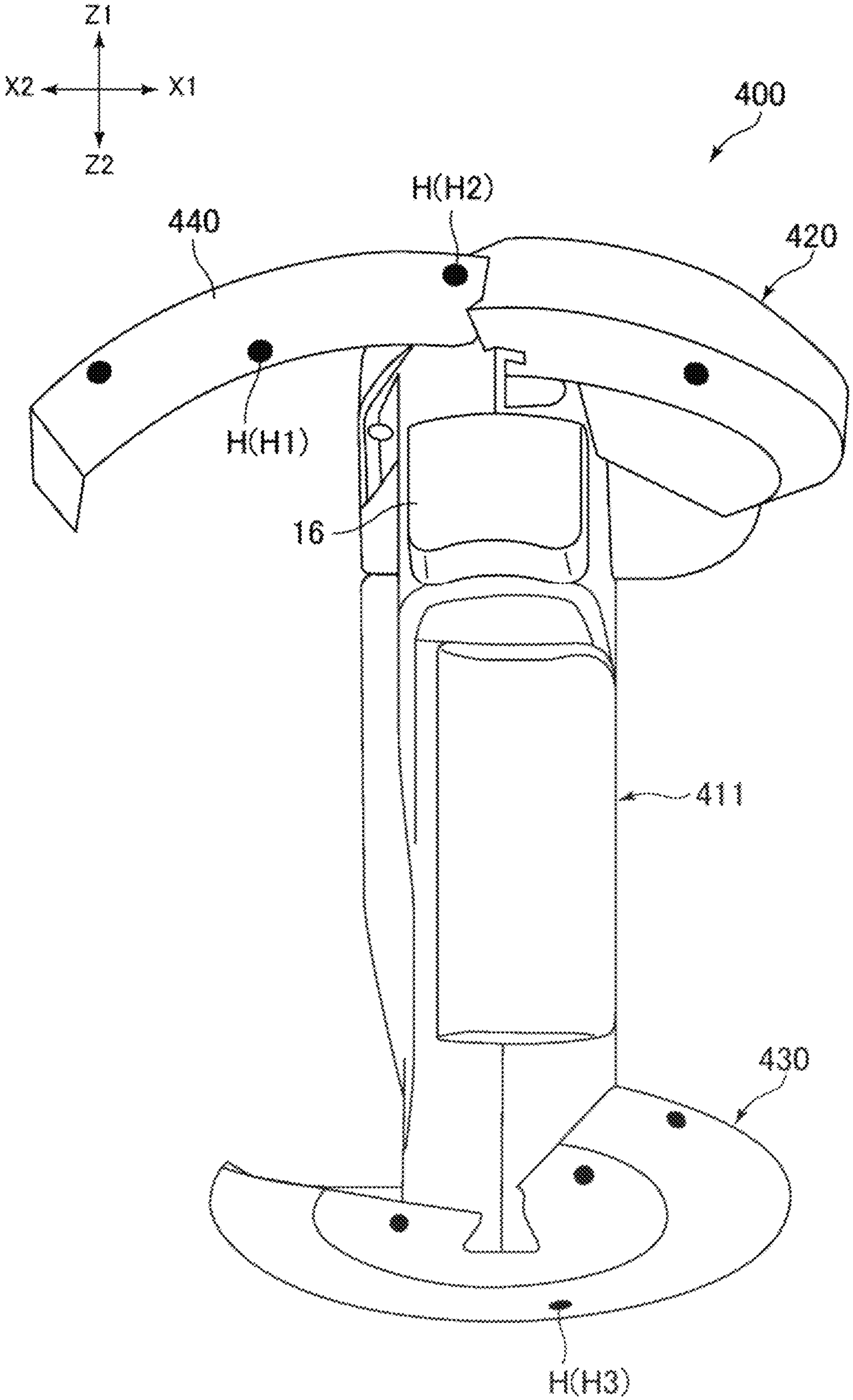
FIG. 5B is a rear view illustrating the second example of the input device.
Figure 5C:
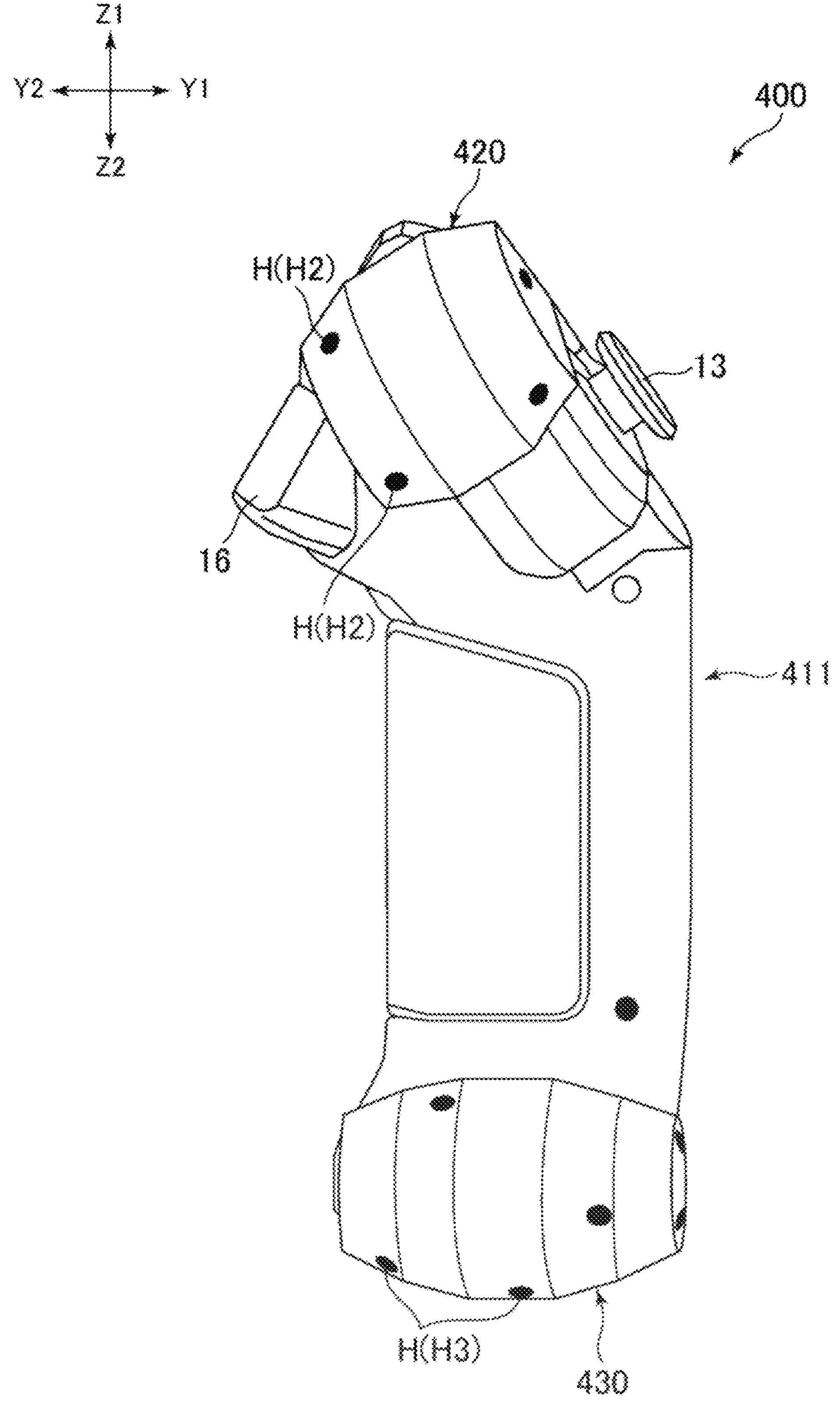
FIG. 5C is a left side view illustrating the second example of the input device.
Figure 5D:
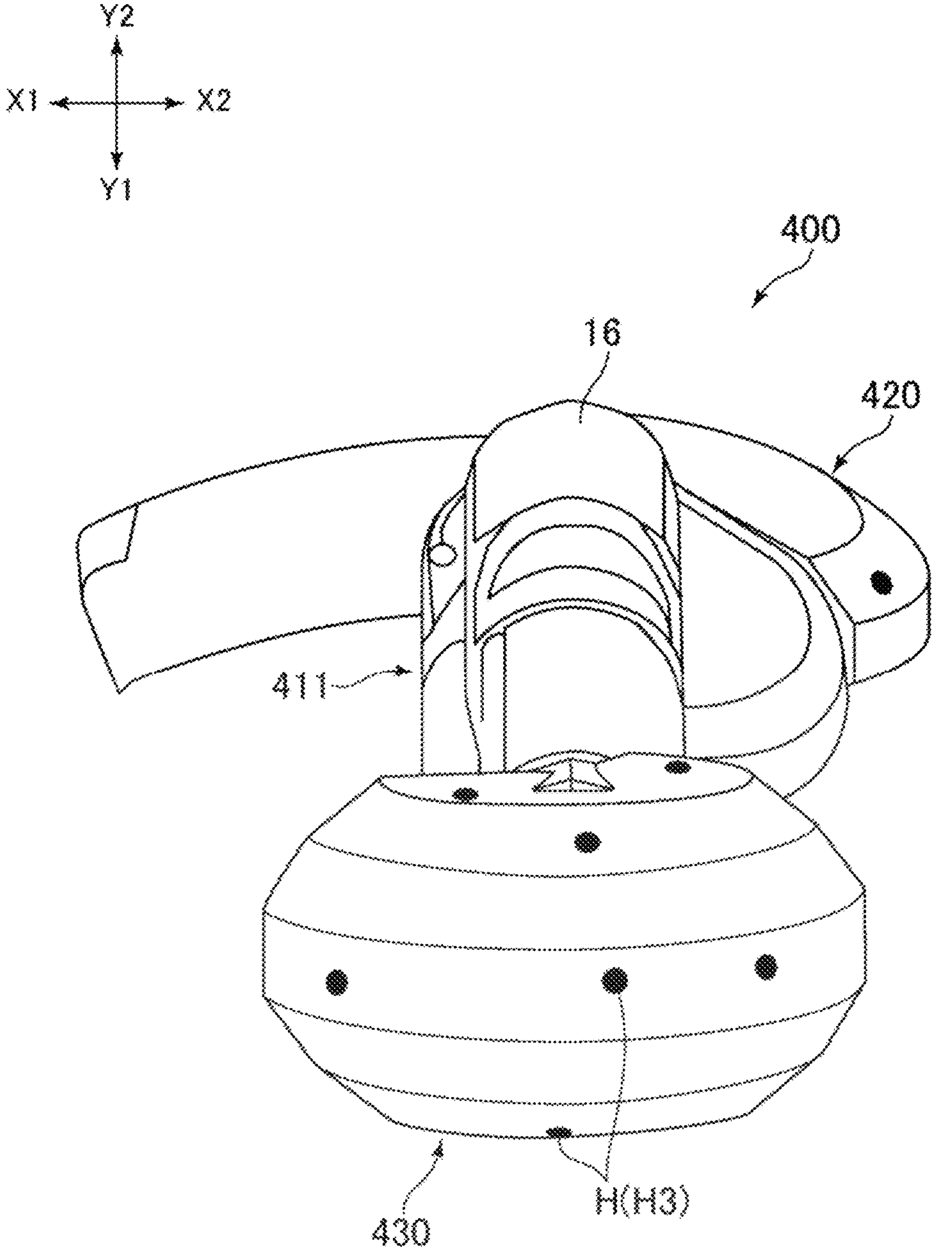
FIG. 5D is a bottom view illustrating the second example of the input device.

As illustrated in FIG. 5A, the input device 400 has a grip 411, an upper portion 420, and a lower portion 430. The upper portion 420 and the lower portion 430 each have a plurality of to-be-tracked points H provided therein. In addition, a lower portion of the grip 411 has a to-be-tracked point H4 disposed therein.

In addition, as illustrated in FIG. 5A, the input device 400 has an extension portion 440 extending laterally from the upper portion 420. The extension portion 440 extends laterally from the upper portion 420 and curves downward. Unlike in the example of the input device 100, the extension portion 440 does not reach the lower portion 430. Accordingly, the input device 400 has a plane P (see FIG. 5A) that intersects the grip 411 at right angles and which does not intersect the input device 400 except at the grip 411. The extension portion 440 has a plurality of to-be-tracked points H1 disposed therein. The to-be-tracked points H1 are arranged in the left-right direction in the extension portion 440. The to-be-tracked points H1 may be arranged either in one line or in a plurality of lines.

Unlike in the example illustrated in the figures, the input device 400 may have an extension portion extending laterally from the lower portion 430 in place of the extension portion 440 or in addition to the extension portion 440. In this case, the extension portion may extend laterally from the lower portion 430 and curve upward. In addition, this extension portion may also have a to-be-tracked point or points H4 disposed therein.

Fifth Example

FIGS. 6A to 6F are each a diagram illustrating an input device 500, which is a fifth example of an input device. In the following description, focus is placed on differences between the input devices 100 to 400 and the input device 500. Features of the input devices 100 to 400 may be applied to the input device 500 with respect to matters that will not be described concerning the structure of the input device 500. Note that, in FIGS. 6A to 6F, a cover that forms an outer surface of the input device 500 has been removed, with the result that a frame disposed inside the cover and a flexible board 550 disposed along the frame are exposed.

The input device 500 has a grip 511, an upper portion 520, and a lower portion 530. The upper portion 520 and the lower portion 530 each have a plurality of to-be-tracked points H provided therein.

In addition, the input device 500 has an extension portion 540 extending from one of the upper portion 520 and the lower portion 530 toward the other and being laterally apart from the grip 511. The extension portion 540 is curved in such a manner as to bulge outward in the left-right direction, and an intermediate portion of the extension portion 540 is apart from the grip 511. Unlike in the examples of the input devices 100 and 200, the intermediate portion of the extension portion 540 is apart from the grip 511 to the left. The extension portion 540 has a plurality of to-be-tracked points H1 disposed therein.

The input device 500 has the flexible board 550. The flexible board 550 has a plurality of LEDs 551, which are light sources for the to-be-tracked points H, mounted thereon. The input device 500 has frames Fm2, Fm3, and Fm4. (Hereinafter, reference sign Fm is used for the frames when portions of the frame are not distinguished from one another in the description.) The frames Fm form the upper portion 520, the lower portion 530, and the extension portion 540. The flexible board 550 is disposed along the frames Fm. In the example of the input device 500, the flexible board 550 extends from the upper portion 520 to the lower portion 530 through the extension portion 540. That is, the flexible board 550 has a portion 550*a* (see FIG. 6E) disposed in the frame Fm2 of the upper portion 520, a portion 550*b* (see FIG. 6F) disposed in the frame Fm3 of the lower portion 530, and a portion 550*c* (see FIG. 6C) disposed in the frame Fm4 of the extension portion 540. In addition, each of the plurality of LEDs 551 is disposed at the position of a separate one of the plurality of to-be-tracked points H. Thus, all of the LEDs 551, positioned in the upper portion 520, the lower portion 530, and the extension portion 540, are mounted on the one flexible board 550. This leads to a reduced number of parts of the input device 500.

Note that the number of flexible boards 550 may not be one. For example, one flexible board may be disposed in the upper portion 520 and the extension portion 540 with another flexible board being disposed in the lower portion 530. Alternatively, one flexible board may be disposed in the lower portion 530 and the extension portion 540 with another flexible board being disposed in the upper portion 520.

Figure 6A:
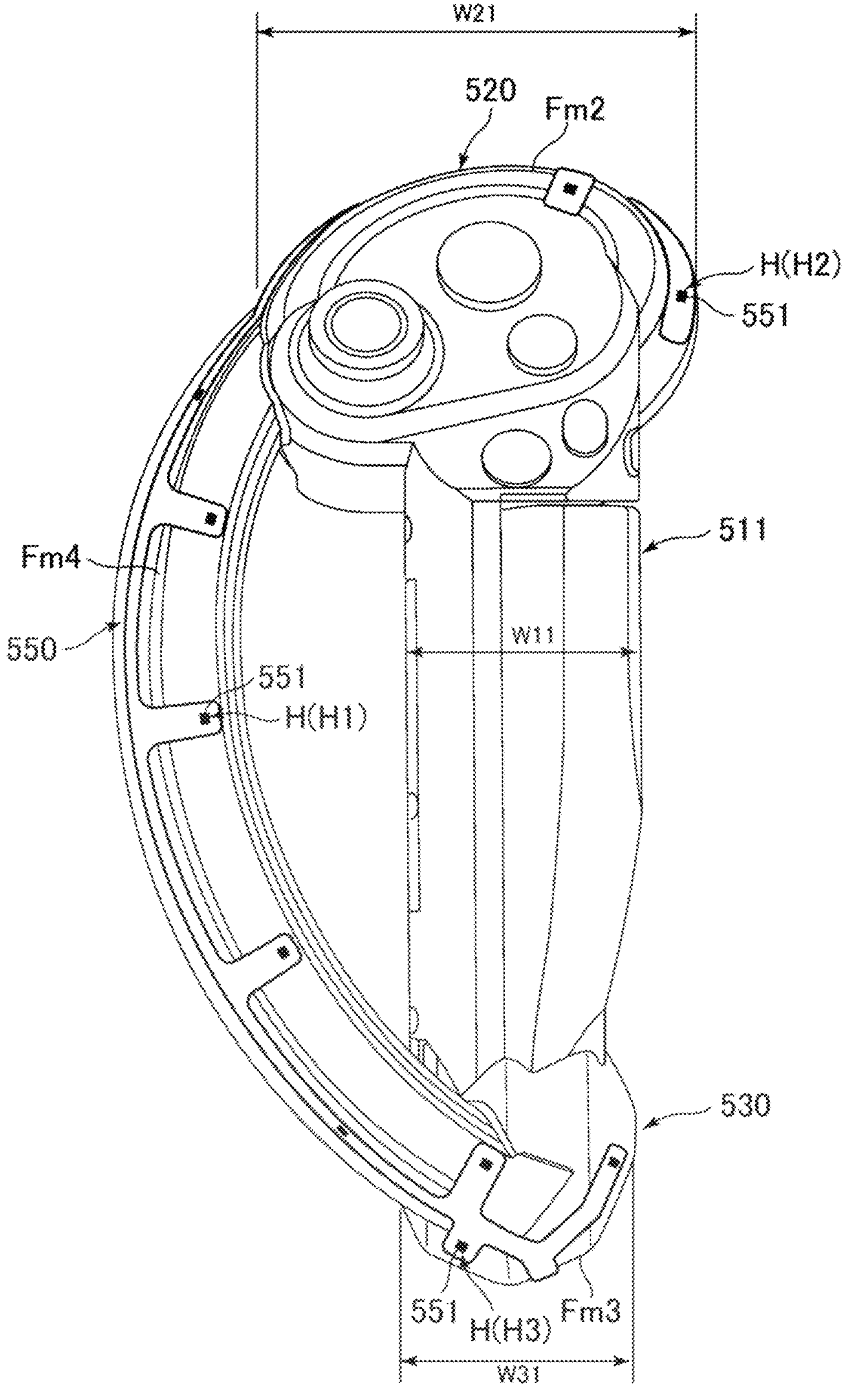
FIG. 6A is a front view illustrating a fifth example of an input device proposed in the present disclosure.
Figure 6B:
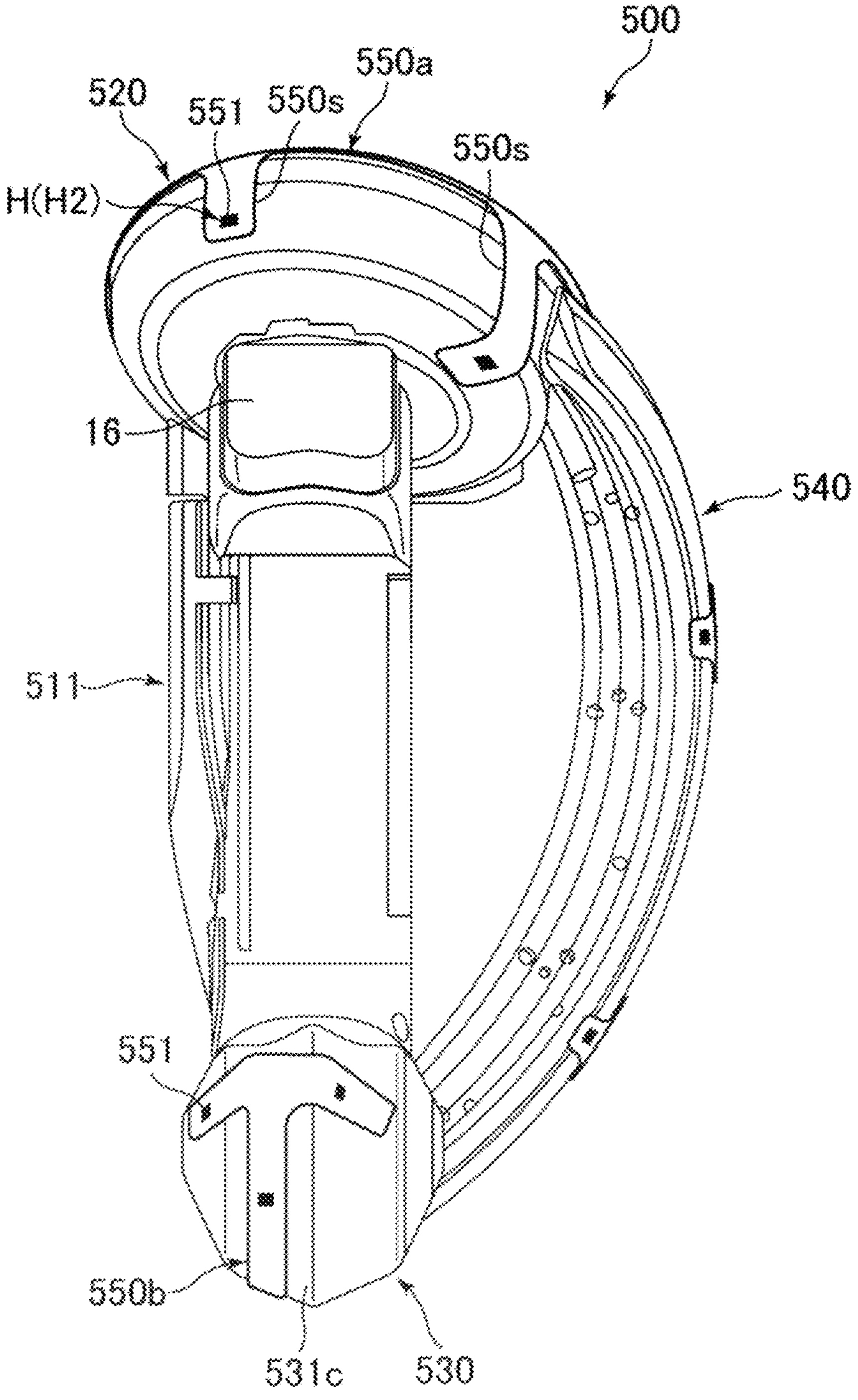
FIG. 6B is a rear view illustrating the second example of the input device.
Figure 6C:
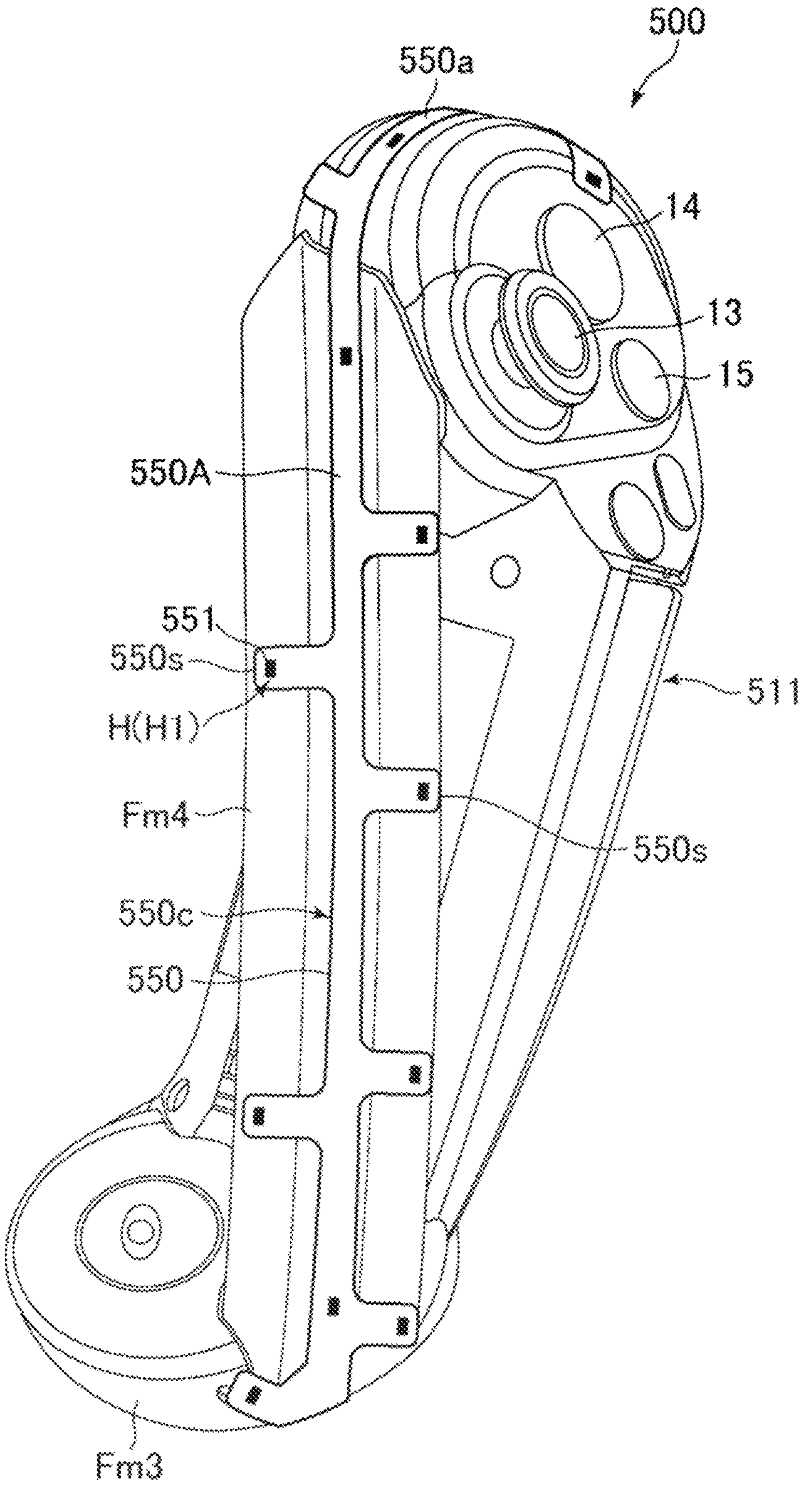
FIG. 6C is a left side view illustrating the second example of the input device.

As illustrated in FIG. 6C, the flexible board 550 has a plurality of projection portions 550*s* on which the respective LEDs 551 are mounted, and a main extension portion 550A that joins the plurality of projection portions 550*s*. In the example of the input device 500, this main extension portion 550A extends from the upper portion 520 to the lower portion 530.

The projection portions 550*s* are formed on each of two edges on opposite sides of the main extension portion 550A. In addition, each projection portion 550*s* projects from the edge of the main extension portion 550A toward the position of the corresponding to-be-tracked point H. This makes it possible to reduce the width of the flexible board 550 (in other words, the main extension portion 550A), and thus makes it easier to curve the flexible board 550 according to the external shape of the input device 500. The projection portions 550*s* are formed, for example, on a forward edge and a rearward edge of a portion of the main extension portion 550A disposed in the extension portion 540. The projection portions 550*a* formed on the forward edge and the projection portions 550*a* formed on the rearward edge are arranged alternately.

Figure 6D:
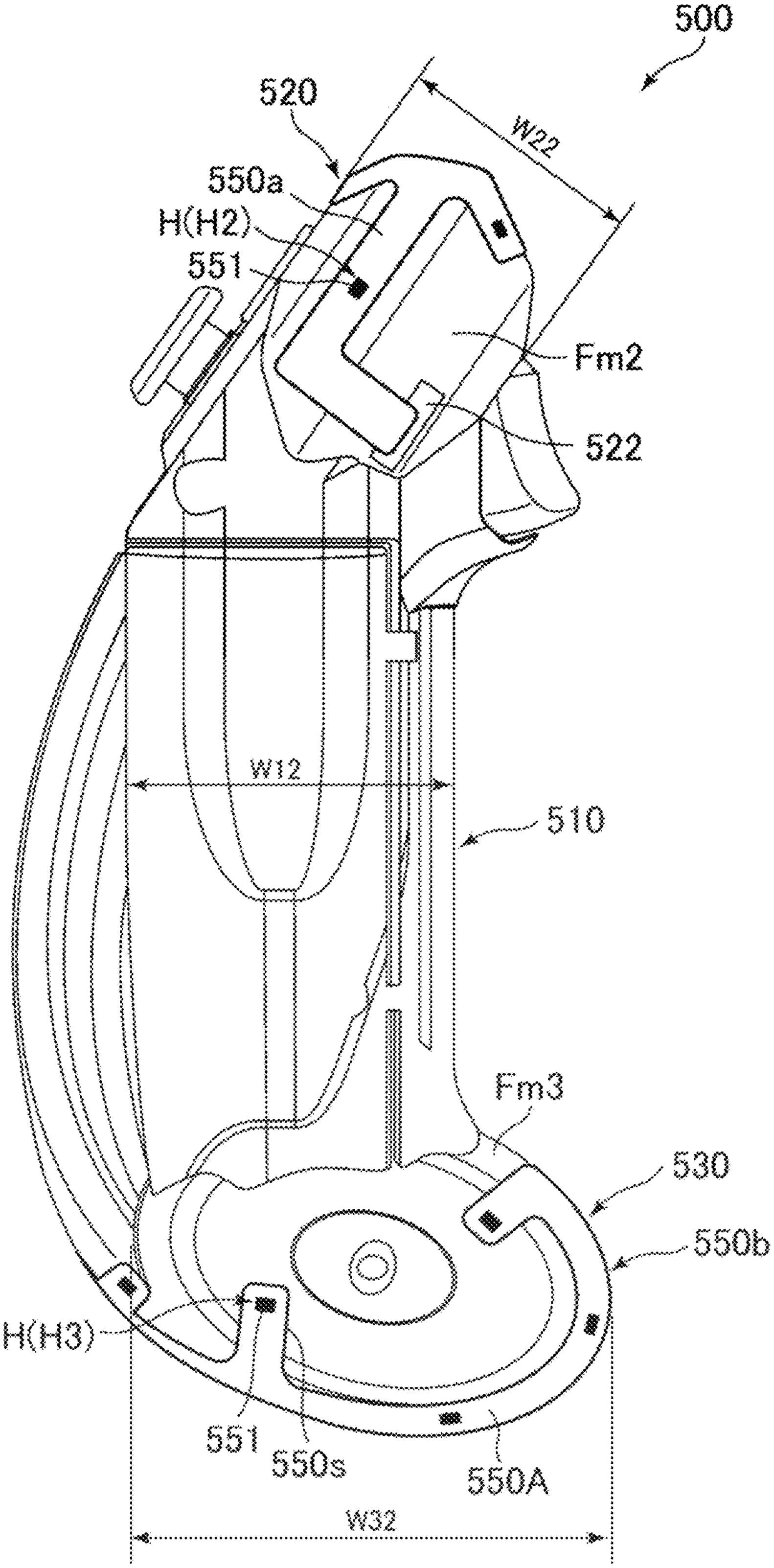
FIG. 6D is a right side view illustrating the second example of the input device.

The main extension portion 550A and/or the projection portions 550*s* may be attached to the frames Fm2, Fm3, and Fm4 through, for example, screws. A portion of the flexible board 550 is connected to a circuit board housed in an interior of the input device 500. The frame of the input device 500 may have defined therein an opening through which a portion of the flexible board 550 passes toward the interior of the input device 500. In the example of the input device 500, an opening 522 is defined in the frame Fm of the upper portion 520 as illustrated in FIG. 6D.

Figure 6E:
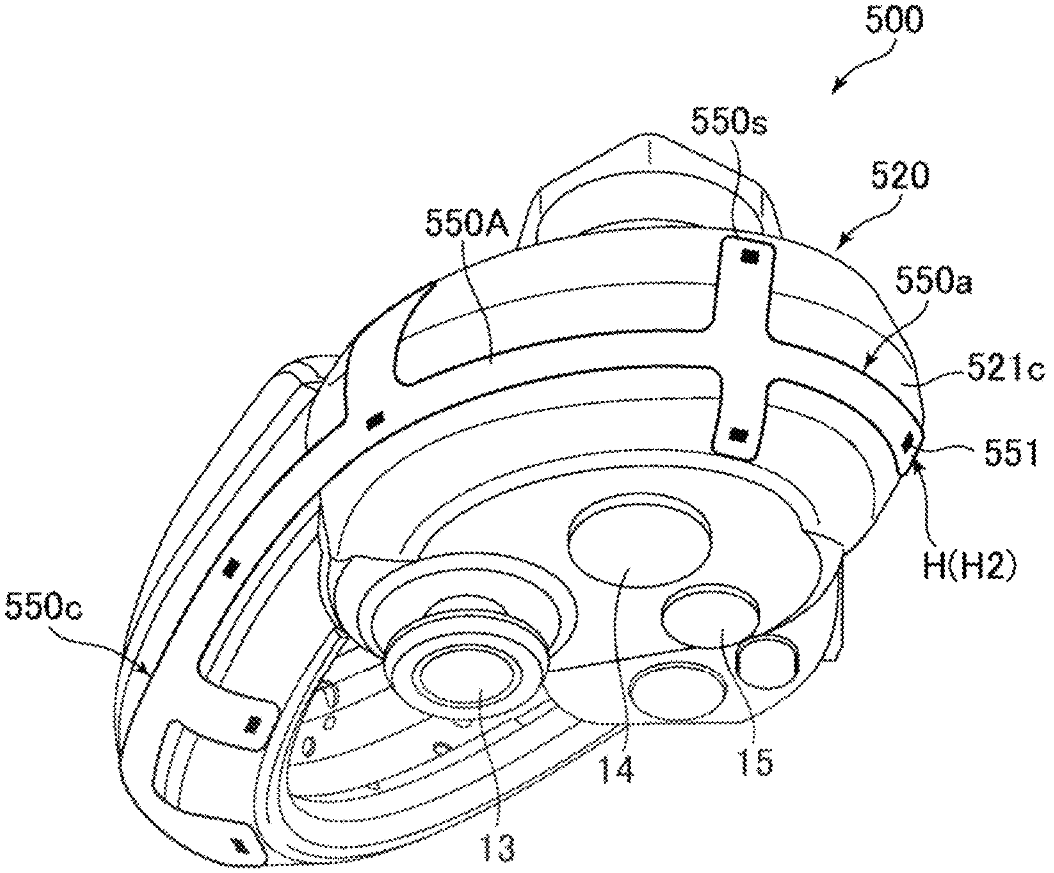
FIG. 6E is a plan view illustrating the second example of the input device.
Figure 6F:
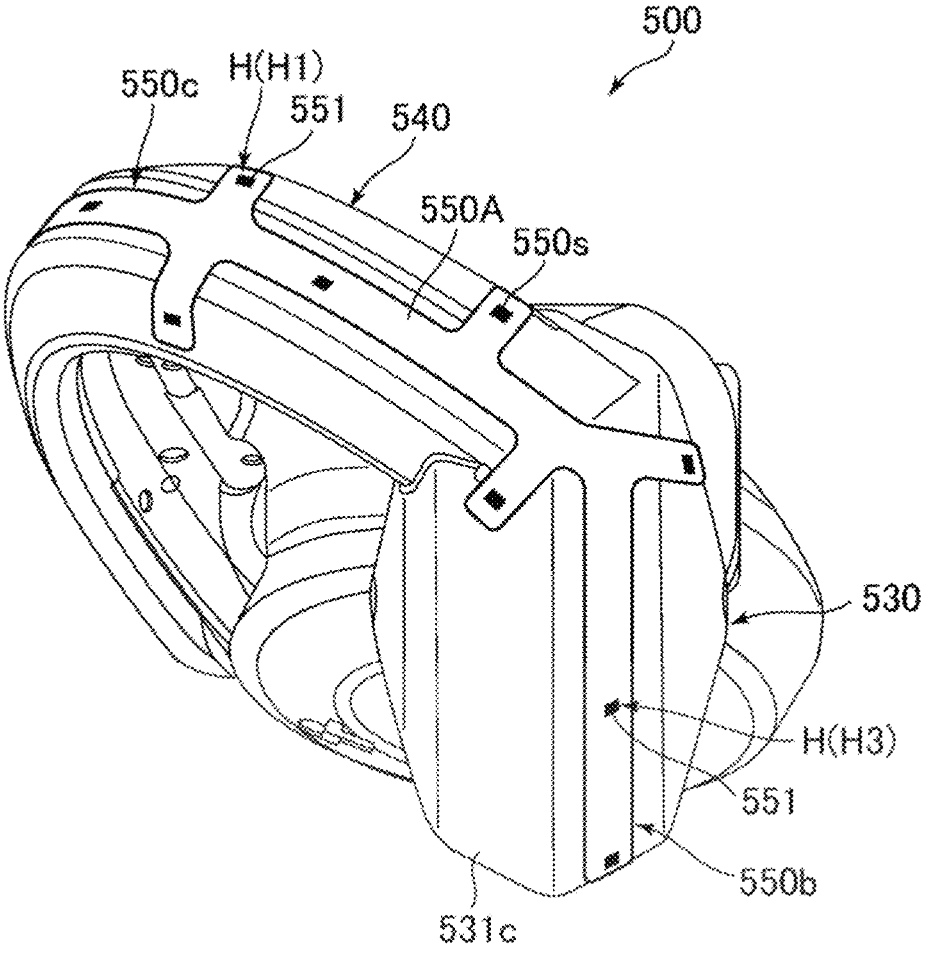
FIG. 6F is a bottom view illustrating the second example of the input device.

As in the example of the input device 100, the upper portion 520 and the lower portion 530 have a greater width in mutually different directions. Specifically, the width W21 (see FIG. 6A) of the upper portion 520 in the left-right direction is greater than the width W22 (see FIG. 6D) of the upper portion 520 in the front-rear direction. Meanwhile, the width W32 (see FIG. 6D) of the lower portion 530 in the front-rear direction is greater than the width W31 (see FIG. 6A) of the lower portion 530 in the left-right direction. This allows the direction in which to-be-tracked points H2 are arranged in the upper portion 220 to be different from the direction in which to-be-tracked points H3 are arranged in the lower portion 530. As illustrated in FIG. 6E, the portion 550*a* (i.e., a portion extending along the upper portion 520) of the flexible board 550 extends in the left-right direction along a curved surface 521*c* of the upper portion 520. As illustrated in FIG. 6F, the portion 550*c* (i.e., a portion extending along the lower portion 530) of the flexible board 550 extends in the front-rear direction along a curved surface 531*c* of the lower portion 530.

Note that, in the input device 500, the relations between the widths of the upper portion 520 and the widths of the lower portion 530 are not limited to those described here. For example, as in the input device 200, the upper portion 520 and the lower portion 530 may have a greater width in the same direction (e.g., in the left-right direction). Also note that the flexible board 550 may be applied to other examples of input devices (the input devices 100 to 400 described above).

Sixth Example

FIGS. 7A to 7D are each a diagram illustrating an input device 600, which is a sixth example of an input device. In the following description, focus is placed on differences between the input devices 100 to 500 and the input device 600. Features of the input devices 100 to 500 may be applied to the input device 600 with respect to matters that will not be described concerning the structure of the input device 600.

Figure 7A:
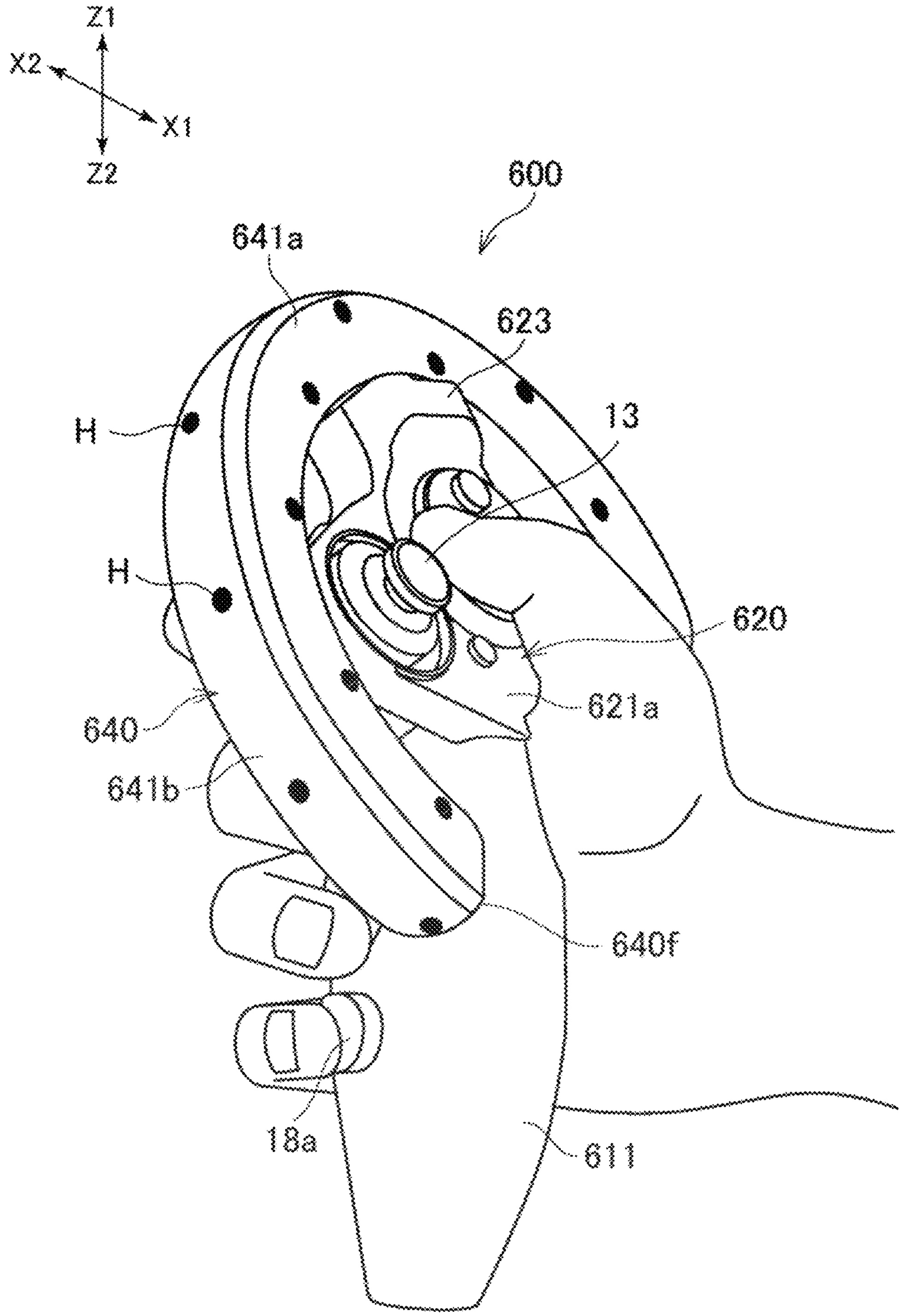
FIG. 7A is a perspective view illustrating a sixth example of an input device proposed in the present disclosure.

As illustrated in FIG. 7A, the input device 600 has a grip 611, and an upper portion 620 positioned on the upper side of the grip 611. The grip 611 is a portion to be held by, for example, a thenar, a middle finger, a ring finger, and a little finger with a palm of a user touching a side surface thereof when the user is gripping the grip 611. The upper portion 620 is positioned at an upper end of the grip 611. A plurality of operating members 13, 16, and 17 are provided in the upper portion 620, and these are positioned upward of the grip 611. Each of the operating members 13, 16, and 17 is capable of being operated by, for example, a thumb or an index finger.

Figure 7B:
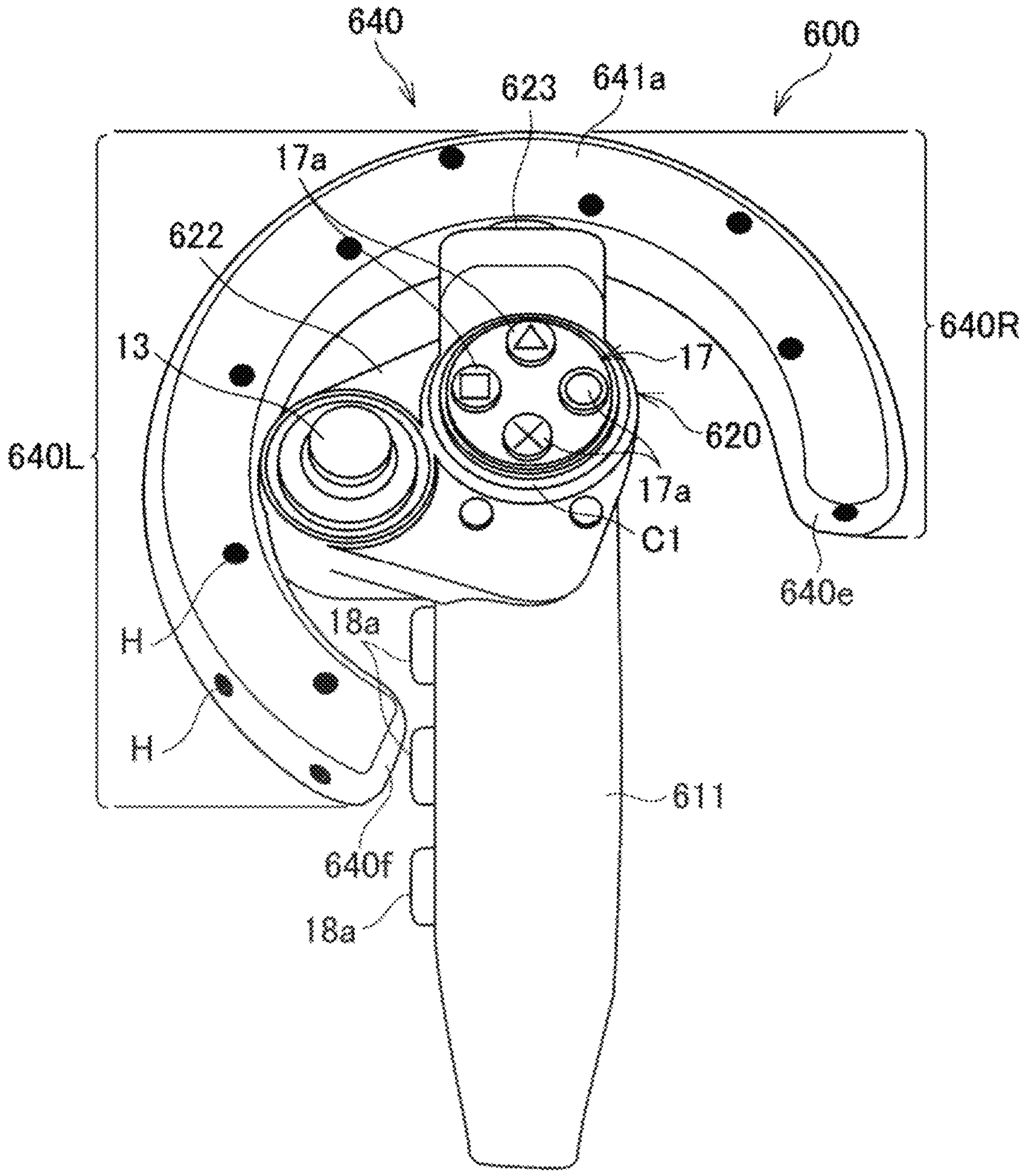
FIG. 7B is a front view of the input device illustrated in FIG. 7A.

As illustrated in FIG. 7B, the upper portion 620 has, for example, an operation stick 13 and operation buttons 16 and 17 as the operating members. The operation stick 13 and the operation button 17 are disposed on a front surface 621*a* of the upper portion 620 and are operated by, for example, the thumb. The operation stick 13 is an operating member capable of being tilted in a radial direction and of being slid. The operation button 17 has, for example, four buttons 17*a* to 17*d* positioned at end portions of a cross. The operation button 16 is disposed on a rear side of the upper portion 620 (see FIG. 7C) and is, for example, a trigger button to be operated by the index finger. The operating members provided in the upper portion 620 are not limited to the examples described here and may include, for example, a touch sensor and/or a button equipped with a touch sensor. Also note that the number of operating members provided in the upper portion 620 may be one.

Figure 7C:
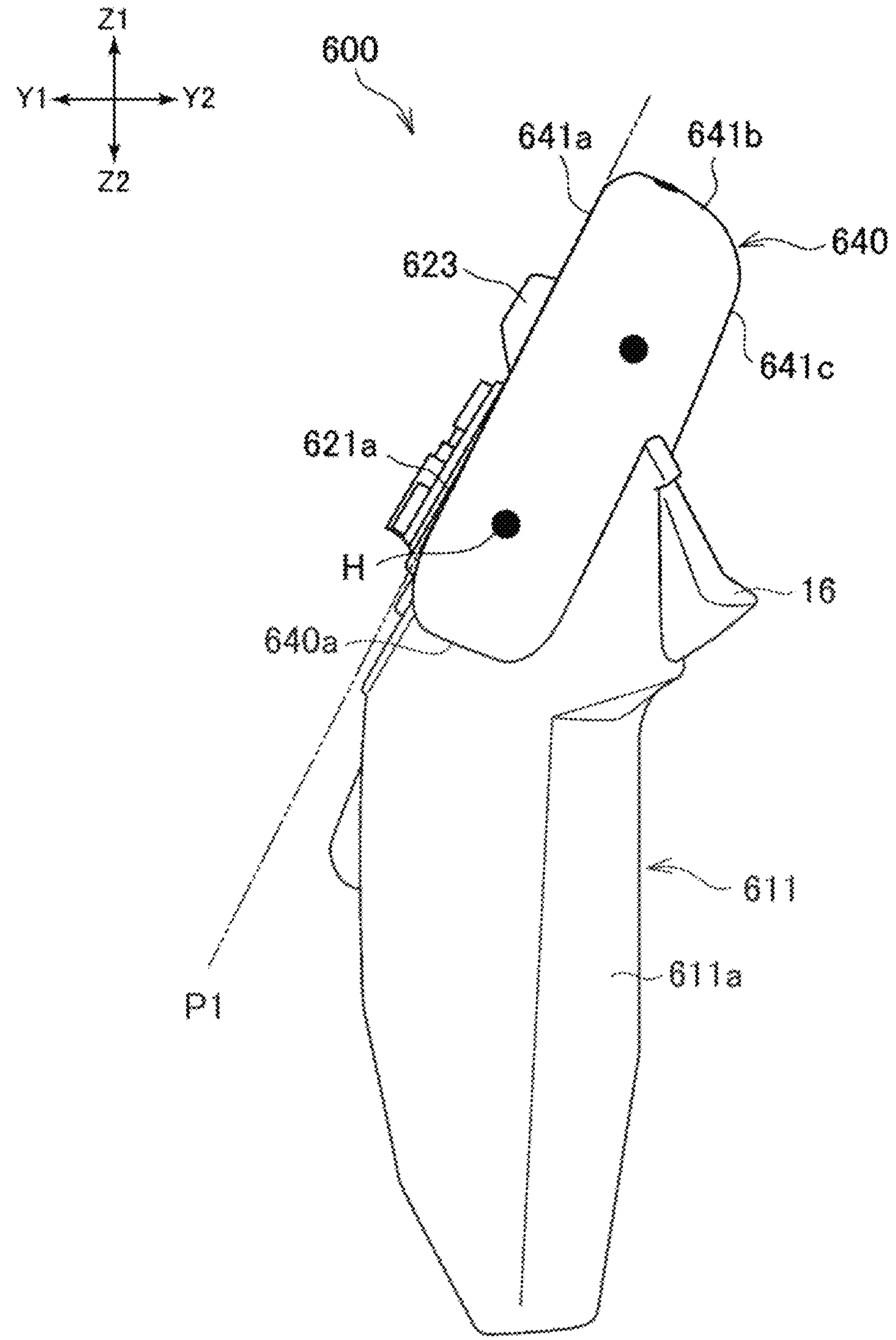
FIG. 7C is a side view of the input device illustrated in FIG. 7A.
Figure 7D:
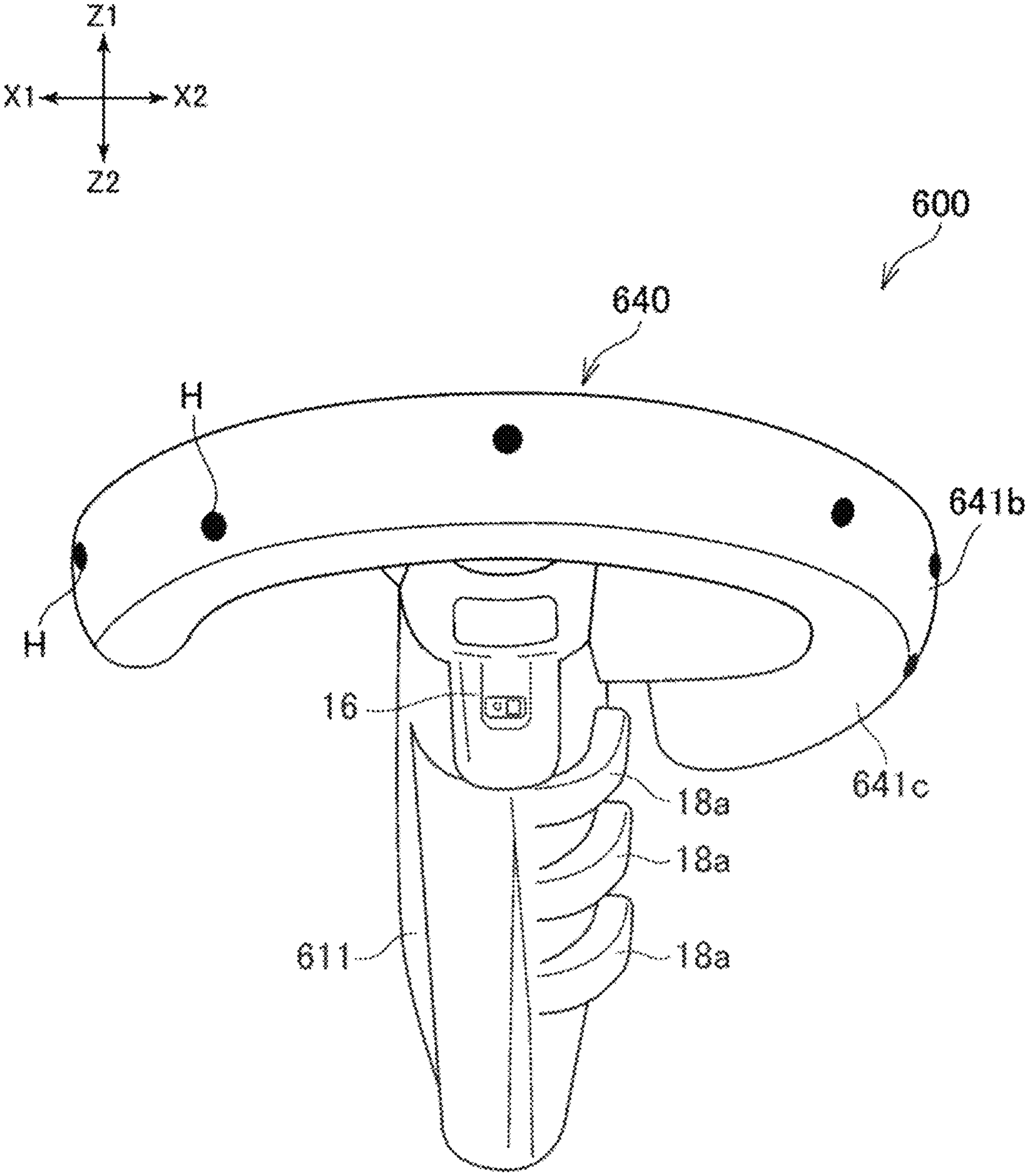
FIG. 7D is a plan view of the input device illustrated in FIG. 7A.

In addition, as illustrated in FIG. 7D, the grip 611 may also have one or a plurality of operation buttons 18*a* provided therein. In the example of the input device 600, three operation buttons 18*a* arranged in the up-down direction are provided on a left side surface of the grip 611. These three operation buttons 18*a* are capable of being operated by, for example, the middle finger, the ring finger, and the little finger.

As illustrated in FIG. 7A, the input device 600 has an extension portion 640. A plurality of to-be-tracked points H each of which emits light are disposed on an outer surface of the extension portion 640 (in the figure, the to-be-tracked points are represented by black dots). The extension portion 640 has a plurality of to-be-tracked points H disposed on a front surface 641*a* of the extension portion 640, a plurality of to-be-tracked points H disposed on a rear surface 641*c* (see FIG. 7C) of the extension portion 640, and a plurality of to-be-tracked points H disposed on a surface 641*b* (see FIG. 7C) between the front surface 641*a* and the rear surface 641*c*. The plurality of to-be-tracked points H are disposed in such a manner as to be distributed throughout the extension portion 640. Use of the extension portion 640 contributes to ensuring a sufficient region (surface area) for arrangement of the to-be-tracked points H. This, in turn, makes it possible to provide the input device 600 with a sufficient number of to-be-tracked points H while ensuring a sufficient distance between two adjacent ones of the to-be-tracked points H. This leads to improved accuracy in recognition of the posture and position of the input device.

In the example of the input device 600, the to-be-tracked points H are provided only in the extension portion 640. Alternatively, the to-be-tracked points H may be provided on, for example, an outer surface (including the front surface 621*a*) of the upper portion 620 and/or an outer surface of the grip 611.

An LED, for example, is used as a light source for the to-be-tracked points H. The light source may be disposed at each of the positions of the to-be-tracked points H. Alternatively, light of the light source may be guided to the position of each to-be-tracked point H through a light guide tube.

The extension portion 640 extends along a plane P1 (see FIG. 7C) including the front surface 621*a* of the upper portion 620. More specifically, as illustrated in FIG. 7C, in a side view of the input device 600, the front surface 621*a* of the upper portion 620 extends obliquely downward and rearward from an upper end of the front surface 621*a*. In the side view of the input device 600, the extension portion 640 also extends obliquely downward and rearward from an upper end of the extension portion 640. This makes it possible to simplify the structure of a member (i.e., a housing) that forms an exterior of the input device 600 when compared to, for example, a mode in which the extension portion 640 extends at right angles to the front surface 621*a* of the upper portion 620. For example, a member that forms the front surface 621*a* of the upper portion 620 and a member that forms the front surface 641*a* of the extension portion 640 can be formed integrally with each other.

As illustrated in FIG. 7B, the extension portion 640 includes an arc-shaped portion extending in a direction along the plane P1 including the front surface 621*a* of the upper portion 620. In the example of the input device 600, the extension portion 640 as a whole is in the shape of an arc. This shape of the extension portion 640 makes it easier to ensure a sufficient length of the extension portion 640. This, in turn, makes it easier to ensure a sufficient region (surface area) for the arrangement of the to-be-tracked points H. Note that the front surface 621*a* of the upper portion 620 may be curved. In this case, the plane P1 may be a plane including only a portion of the front surface 621*a*.

A raised portion 623 (see FIG. 7A) is formed at an upper end (in other words, at a boundary between the front surface 621*a* and the extension portion 640) of the upper portion 620. This raised portion 623 contributes to preventing a finger of the user from reaching the extension portion 640 and covering any of the to-be-tracked points H.

As illustrated in FIG. 7B, the extension portion 640 is joined to an upper side of the upper portion 620. In addition, the extension portion 640 has a portion 640R extending to the right from the upper portion 620 and a portion 640L extending to the left from the upper portion 620. (Hereinafter, the portion 640R will be referred to as a right extension portion, and the portion 640L will be referred to as a left extension portion.) Thus, the extension portion 640 extends both to the right and to the left from the upper portion 620, making it still easier to ensure a sufficient length of the extension portion 640.

As illustrated in FIG. 7B, in the example of the input device 600, the right extension portion 640R and the left extension portion 640L are each in the shape of an arc. The right extension portion 640R extends to the right from the upper portion 620 and curves downward. The left extension portion 640L extends to the left from the upper portion 620 and curves downward. These shapes of the right extension portion 640R and the left extension portion 640L make it possible to ensure a sufficient length of the right extension portion 640R while limiting the dimensions of the right extension portion 640R in the left-right direction and in the up-down direction, and, similarly, to ensure a sufficient length of the left extension portion 640L while limiting the dimensions of the left extension portion 640L in the left-right direction and in the up-down direction. In the example of the input device 600, the right extension portion 640R and the left extension portion 640L share a common center point C1. That is, the right extension portion 640R and the left extension portion 640L each extend along an imaginary arc formed around the one center point C1. The extension portion 640 is formed along the imaginary arc over an angle of 180 degrees or more.

As illustrated in FIG. 7B, in the example of the input device 600, both an end portion 640*e* of the right extension portion 640R and an end portion 640*f* of the left extension portion 640R are not joined to the grip 611. Unlike in the example of the input device 600, one of the end portion 640*e* of the right extension portion 640R and the end portion 640*f* of the left extension portion 640R may be joined to the grip 11. For example, the end portion 640*f* of the left extension portion 640 may be joined to the grip 611.

As illustrated in FIG. 7C, the right extension portion 640R is formed in such a manner as to cover a right side surface of the upper portion 620. A right side surface 611*a* of the grip 611 is not covered with the right extension portion 640R. In other words, the end portion 640*e* of the right extension portion 640R is positioned higher than the right side surface 611*a* of the grip 611. This contributes to preventing the right extension portion 640R of the extension portion 640 from interfering when the user grips the grip 611 with the right hand or when the user separates the right hand from the grip 611.

As illustrated in FIG. 7B, the left extension portion 640L is formed in such a manner as to cover a left side surface of the upper portion 620. In the example of the input device 600, the upper portion 620 has a projecting portion 622 extending to the left. The projecting portion 622 is joined to an intermediate portion of the left extension portion 640L. Accordingly, the extension portion 640 is joined to the upper portion 620 at two positions. This structure leads to an improvement in strength with which the extension portion 640 is supported.

As illustrated in FIG. 7B, the left extension portion 640L is longer than the right extension portion 640R. The end portion 640*f* of the left extension portion 640L is positioned lower than the upper end of the grip 11. As illustrated in FIG. 7A, the end portion 640*f* of the left extension portion 640L is positioned forward of the buttons 18*a* provided in the grip 611. This contributes to ensuring a sufficient length of the left extension portion 640L while preventing the left extension portion 640L from interfering with fingers of the right hand when the user grips the grip 611 with the right hand.

The shape of the extension portion 640 is not limited to the example of the input device 600. For example, the extension portion 640 may have a portion extending in a straight line. The front surface 641*a* of the extension portion 640 and the front surface 621*a* of the upper portion 620 may not necessarily be positioned on the common plane P1. For example, the front surface 641*a* of the extension portion 640 may be positioned on a plane positioned forward of the plane P1 and parallel to the plane P1 including the front surface 621*a* of the upper portion 620. In yet another example, the center point of the right extension portion 640R and the center point of the left extension portion 640L may be different from each other.

Seventh Example

Figure 8A:
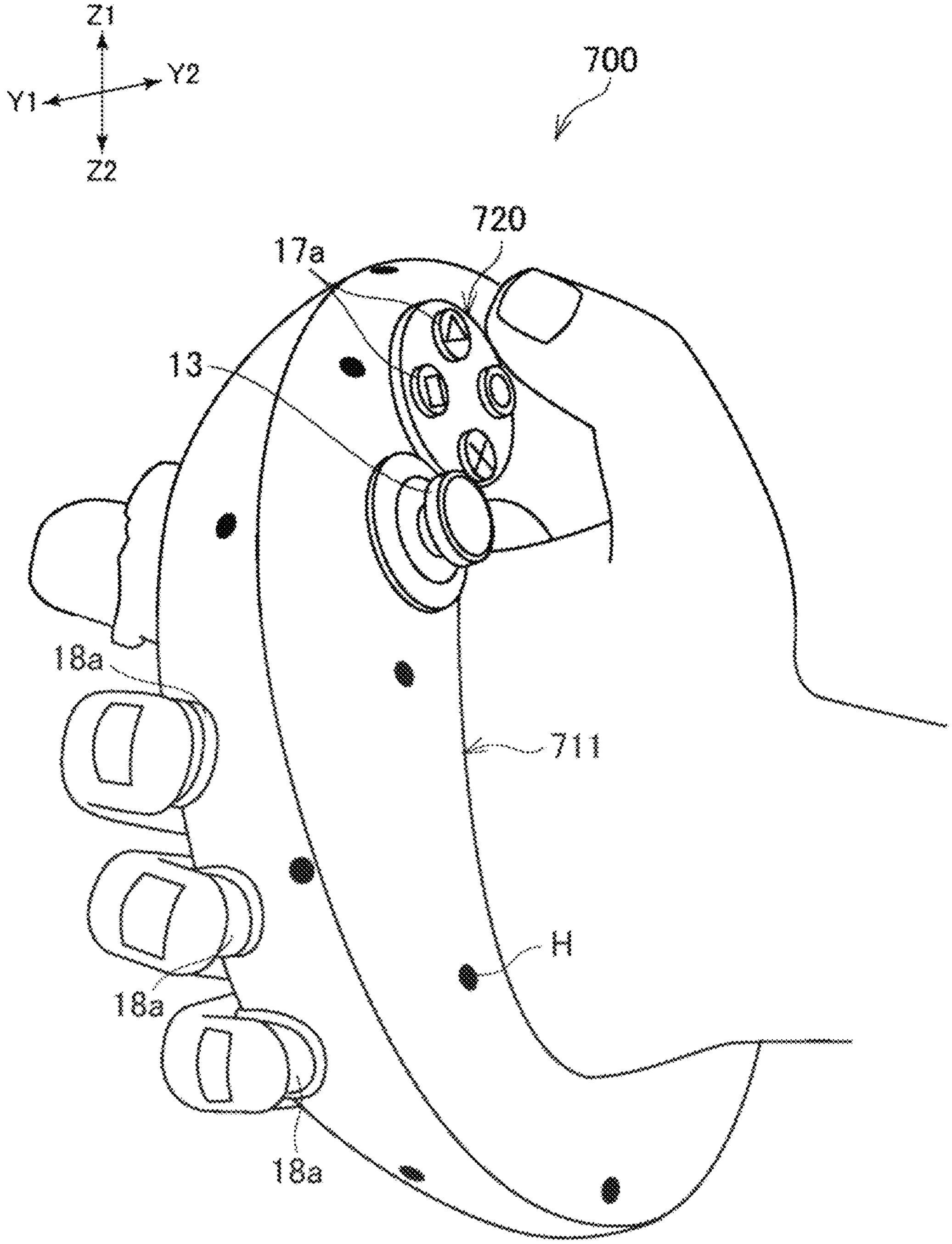
FIG. 8A is a perspective view illustrating a seventh example of an input device proposed in the present disclosure.
Figure 8B:
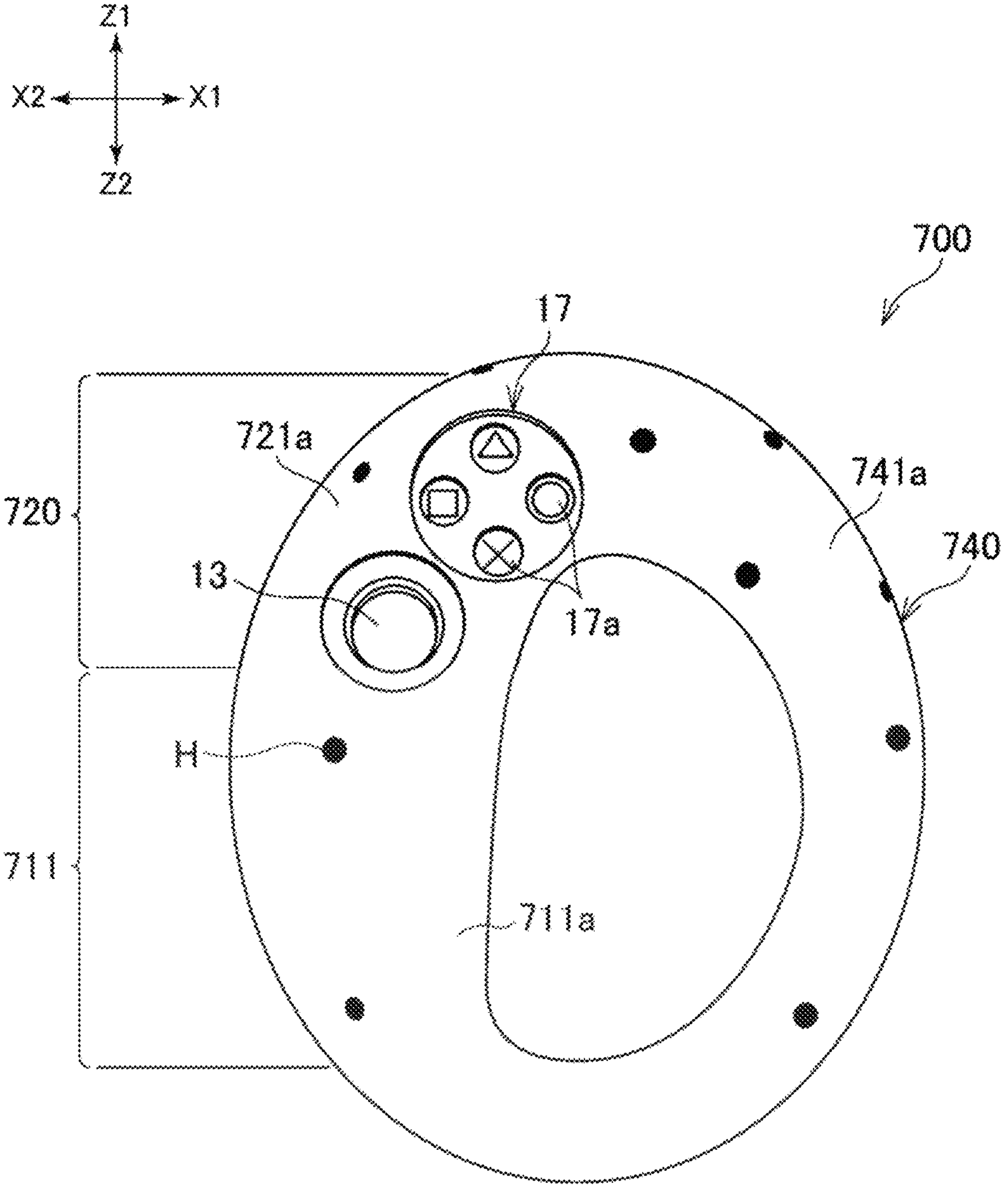
FIG. 8B is a front view of the input device illustrated in FIG. 8A.
Figure 8C:
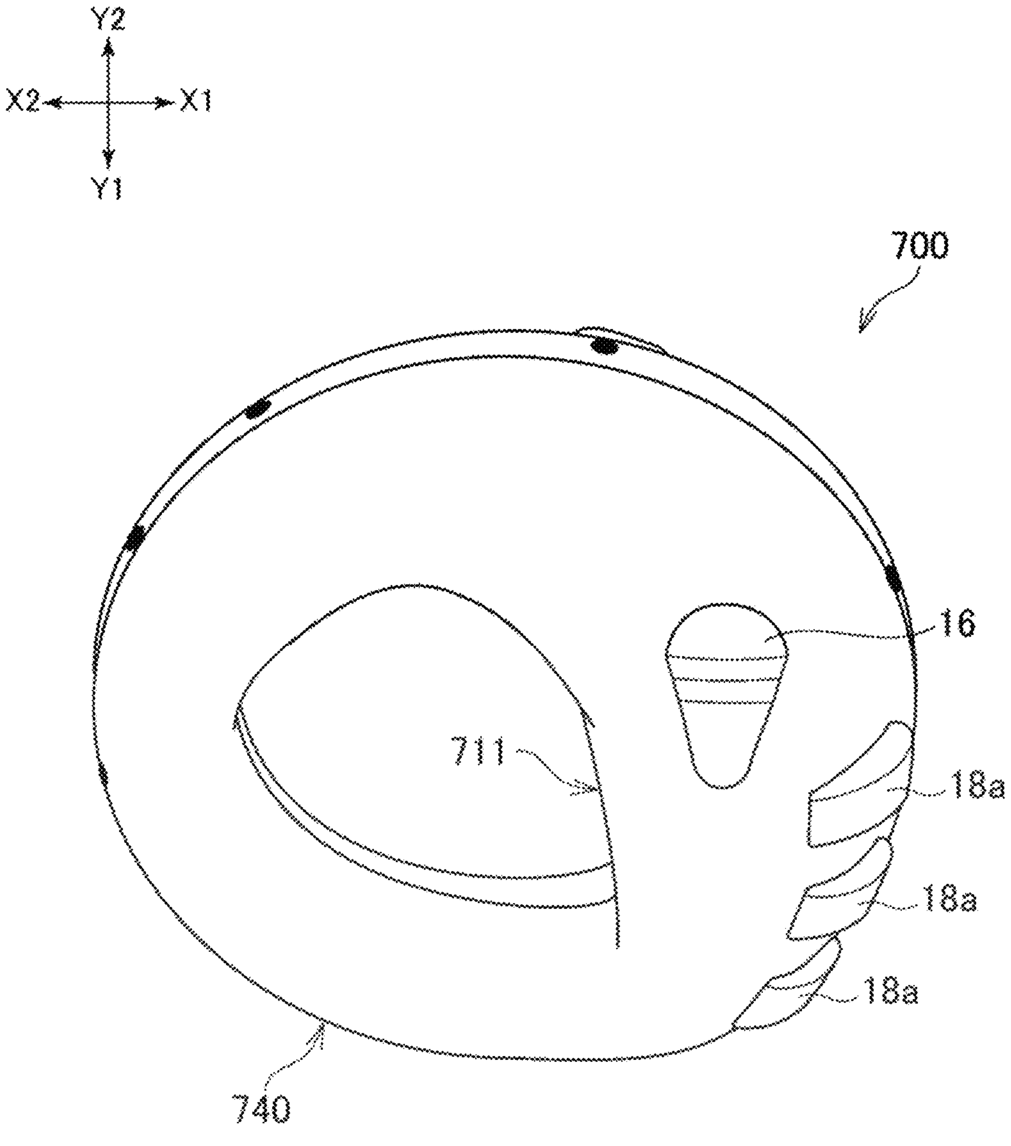
FIG. 8C is a diagram illustrating a front side of the input device illustrated in FIG. 8A.

FIGS. 8A to 8C are each a diagram illustrating an input device 700, which is a seventh example of an input device. In the following description, focus is placed on differences between the input device 600 and the input device 700. Features of the input device 600 and the other input devices 100 to 500 may be applied to the input device 700 with respect to matters that will not be described concerning the structure of the input device 700.

As illustrated in FIG. 8B, the input device 700 has a grip 711, an upper portion 720 having a plurality of operating members 13, 16, and 17 provided therein, and an extension portion 740 having a plurality of to-be-tracked points H provided therein.

The extension portion 740 extends to the right from the upper portion 720 and curves downward. In addition, an end portion of the extension portion 40 is joined to a lower end of the grip 711. Accordingly, the grip 711, the upper portion 720, and the extension portion 740 together form a closed loop. A user is able to insert the right hand into a space between the extension portion 740 and the grip 711. This shape of the input device 700 leads to improvements in strength and durability of the input device 700. In addition, the structure of a member (i.e., a housing) that forms an exterior of the input device 700 can be simplified. Unlike the input device 100 described above, the input device 700 does not have a portion extending to the left from the upper portion 720.

In addition, the extension portion 740 extends along a plane including a front surface 721*a* of the upper portion 720. A front surface 741*a* of the extension portion 740 and the front surface 721*a* of the upper portion 720 lie on a common plane. In the example of the input device 700, the front surface 741*a* of the extension portion 740, the front surface 721*a* of the upper portion 720, and a front surface 711*a* of the grip 711 are positioned on a common plane. This makes it possible to further simplify the structure of the member (i.e., the housing) that forms the exterior of the input device 700.

The extension portion 740 as a whole is in the shape of an arc, extending in a direction along the front surface 721*a* of the upper portion 720. This shape of the extension portion 740 contributes to ensuring a sufficient length of the extension portion 740 while limiting an increase in the dimension of the extension portion 740 in the left-right direction.

Note that the shape of the input device 700 is not limited to the example illustrated in the figures, and that, for example, the extension portion 740 may extend in a direction that intersects the plane including the front surface 721*a* of the upper portion 720. Also note that the front surface 721*a* of the upper portion 720 may be curved. In this case, the extension portion 740 may extend along a plane including only a portion of the front surface 721*a*.

(Other Designs)

Figure 9:
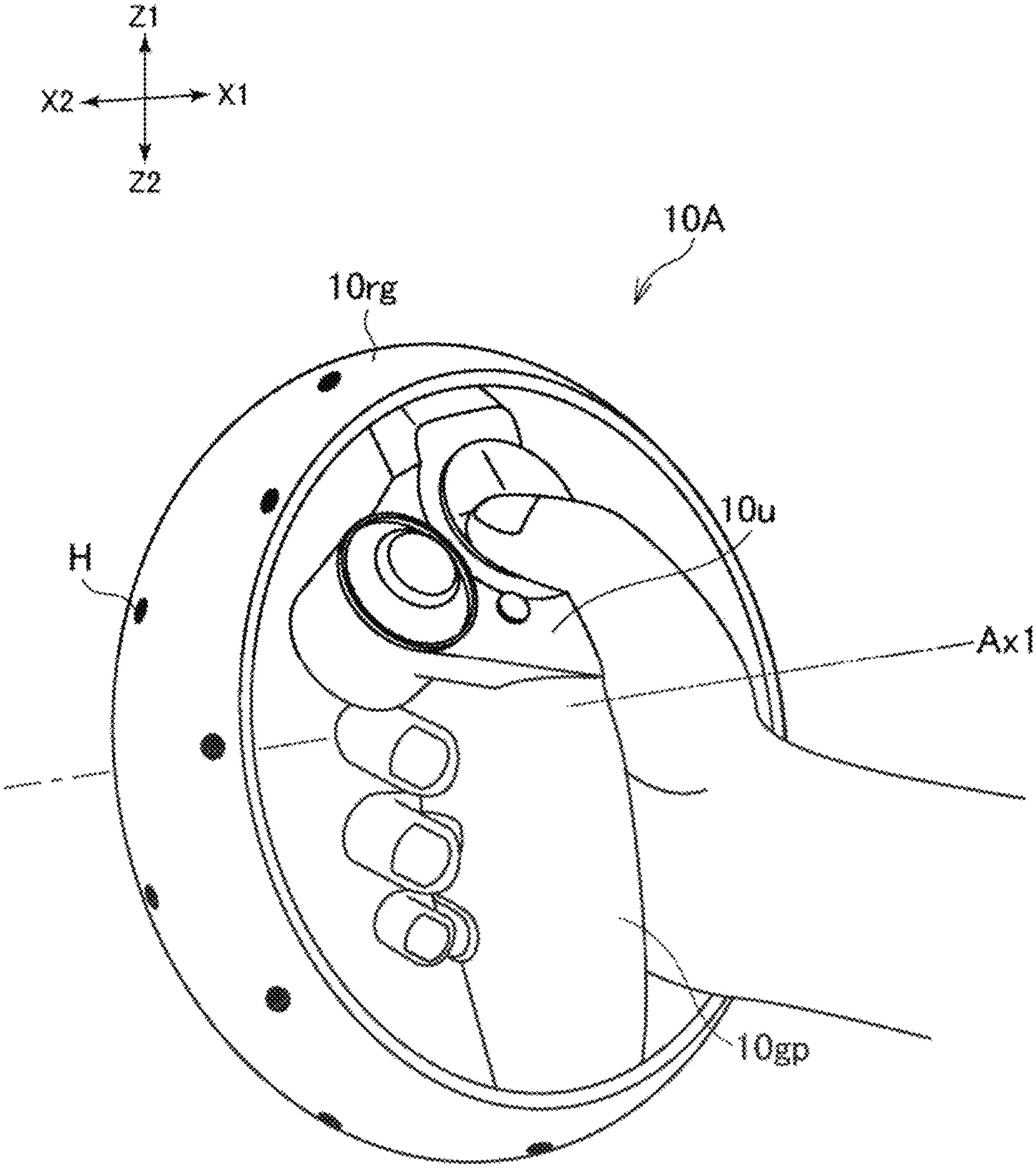
FIG. 9 is a diagram illustrating an example of an input device having an annular portion.
Figure 10:
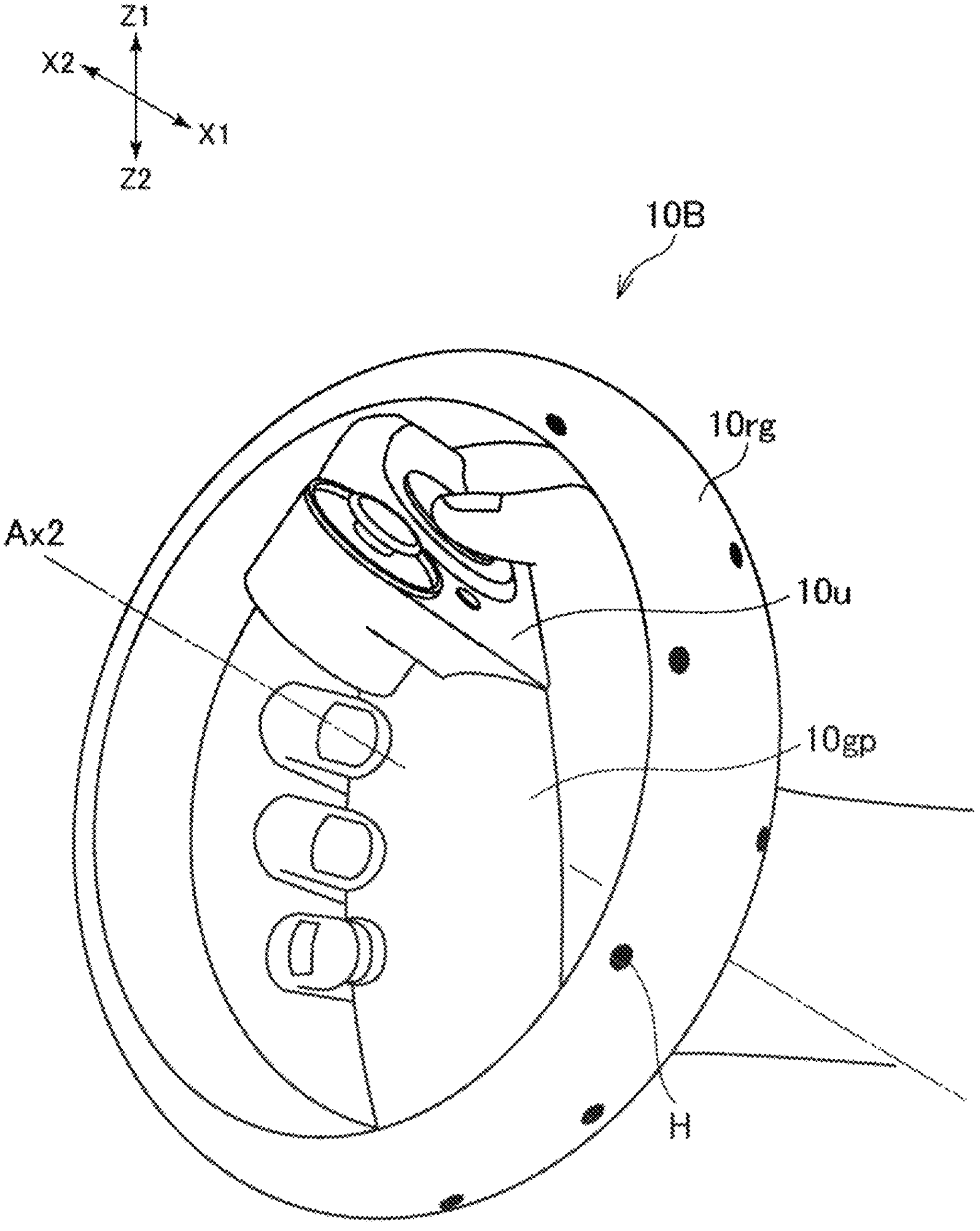
FIG. 10 is a diagram illustrating another example of an input device having an annular portion.
Figure 11A:
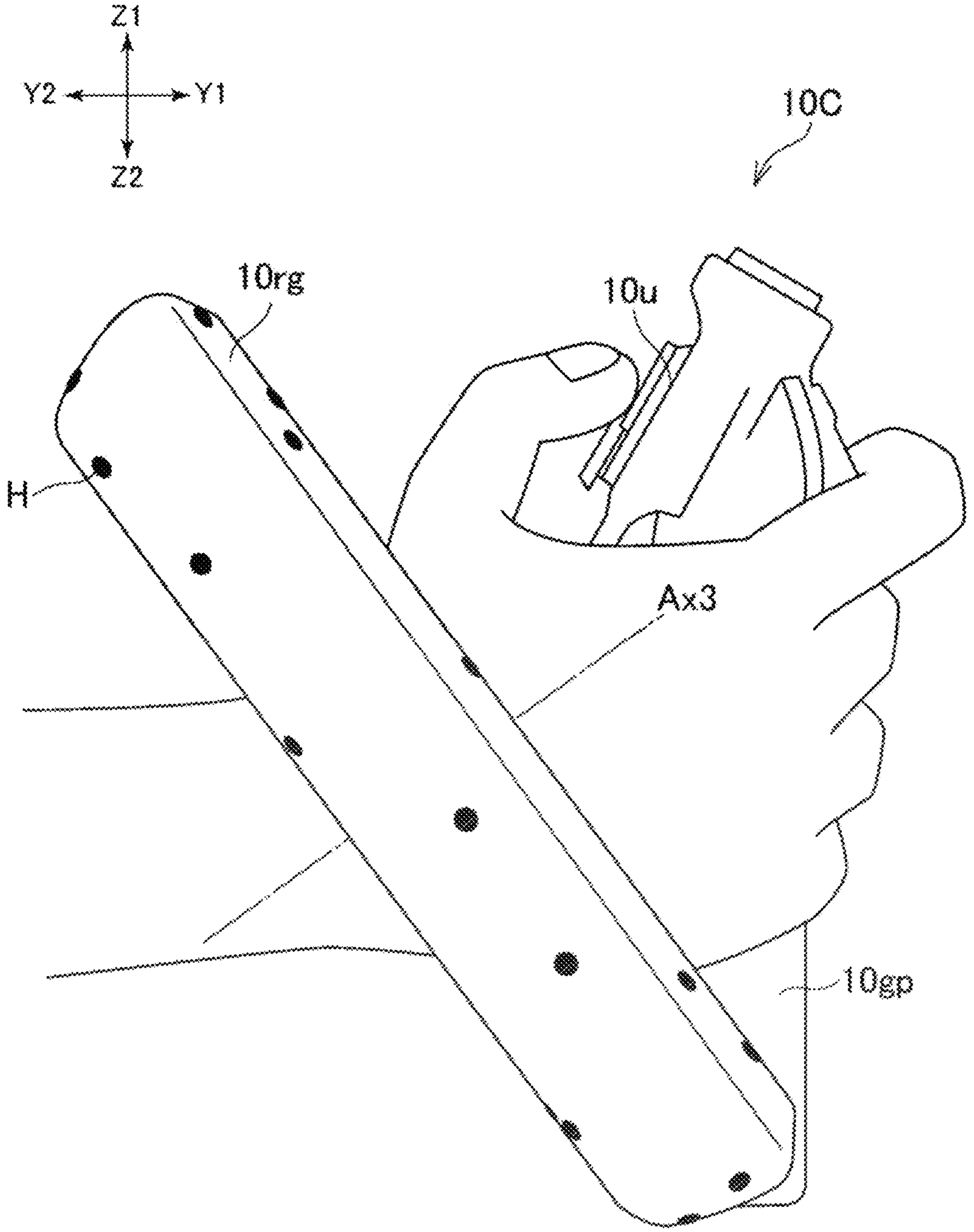
FIG. 11A is a diagram illustrating yet another example of an input device having an annular portion.
Figure 11B:
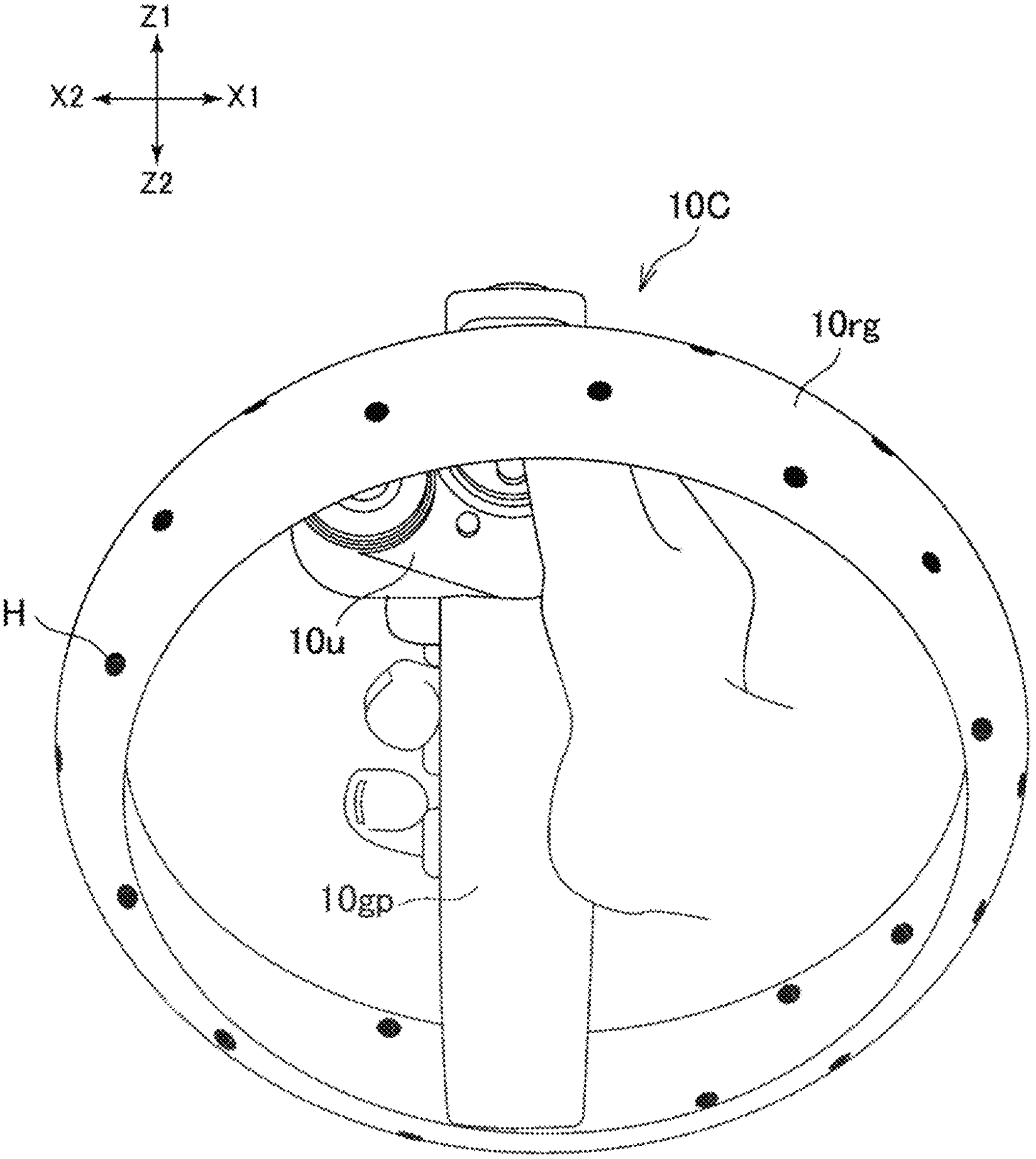
FIG. 11B is a diagram illustrating the yet another example of an input device having an annular portion.

FIG. 9 is a diagram illustrating an input device 10A. FIG. 10 is a diagram illustrating an input device 10B. FIGS. 11A and 11B are each a diagram illustrating an input device 10C. Any of the structures and elements of the input devices 100 to 700 described above may be integrated into the structures and important points of the input devices 10A to 10C.

Each of the input devices 10A, 10B, and 10C has a grip 10*gp*, an upper portion 10*u* having a plurality of operating members provided therein, and an annular portion (i.e., an extension portion) 10*rg* having a plurality of to-be-tracked points H provided therein.

In the input device 10A (see FIG. 9), the upper portion 10*u* and the grip 10*gp* are disposed inside of the annular portion 10*rg*. An upper end of the upper portion 10*u* is joined to an inner surface of the annular portion 10*rg*, and a lower end of the grip 10*gp* is also joined to the inner surface of the annular portion 10*rg*. The annular portion 10*rg* is circular and is centered on a center line Ax1. In the input device 10A, the center line Ax1 is a straight line extending along a plane perpendicular to the left-right direction.

Also in the input device 10B (see FIG. 10), the upper portion 10*u* and the grip 10*gp* are disposed inside of the annular portion 10*rg*. An upper end of the upper portion 10*u* is joined to an inner surface of the annular portion 10*rg*, and a lower end of the grip 10*gp* is also joined to the inner surface of the annular portion 10*rg*. The annular portion 10*rg* is circular and is centered on a center line Ax2. In the input device 10B, the center line Ax2 is a straight line extending along the left-right direction.

In the input device 10C (see FIGS. 11A and 11B), the annular portion 10*rg* is circular and is centered on a center line Ax3 (see FIG. 11A). In the input device 10C, the center line Ax3 is a straight line extending along a plane perpendicular to the left-right direction. In detail, the center line Ax3 is a line extending obliquely forward and upward. A lower end of the grip 10*gp* is joined to an inner surface of the annular portion 10*rg*. Unlike in each of the input devices 10A and 10B, an upper end of the annular portion 10*rg* is separated forward from the upper portion 10*u*.

Figure 12:
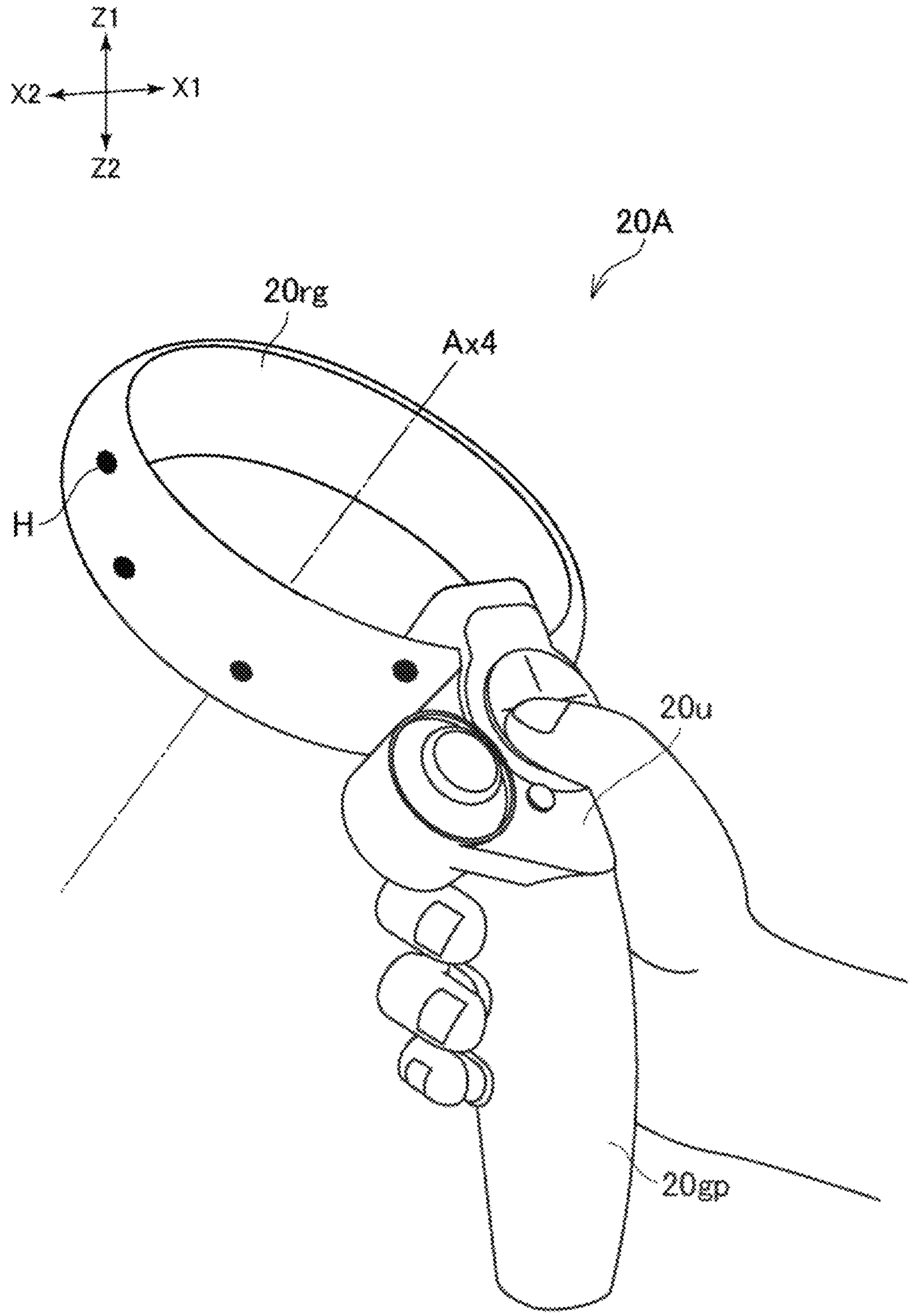
FIG. 12 is a diagram illustrating yet another example of an input device having an annular portion.
Figure 13:
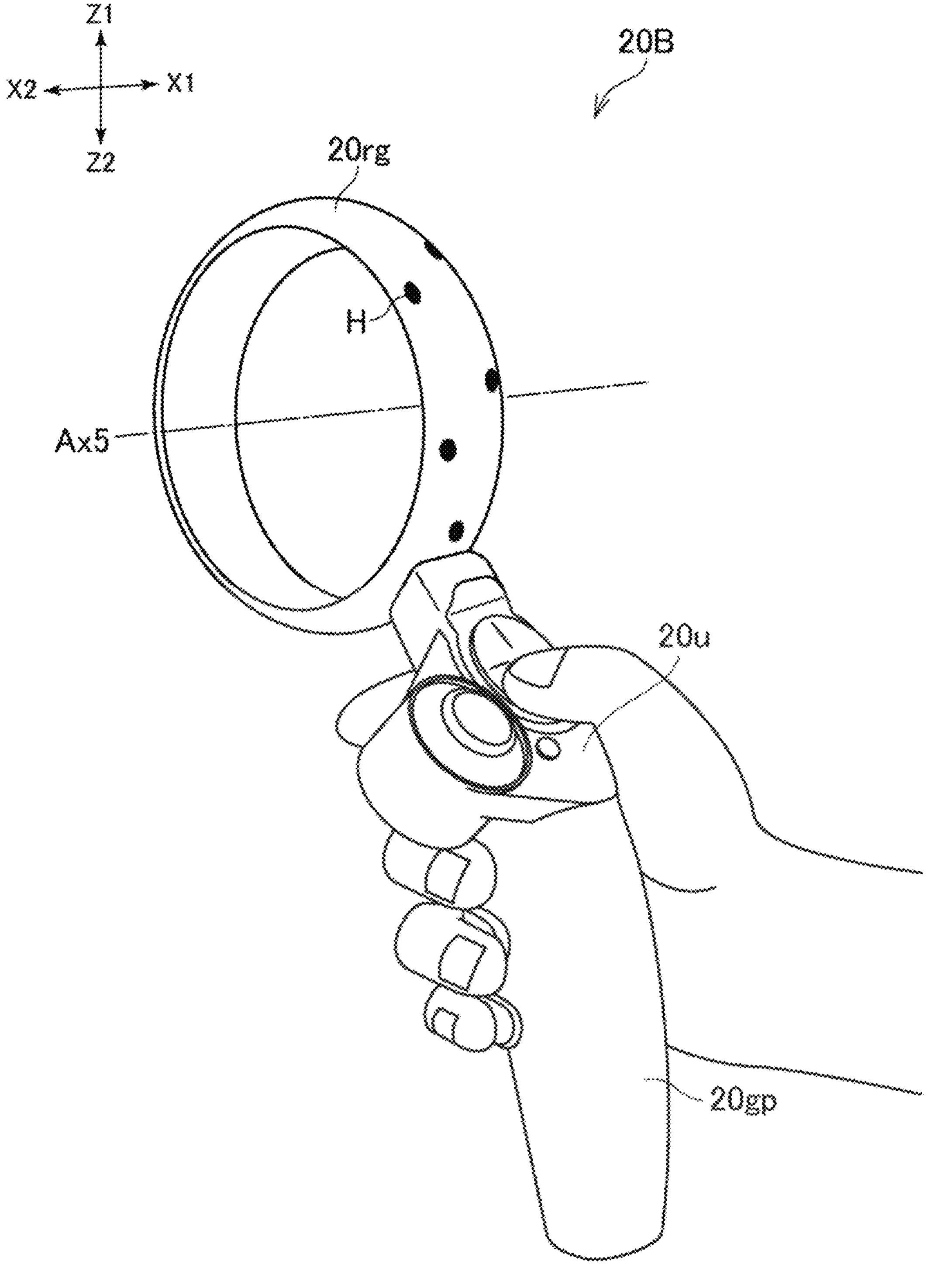
FIG. 13 is a diagram illustrating yet another example of an input device having an annular portion.
Figure 14:
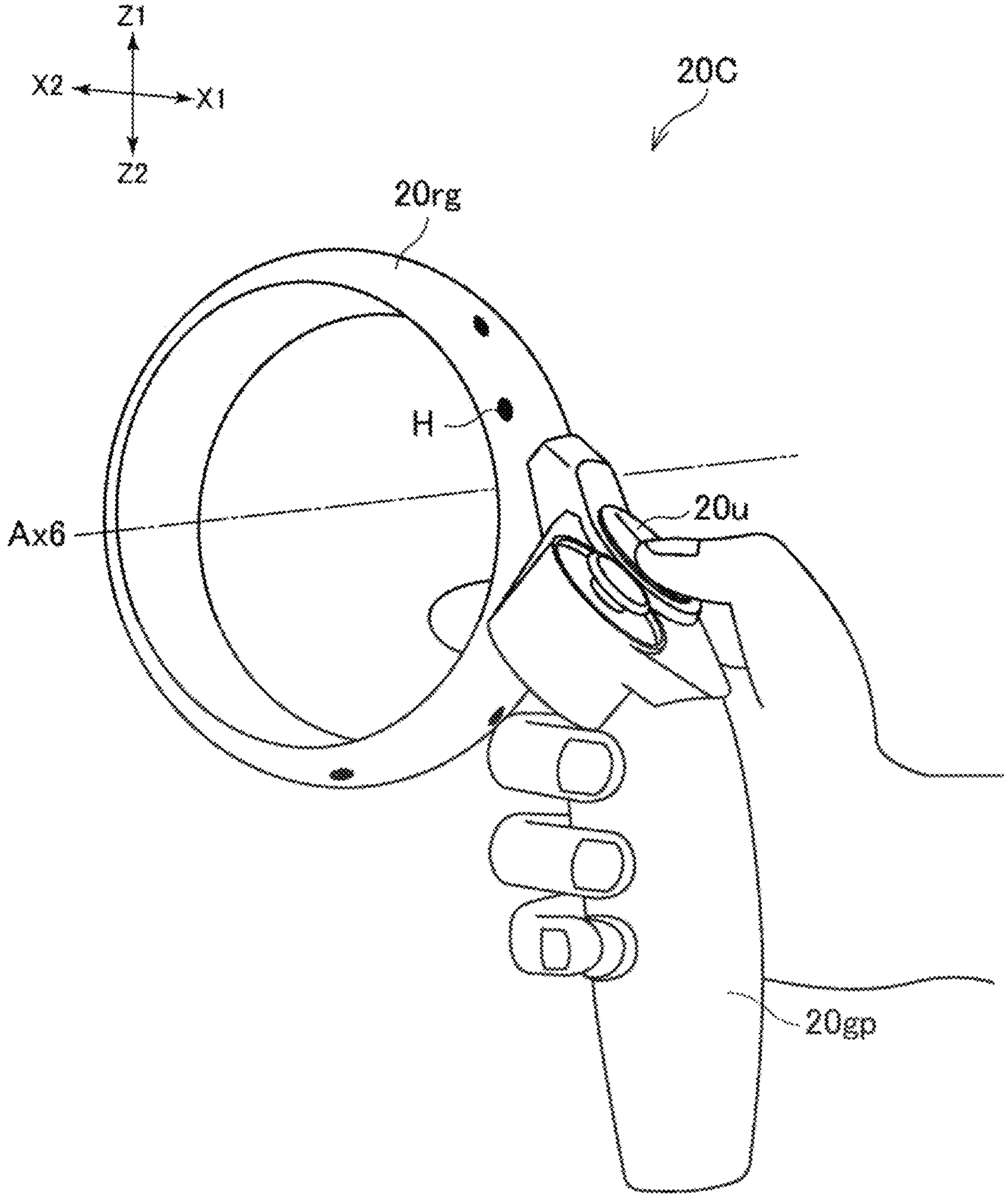
FIG. 14 is a diagram illustrating yet another example of an input device having an annular portion.
Figure 15:
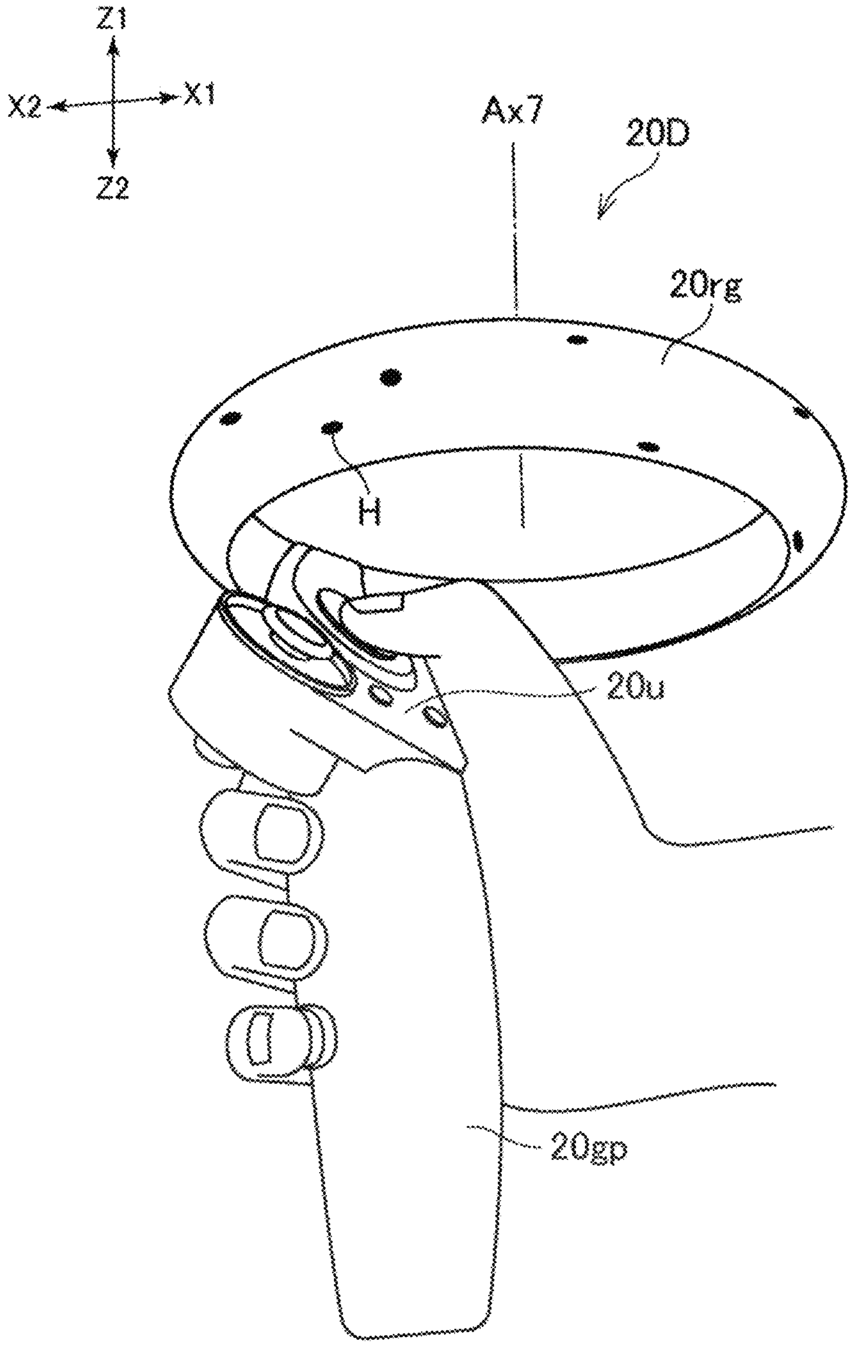
FIG. 15 is a diagram illustrating yet another example of an input device having an annular portion.
Figure 16:
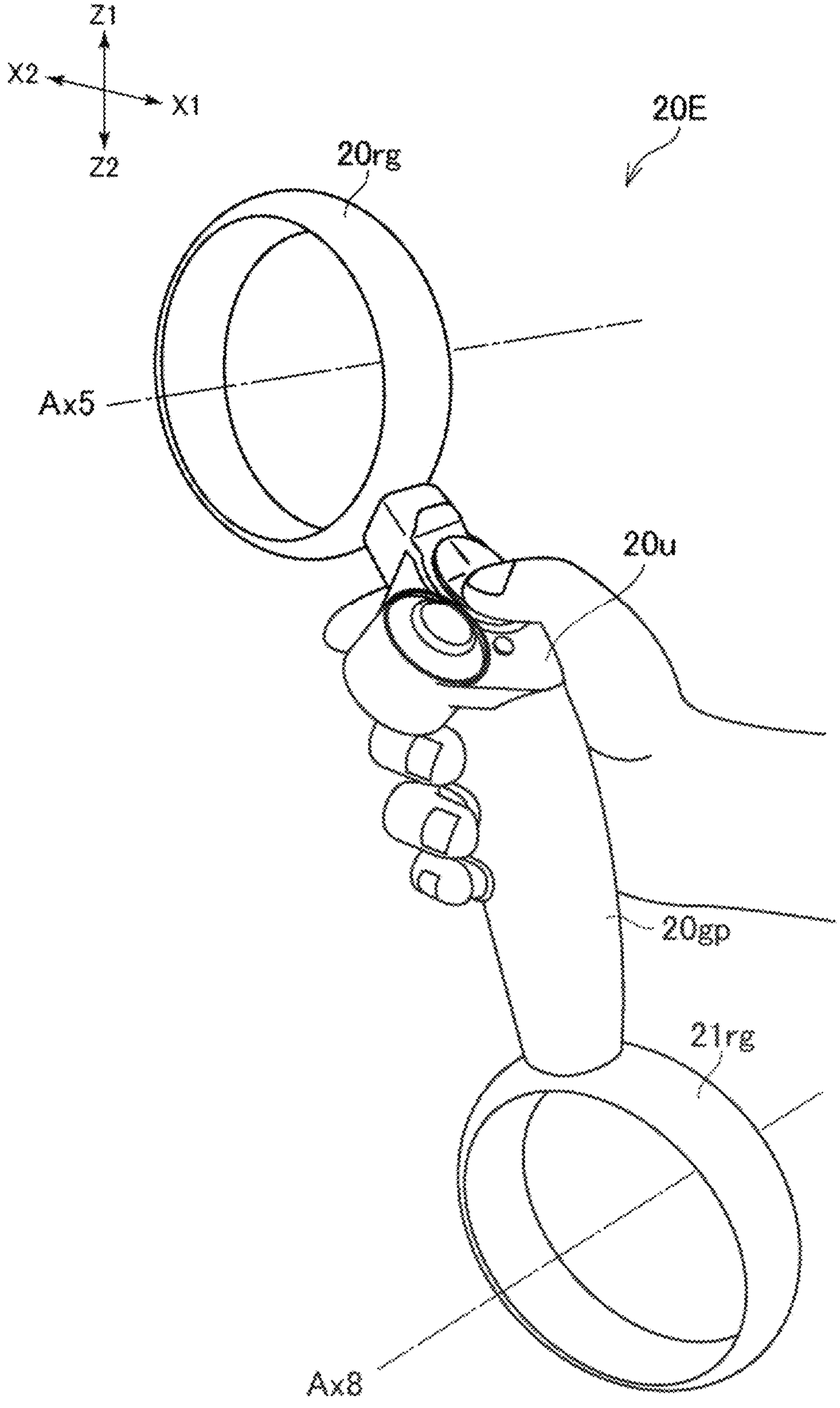
FIG. 16 is a diagram illustrating yet another example of an input device having an annular portion.

FIG. 12 is a diagram illustrating an input device 20A. FIG. 13 is a diagram illustrating an input device 20B. FIG. 14 is a diagram illustrating an input device 20C. FIG. 15 is a diagram illustrating an input device 20D. FIG. 16 is a diagram illustrating an input device 20E. Any of the structures and elements of the input devices 100 to 700 described above may be integrated into the structures and important points of the input devices 20A to 20E.

Each of the input devices 20A to 20E has a grip 20*gp*, an upper portion 20*u* having a plurality of operating members provided therein, and an annular portion (i.e., an extension portion) 20*rg* having a plurality of to-be-tracked points H provided therein.

In the input device 20A (see FIG. 12), the upper portion 20*u* is disposed outside of the annular portion 20*rg*. In more detail, the annular portion 20*rg* is positioned on the upper side of the upper portion 20*u*, and the upper portion 20*u* is joined to an outer surface (i.e., a lower portion of the outer surface) of the annular portion 20*rg*. The annular portion 20*rg* is circular and is centered on a center line Ax4. In the input device 20A, the center line Ax4 is a straight line extending along a plane perpendicular to the left-right direction. Specifically, the center line Ax4 is a line extending obliquely upward and rearward.

Also in the input device 20B (see FIG. 13), the upper portion 20*u* is disposed outside of the annular portion 20*rg*. In more detail, the annular portion 20*rg* is positioned on the upper side of the upper portion 20*u*, and the upper portion 20*u* is joined to an outer surface of the annular portion 20*rg*. The annular portion 20*rg* is circular and is centered on a center line Ax5. In the input device 20B, the center line Ax5 is a straight line extending along the left-right direction.

Also in the input device 20C (see FIG. 14), the upper portion 20*u* is disposed outside of the annular portion 20*rg*.

The annular portion 20*rg* is positioned on the front side of the upper portion 20*u*, and the upper portion 20*u* is joined to an outer surface (i.e., a rearward portion of the outer surface) of the annular portion 20*rg*. The annular portion 20*rg* is circular and is centered on a center line Ax6. In the input device 20C, the center line Ax6 is a straight line extending along the left-right direction.

In the input device 20D (see FIG. 15), a center line Ax7 is a straight line extending along a plane perpendicular to the left-right direction. Specifically, the center line Ax7 is a straight line extending substantially along the up-down direction. The annular portion 20*rg* is positioned on the upper side of the upper portion 20*u*, and the upper portion 20*u* is joined to a forward portion of the annular portion 20*rg*. The grip 20*gp* is positioned downward of the annular portion 20*rg*.

The input device 20E (see FIG. 16) has an annular portion 21*rg* in addition to the annular portion 20*rg* described above. The annular portion 21*rg* is positioned on the lower side of the grip 20*gp* and is joined to the grip 20*gp*. The annular portion 21*rg* is circular and is centered on a center line Ax8. In the input device 20E, the center line Ax8 is a straight line extending along the left-right direction. In addition, as in the example of the input device 20B, the annular portion 20*rg*, which is joined to the upper portion 20*u*, is annular and is centered on the center line Ax5 extending along the left-right direction.

Figure 17:
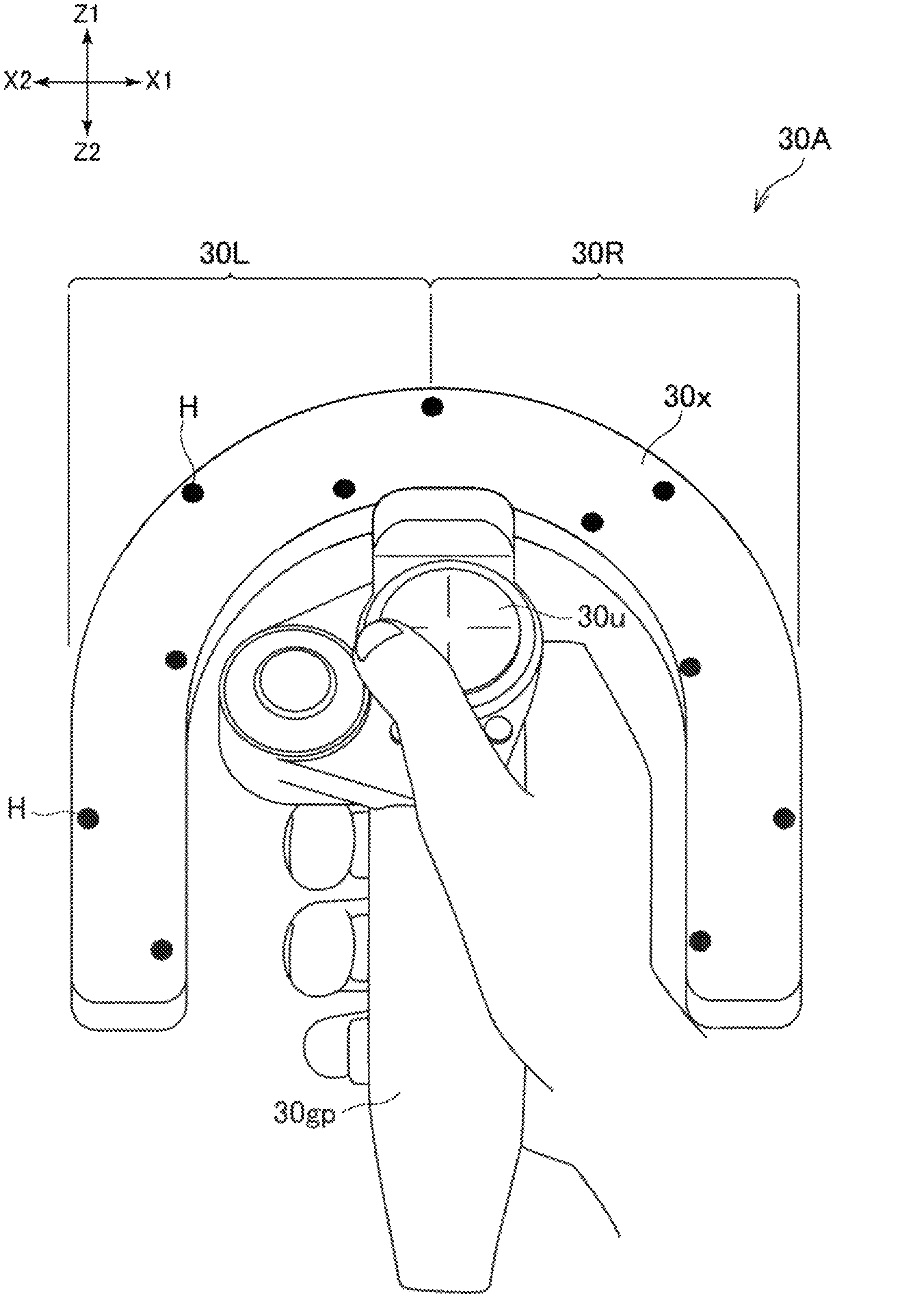
FIG. 17 is a diagram illustrating yet another example of an input device.

FIG. 17 is a diagram illustrating an input device 30A. The input device 30A has a grip 30*gp*, an upper portion 30*u* having a plurality of operating members provided therein, and an extension portion 30*x* having a plurality of to-be-tracked points H provided therein. The extension portion 30*x* is joined to an upper side of the upper portion 30*u*. The extension portion 30*x* is formed in such a manner as to cover a right side surface and a left side surface of the upper portion 30*u*. Specifically, the extension portion 30*x* has a right portion 30R extending to the right from the upper portion 30*u* and curving downward, and a left portion 30L extending to the left from the upper portion 30*u* and curving downward, in a front view of the input device 30A. The right portion 30R covers the right side surface of the upper portion 30*u*, while the left portion 30L covers the left side surface of the upper portion 30*u*. A lower end of the right portion 30R and a lower end of the left portion 30L may be positioned forward or rearward of the grip 30*gp*. Note that any of the structures and elements of the input devices 100 to 700 described above may be integrated into the structure and important points of the input device 30A.

Figure 18:
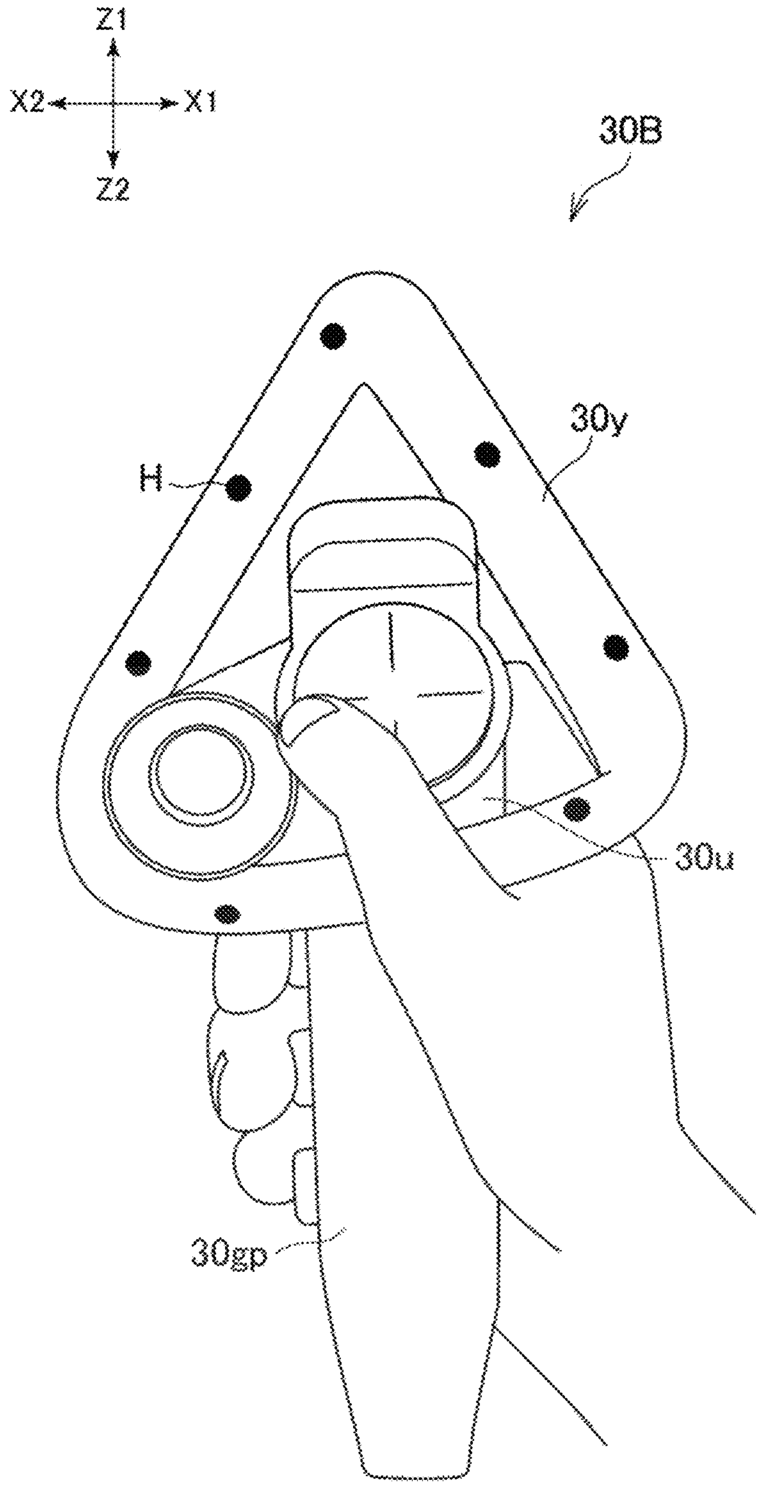
FIG. 18 is a diagram illustrating yet another example of an input device.

FIG. 18 is a diagram illustrating an input device 30B. The input device 30B has a grip 30*gp*, an upper portion 30*u* having a plurality of operating members provided therein, and an extension portion 30*y* having a plurality of to-be-tracked points H provided therein. The extension portion 30*y* is formed in such a manner as to cover a right side surface and a left side surface of the upper portion 30*u*. The extension portion 30*y* is triangular in a front view of the input device 30B, and the upper portion 30*u* is positioned inside of the extension portion 30*y*. The extension portion 30*y* is formed in such a manner that a top portion thereof is positioned on the upper side of the upper portion 30*u*. A right portion of the extension portion 30*y* is joined to a right side of the upper portion 30*u*, and a left portion of the extension portion 30*y* is joined to a left side of the upper portion 30. Note that any of the structures and elements of the input devices 100 to 700 described above may be integrated into the structure and important points of the input device 30B.

Figure 19A:
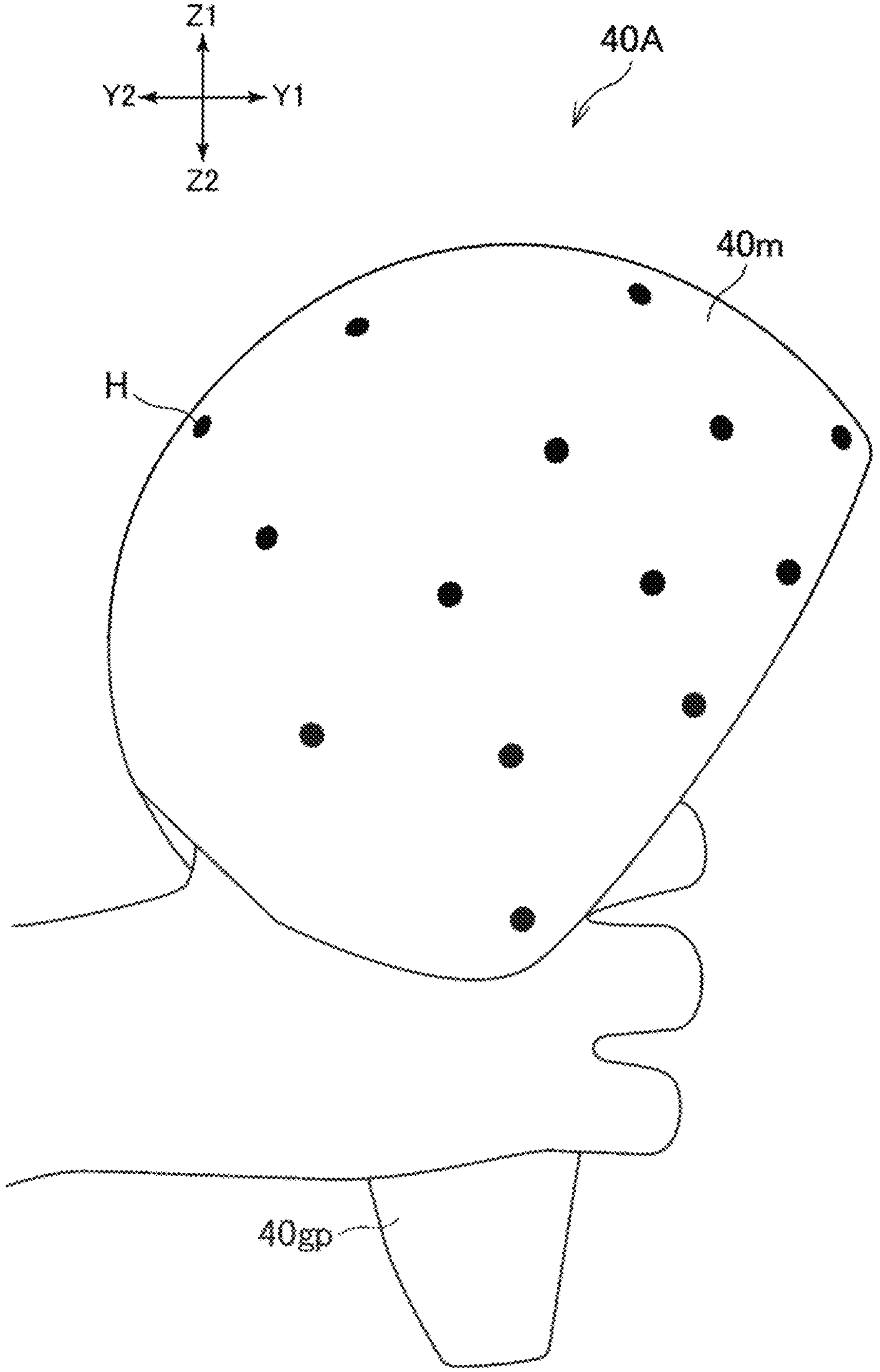
FIG. 19A is a side view illustrating yet another example of an input device having an umbrella portion.
Figure 19B:
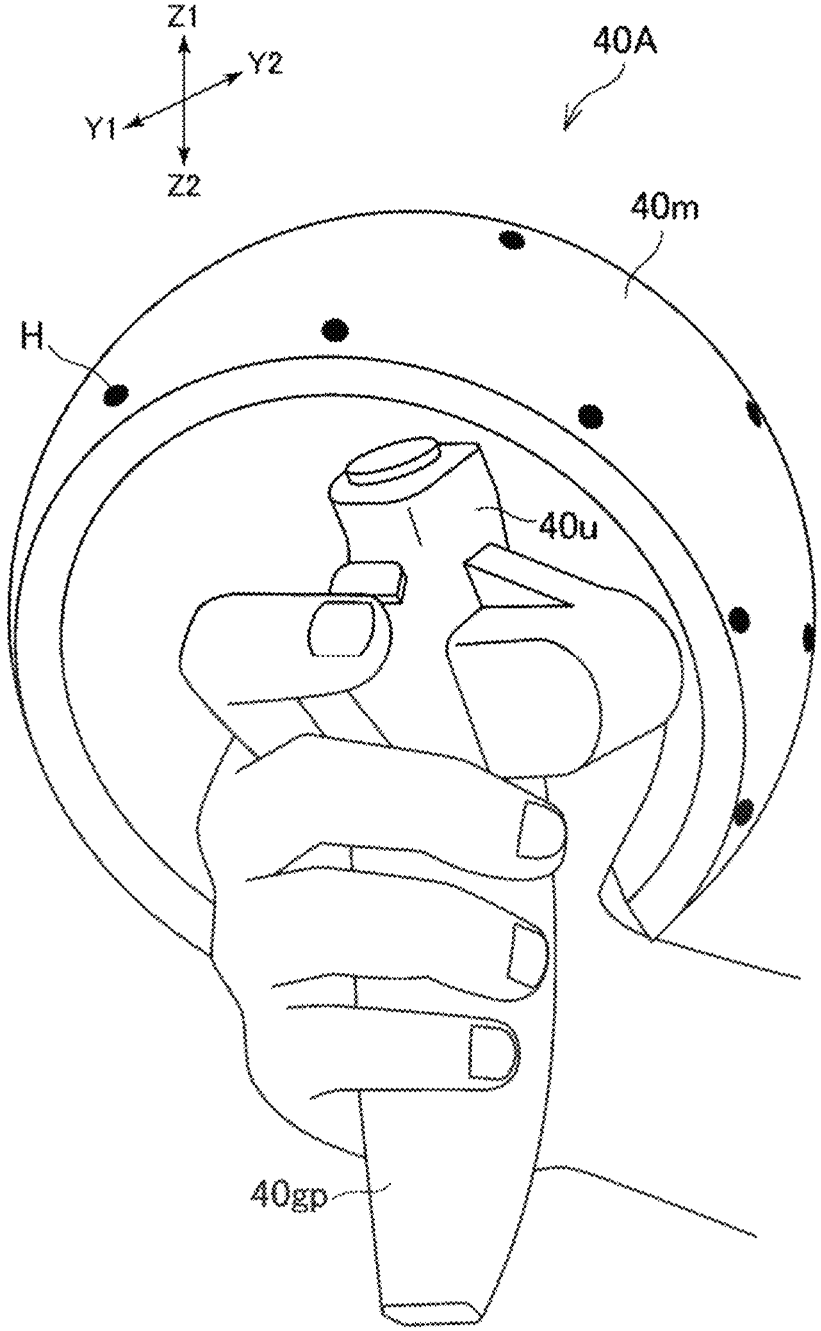
FIG. 19B is a perspective view of the input device illustrated in FIG. 19A.

FIGS. 19A and 19B are each a diagram illustrating an input device 40A. The input device 40A has a grip 40*gp*, an upper portion 40*u* having a plurality of operating members provided therein, and an umbrella portion 40*m* having a plurality of to-be-tracked points H provided therein. The umbrella portion 40*m* is in the shape of a portion of a spherical surface. The plurality of to-be-tracked points H are disposed on an outer surface of the umbrella portion 40*m*. The umbrella portion 40*m* covers the upper portion 40*u* (see FIG. 19B) and an upper portion of the grip 40*gp*. In more detail, the umbrella portion 40*m* covers, for example, a front surface and side surfaces of the upper portion 40*u* and a front surface and side surfaces of the upper portion of the grip 40*gp*. This arrangement of the umbrella portion 40*m* makes it possible to properly detect the to-be-tracked points H disposed in the umbrella portion 40*m* through the camera installed in the HMD 2. An upper end of the upper portion 40*u*, for example, is joined to an inner surface of the umbrella portion 40*m*. Note that any of the structures and elements of the input devices 100 to 700 described above may be integrated into the structure and important points of the input device 40A.

Figure 20:
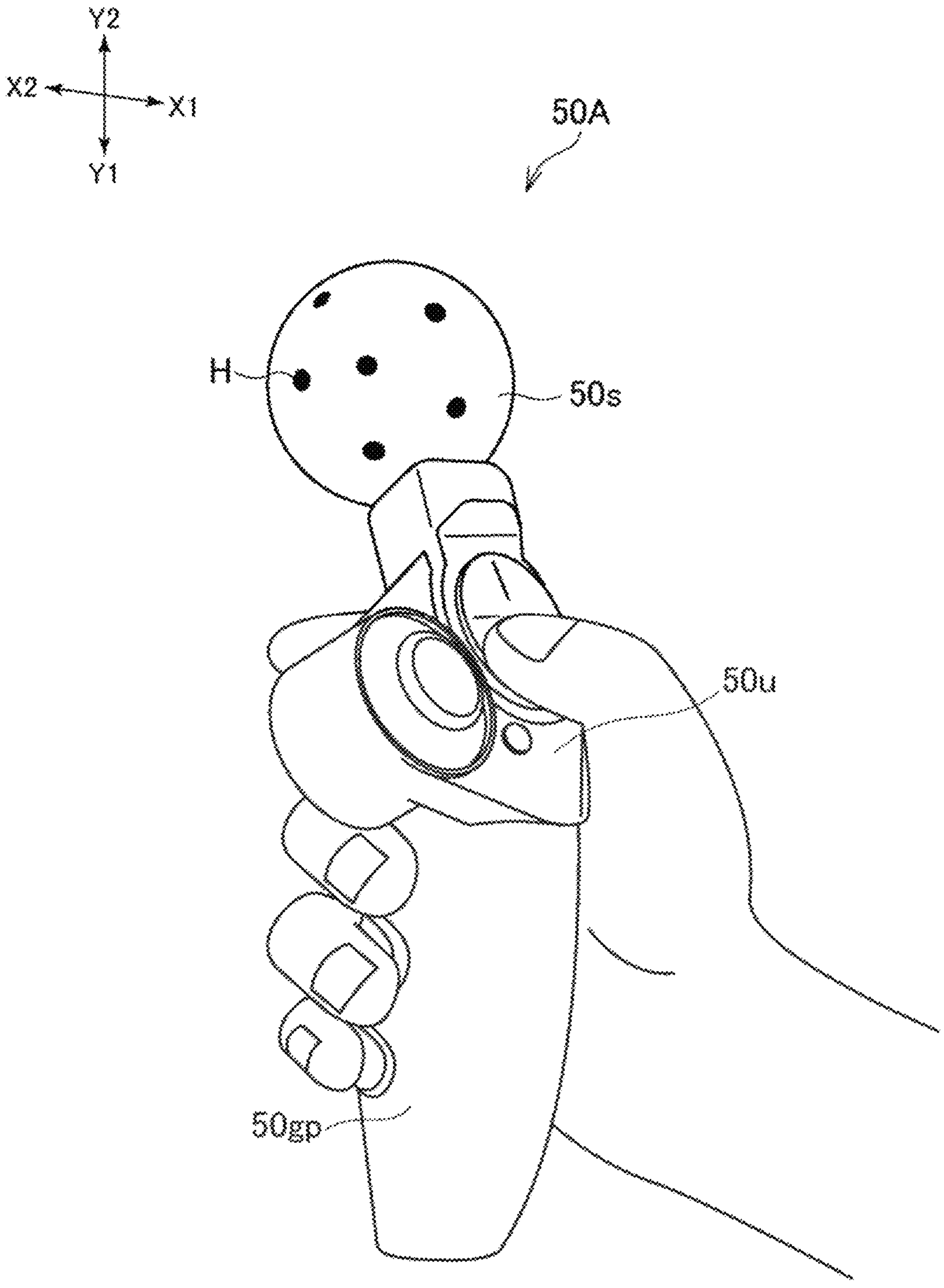
FIG. 20 is a diagram illustrating an example of an input device having a spherical portion.
Figure 21:
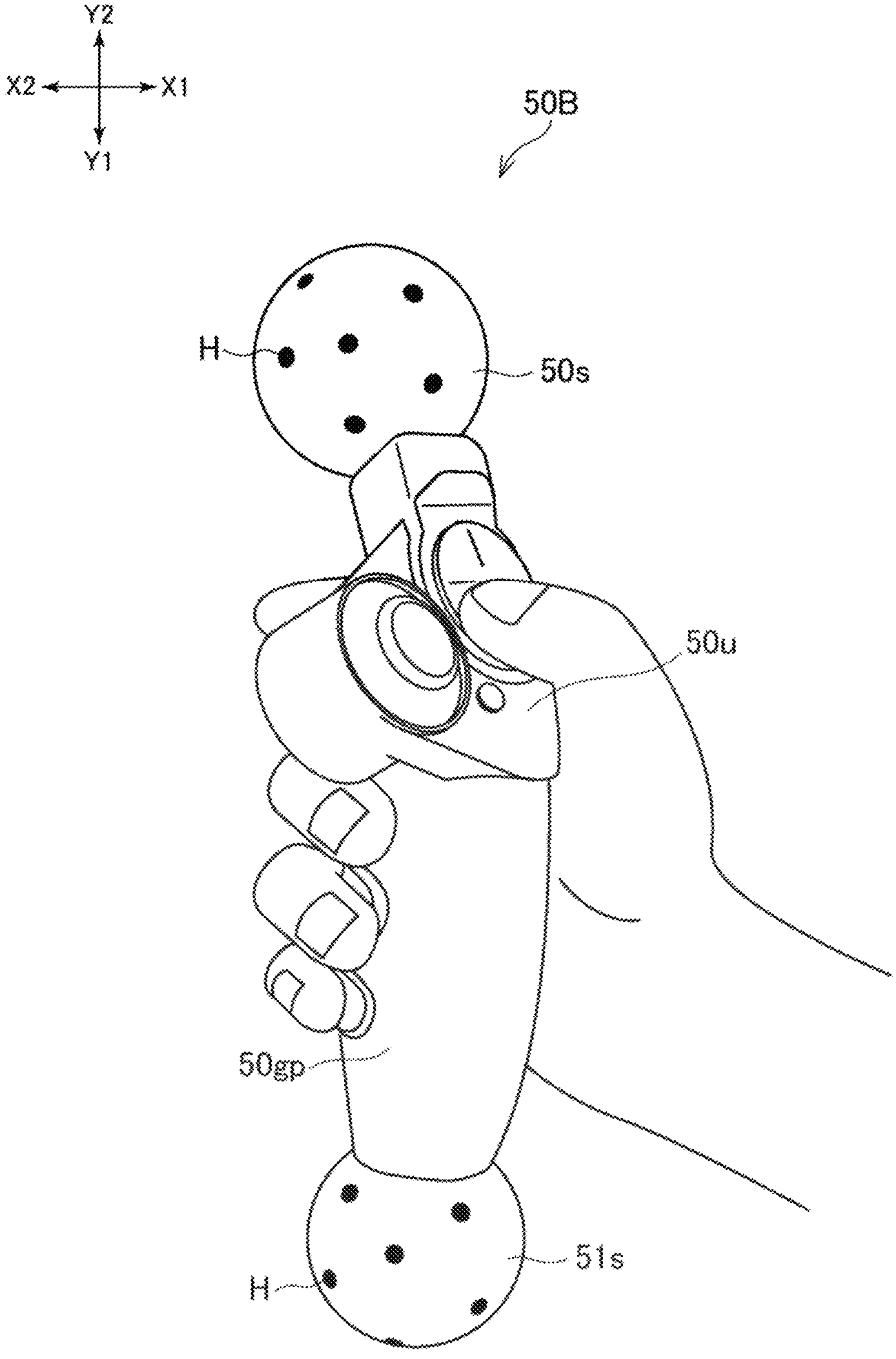
FIG. 21 is a diagram illustrating yet another example of an input device having a spherical portion.

FIG. 20 is a diagram illustrating an input device 50A. FIG. 21 is a diagram illustrating an input device 50B. Each of the input devices 50A and 50B has a grip 50*gp*, an upper portion 50*u* having a plurality of operating members provided therein, and a spherical portion 50*s* having a plurality of to-be-tracked points H provided therein. In each of the input devices 50A and 50B, the plurality of to-be-tracked points H are disposed in such a manner as to be distributed over an outer surface of the spherical portion 50*s*. The spherical portion 50*s* is attached to an upper end of the upper portion 50*u*. The input device 50B (see FIG. 21) has a spherical portion 51*s* in addition to the spherical portion 50*s*. A plurality of to-be-tracked points H are disposed in such a manner as to be distributed over an outer surface of the spherical portion 51*s*. The spherical portion 51*s* is attached to a lower end of the grip 50*gp*. Note that any of the structures and elements of the input devices 100 to 700 described above may be integrated into the structures and important points of the input devices 50A and 50B.

Figure 22:
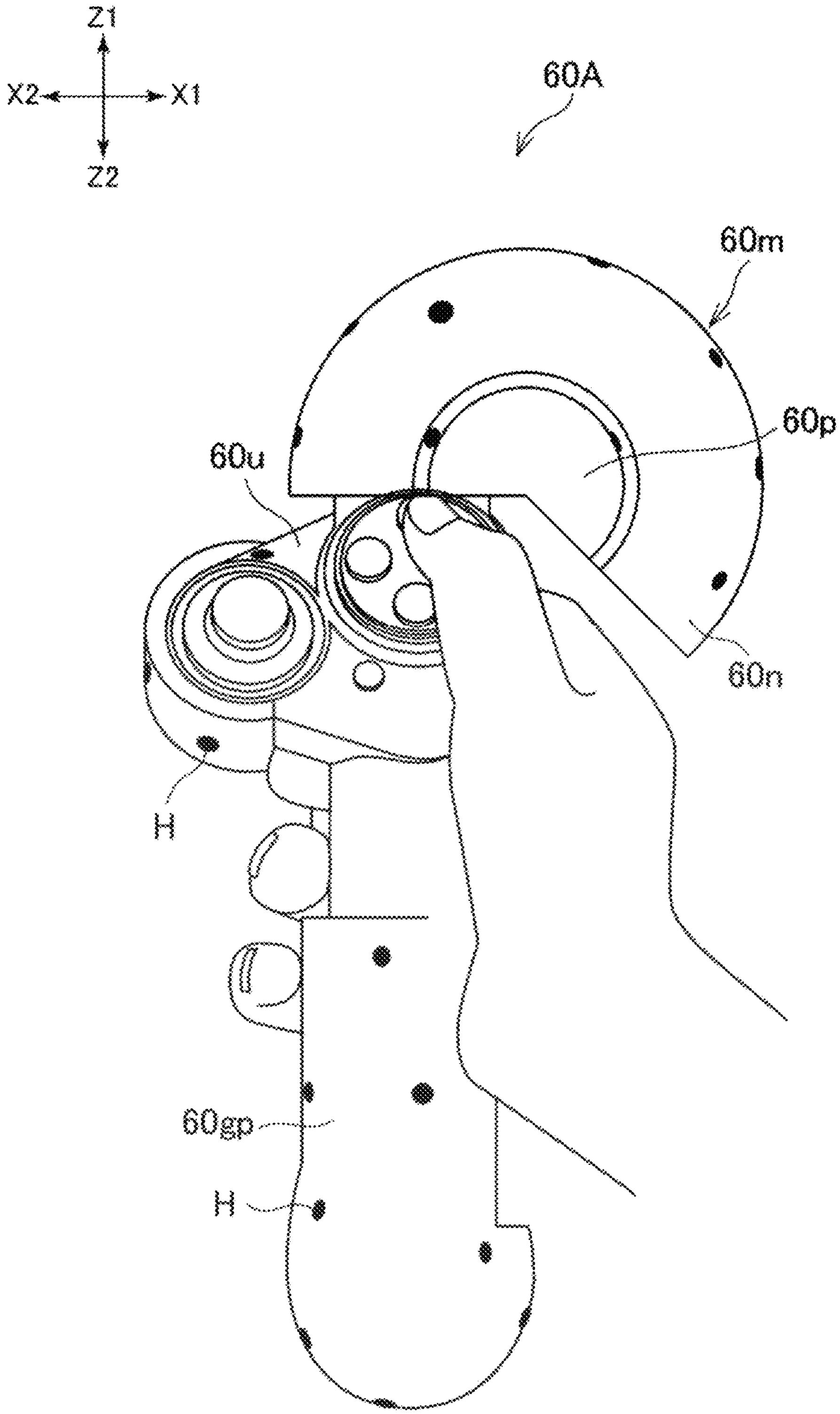
FIG. 22 is a front view illustrating an example of an input device having an upper expanded portion.

FIG. 22 is a diagram illustrating an input device 60A. The input device 60A has a grip 60*gp*, an upper portion 60*u* having a plurality of operating members provided therein, and an upper expanded portion 60*m* having a plurality of to-be-tracked points H provided therein. The plurality of to-be-tracked points H are disposed in such a manner as to be distributed over an outer surface of the upper expanded portion 60*m*. The upper expanded portion 60*m* is attached to an upper end of the upper portion 60*u*. The upper expanded portion 60*m* bulges to the right side and has a portion 60*n* positioned on the right-hand side of a right side surface of the upper portion 60*u*. The upper expanded portion 60*m* has a recessed portion 60*p* at a center thereof. The input device 60A has to-be-tracked points H in a lower portion of the grip 60*gp*. Note that any of the structures and elements of the input devices 100 to 700 described above may be integrated into the structure and important points of the input device 60A.

Figure 23:
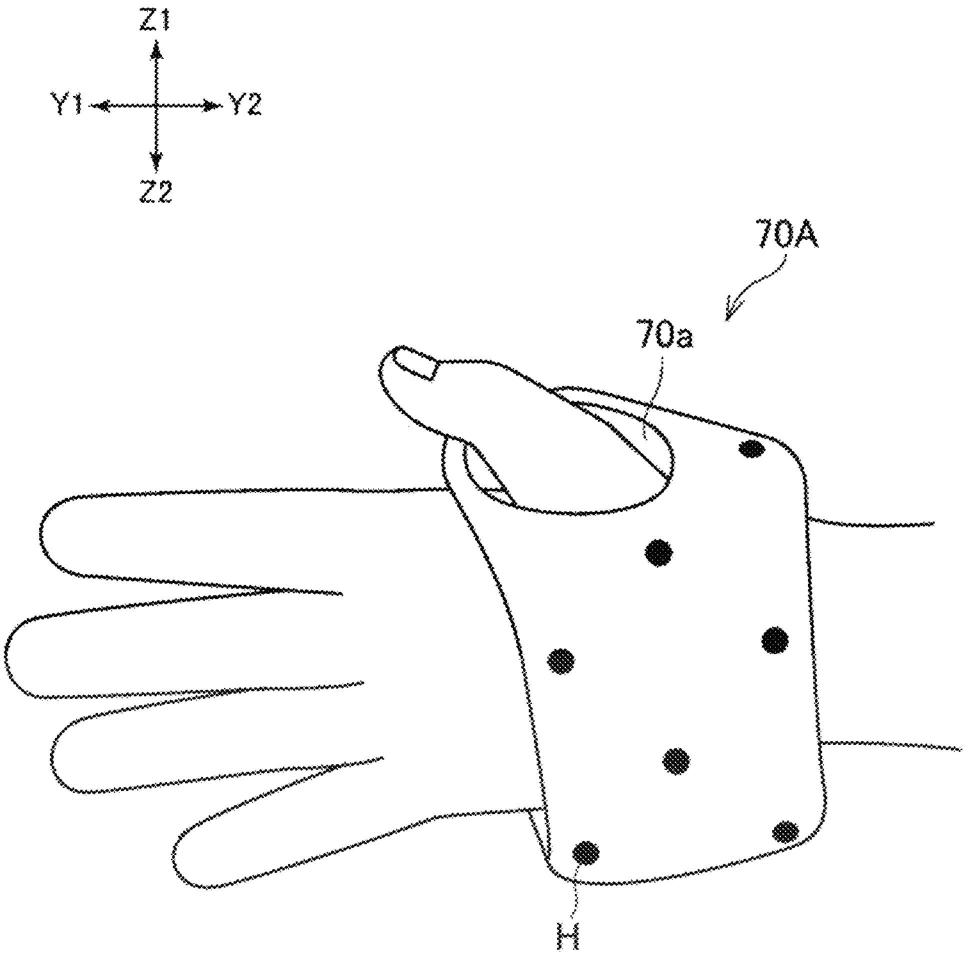
FIG. 23 is a side view illustrating yet another example of an input device.

FIG. 23 is a diagram illustrating an input device 70A. The input device 70A is tubular and allows a hand to be inserted thereinto. The input device 70A surrounds a wrist of the user when in use. The input device 70A may have an opening 70*a* through which the thumb is to be inserted. A plurality of to-be-tracked points H are disposed in such a manner as to be distributed over an outer surface of the input device 70A. Note that any of the structures and elements of the input devices 100 to 700 described above may be integrated into the structure and important points of the input device 70A.

SUMMARY

As described above, each of the input devices 100 to 500 has the grip 11, 211, 311, 411, or 511 extending in the up-down direction, the upper portion 20, 220, 320, 420, or 520 positioned upward of the grip and having the operating members 13 to 15 to be operated by a finger disposed therein, and the lower portion 30, 230, 330, 430, or 530 positioned downward of the grip and having the plurality of to-be-tracked points H (H3) disposed therein. The width of the lower portion in a direction (i.e., the left-right direction or the front-rear direction) intersecting the up-down direction is greater than the width of the grip in the same direction. This makes it easier to dispose a large number of to-be-tracked points H in the lower portion 30, 230, 330, 430, or 530. This, in turn, makes it possible to properly recognize the position and posture of each of the input devices 100 to 500 even in the case where each of the input devices 100 to 500 is placed in such a posture that the lower portion 30, 230, 330, 430, or 530 faces the camera 2*a*.

In each of the input devices 100 and 500, the width W21 of the upper portion 20 or 520 in the left-right direction is greater than the width W22 of the upper portion 20 or 520 in the front-rear direction. The width W32 of the lower portion 30 or 530 in the front-rear direction is greater than the width W31 of the lower portion 30 or 530 in the left-right direction. Each of these input devices 100 and 500 allows the direction in which the to-be-tracked points H are arranged in the upper portion 20 or 520 to be different from the direction in which the to-be-tracked points H are arranged in the lower portion 30 or 530. As a result, even in the case where it is difficult to compute the position and posture of each of the input devices 100 and 500 through the to-be-tracked points H in one of the above portions (e.g., the upper portion 20 or 520), the to-be-tracked points H in the other portion (e.g., the lower portion 30 or 530) can be used to compute the position and posture of each of the input devices 100 and 500, which leads to improved accuracy in the recognition of the posture and position of the input device.

In each of the input devices 100 and 200, some of the plurality of to-be-tracked points H are provided in the grip 11 or 211. Each of these input devices allows the position and posture of the input device 100 or 200 to be recognized by using the to-be-tracked point or points H in the grip 11 or 211 even in the case where the input device 100 or 200 is placed in such a posture that the outer surface of the grip 11 or 211 faces the camera 2*a*, which leads to improved accuracy in the recognition thereof.

In the input device 300, the front surface 321*a* of the upper portion 320 has the operating member region R1 having the operating members 13 to 15 disposed therein and the to-be-tracked region R2 having the plurality of to-be-tracked points H disposed therein along the edge of the operating member region R1. The front surface 321*a* has the shoulder 321*g* between the operating member region R1 and the to-be-tracked region R2. This input device 300 is able to prevent a finger operating any of the operating members 13 to 15 disposed on the front surface 321*a* of the input device 300 from overlapping any of the to-be-tracked points H.

In the input device 500, the LEDs 551, which are the light sources, are mounted on the flexible board 550, and this flexible board 550 extends from the upper portion 520 to the lower portion 530 through the extension portion 540. This leads to a reduced number of parts of the input device 500. The flexible board 550 may extend from the upper portion 520 to the extension portion 540 with an additional flexible board disposed separately in the lower portion 530. In another example, the flexible board 550 may extend from the lower portion 530 to the extension portion 540 with an additional flexible board disposed separately in the upper portion 520.

Each of the input devices 600 and 700 has the upper portion 620 or 720 having the front surface 621*a* or 721*a* on which the operating members 13, 16, and 17 are disposed, and the extension portion 640 or 740 extending along the plane including the front surface 621*a* or 721*a*, and having the plurality of to-be-tracked points H provided therein. Use of the extension portion 640 or 740 makes it easier to ensure a sufficient region (surface area) for the arrangement of the to-be-tracked points H. This, in turn, makes it possible to provide each of the input devices 500 and 600 with a sufficient number of to-be-tracked points H while ensuring a sufficient distance between two adjacent ones of the to-be-tracked points H. This leads to improved accuracy in the recognition of the posture and position of the input device. In addition, the structure of the member (i.e., the housing) that forms the exterior of each of the input devices 600 and 700 can thus be simplified when compared to, for example, a mode in which the extension portion 640 or 740 extends at right angles to the plane including the front surface 621*a* or 721*a* of the upper portion 620 or 720.

Note that characteristic structures that have been described with reference to the input devices 100 to 700 and 10A to 70A may be applied to other input devices proposed in the present disclosure. For example, the shoulder 321*g* of the input device 300, which has been described with reference to FIG. 4A, may be applied to the other input devices 100, 200, 400 to 700, and 10A to 70A while the features thereof are maintained. Similarly, the flexible board 550 of the input device 500, which has been described with reference to FIG. 6A, may be provided in the other input devices 100 to 700 and 10A to 70A while the features thereof are maintained.

In yet another example, each of the input devices 100 to 700 and 10A to 70A may not have the operating members 13 to 17. Even in this case, the user is able to cause a moving image displayed on the HMD 2 to reflect movement of the input device by moving the input device while holding the grip, which is beneficial.

Note that the camera for tracking the position and posture of each of the input devices 100 to 700 and 10A to 70A may not necessarily be provided in the HMD 2. As mentioned above, in the case where a moving image generated on the basis of the position and posture of each of the input devices 100 to 700 and 10A to 70A is displayed on an external display apparatus (e.g., a monitor of a personal computer or a television), for example, the camera may be attached to this display apparatus.

The invention claimed is:

1. An input device comprising:

a grip extending in a first direction, wherein the grip includes a first width extending in a second direction transverse to the first direction;

a first portion positioned on a first side of the grip in the first direction, wherein the first portion includes:

a first surface having a plurality of operating members to be operated by a finger;

a second surface having an operating button;

a first curved surface between the first surface and the second surface, wherein:

the first curved surface includes a first to-be-tracked point configured to emit light; and the first to-be-tracked point is oriented along the first curved surface toward a first point direction;

a second curved surface between the first curved surface and the second surface, wherein:

the second curved surface includes a second to-be-tracked point configured to emit light;

the second to-be-tracked point is oriented along the second curved surface toward a second point direction; and the second point direction and the first point direction define an oblique angle therebetween; and a second portion positioned on a second side of the grip in the first direction, wherein:

the second portion includes a plurality of to-be-tracked points that are configured to emit light; and the second portion includes a second width extending in the second direction that is greater than the first width.

2. The input device according to claim 1, wherein:

the first portion includes a third width extending in the second direction, or a third direction intersecting both the first direction and the second direction; and the third width is greater than the first width of the grip extending in the second direction and a fourth width of the grip extending in the third direction.

3. The input device according to claim 1, further comprising an extension portion extending from the first portion or the second portion in the second direction, wherein the extension portion includes a third to-be-tracked point disposed therein.

4. The input device according to claim 1, wherein the first portion further includes:

a first projection portion extending from the first surface in a third direction;

the first projection portion includes at least one to-be-tracked point of the plurality of to-be-tracked points; and a second projection portion extending from the second surface in a fourth direction opposite to the third direction.

5. An input device comprising:

a grip extending in a first direction;

a first portion positioned on a first side of the grip in the first direction, wherein the first portion includes:

a first width extending in a second direction that intersects the first direction;

a second width extending in a third direction that intersects both the first direction and the second direction, wherein the second width is less than the first width;

a first surface having a first plurality of to-be-tracked points configured to emit light;

a second surface having an operating button; and a first curved surface between the first surface and the second surface, wherein:

the first curved surface includes a first to-be-tracked point; and the first to-be-tracked point is oriented along the first curved surface toward a first point direction; and a second curved surface between the first curved surface and the second surface, wherein:

the second curved surface includes a second to-be-tracked point configured to emit light;

the second to-be-tracked point is oriented along the second curved surface toward a second point direction; and the second point direction and the first point direction define an oblique angle therebetween; and a second portion positioned on a second side of the grip in the first direction, wherein:

the second portion includes a second plurality of to-be-tracked points that are configured to emit light; and a third width of the second portion extending in the third direction is greater than a fourth width of the second portion extending in the second direction.

6. The input device according to claim 5, wherein the first width of the first portion extending in the second direction is greater than a fourth width of the grip extending in the second direction.

7. The input device according to claim 6, wherein the third width of the second portion extending in the third direction is greater than a fifth width of the grip extending in the third direction.

8. The input device according to claim 5, wherein the first plurality of to-be-tracked points in the first portion includes a third plurality of to-be-tracked points arranged in the second direction.

9. The input device according to claim 8, wherein the second plurality of to-be-tracked points in the second portion include a fourth plurality of to-be-tracked points arranged in the third direction.

10. The input device according to claim 5, wherein the first portion further includes:

a first projection portion extending from the first surface in a fourth direction;

the first projection portion includes at least one to-be-tracked point of the first plurality of to-be-tracked points; and a second projection portion extending from the first surface in a fifth direction opposite to the fourth direction.

11. An input device comprising:

a grip extending in an up-down direction, wherein the grip includes a center line extending along the up-down direction;

an upper portion positioned upward of the grip, wherein the upper portion includes:

a first surface on which an operating member to be operated by a thumb is disposed;

a second surface having an operating button; and a first curved surface between the first surface and the second surface, wherein:

the first curved surface includes a first to-be-tracked points configured to emit light; and the first to-be-tracked point is oriented along the first curved surface toward a first point direction; and a second curved surface between the first curved surface and the second surface, wherein:

the second curved surface includes a second to-be-tracked point configured to emit light;

the second to-be-tracked point is oriented along the second curved surface toward a second point direction; and the second point direction and the first point direction define an oblique angle therebetween; and a plurality of to-be-tracked points configured to emit light, wherein at least one to-be-tracked point of the plurality of to-be-tracked points is:

disposed in the grip; and displaced rightward or leftward with respect to the center line of the grip.

12. The input device according to claim 11, wherein:

the center line is a first center line; and the at least one to-be-tracked point is displaced forward with respect to the first center line extending along the up-down direction and positioned on a second center line of the grip extending in a front-rear direction.

13. The input device according to claim 11, wherein the at least one to-be-tracked point is positioned downward of a center of the grip in the up-down direction.

14. An input device comprising:

an operating member to be operated by a finger;

a first plurality of to-be-tracked points configured to emit light; and a first portion including:

a first surface having an operating member region including the operating member;

a to-be-tracked region including the first plurality of to-be-tracked points disposed therein along an edge of the first surface, wherein the to-be-tracked region at least partially surrounds a circumference of the first surface;

a second surface having an operating button; and a curved surface between the first surface and the second surface, wherein the curved surface includes a second plurality of to-be-tracked points; and a shoulder extends between the first surface and the to-be-tracked region such that the to-be-tracked region is raised relative to the first surface, wherein a portion of the to-be-tracked region adjacent an end of the shoulder slopes towards the first surface.

15. The input device according to claim 14, wherein the first surface protrudes in a first direction relative to the operating member region.

16. The input device according to claim 15, further comprising a grip extending in a first direction, wherein:

the to-be-tracked region is positioned farther from the grip than the operating member region; and the to-be-tracked region surrounds a portion of an outer edge of the operating member region.

17. An input device comprising:

a grip extending in a first direction;

a first portion positioned on a first side of the grip in the first direction and including a first plurality of to-be-tracked points configured to emit light, wherein the first portion includes:

a first surface having a plurality of operating members to be operated by a finger disposed therein, a second surface having an operating button; and a curved surface between the first surface and the second surface, wherein the curved surface includes a second plurality of to-be-tracked points configured to emit light;

a second portion positioned on a second side of the grip in the first direction;

an extension portion extending from the first portion toward the second portion, wherein:

the extension portion is apart from the grip in a second direction intersecting the first direction; and the extension portion includes a third plurality of to-be-tracked points configured to emit light; and a flexible board extending along an outer surface of at least a portion of the first portion and at least a portion of the extension portion, wherein the flexible board includes a fourth plurality of to-be-tracked points configured to emit light.

18. The input device according to claim 16, wherein:

the flexible board includes a main extension portion and a plurality of projection portions;

each projection portion of the plurality of projection portions having a separate to-be-tracked point of the first plurality of to-be-tracked points mounted thereon;

the main extension portion including a first edge and a second edge opposite the first edge; and the plurality of projection portions includes a first set of projection portions projecting from the first edge and a second set of projection portions projecting from the second edge.

19. The input device according to claim 18, wherein a first projection portion of the plurality of projection portions projects from the main extension portion on the first portion and a second projection portion of the plurality of projection portions projects from the main extension portion on the extension portion.

20. The input device according to claim 19, wherein a third projection portion of the plurality of projection portions projects from the main extension portion on the second portion.

* * * * *